United States Patent
Fasching et al.

(10) Patent No.: US 10,326,135 B2
(45) Date of Patent: Jun. 18, 2019

(54) DOPED CONVERSION MATERIALS FOR SECONDARY BATTERY CATHODES

(71) Applicant: QuantumScape Corporation, San Jose, CA (US)

(72) Inventors: Rainer J. Fasching, Mill Valley, CA (US); Ghyrn E. Loveness, Mountain View, CA (US); Aram Yang, Berkeley, CA (US); Arnold Allenic, San Jose, CA (US); Timothy Holme, Mountain View, CA (US)

(73) Assignee: QuantumScape Corporation, San Jose, CA (US)

( * ) Notice: Subject to any disclaimer, the term of this patent is extended or adjusted under 35 U.S.C. 154(b) by 388 days.

(21) Appl. No.: 14/826,908

(22) Filed: Aug. 14, 2015

(65) Prior Publication Data

US 2016/0049655 A1   Feb. 18, 2016

Related U.S. Application Data

(60) Provisional application No. 62/038,059, filed on Aug. 15, 2014, provisional application No. 62/043,353, (Continued)

(51) Int. Cl.
*H01M 4/131*   (2010.01)
*H01M 4/1397*   (2010.01)
(Continued)

(52) U.S. Cl.
CPC .......... *H01M 4/582* (2013.01); *H01M 4/131* (2013.01); *H01M 4/136* (2013.01); *H01M 4/364* (2013.01);
(Continued)

(58) Field of Classification Search
CPC .... H01M 4/0483; H01M 4/131; H01M 4/136; H01M 4/1391; H01M 4/1397;
(Continued)

(56) References Cited

U.S. PATENT DOCUMENTS 2,722,490 A   11/1955   Haynes et al.
2,722,559 A   11/1955   Farlow et al.
(Continued)

FOREIGN PATENT DOCUMENTS

CN   1547277 A   11/2004
CN   101443932 A   5/2009
(Continued)

OTHER PUBLICATIONS

English translation of JP Publication 2013-073792, dated Apr. 2013.*

(Continued)

*Primary Examiner* — Brittany L Raymond
(74) *Attorney, Agent, or Firm* — Squire Patton Boggs (US) LLP

(57) ABSTRACT

Battery systems using doped conversion materials as the active material in battery cathodes are provided herein. Doped conversion material may include a defect-rich structure or an amorphous or glassy structure, including at least one or more of a metal material, one or more oxidizing species, a reducing cation species, and a dopant. Methods for fabricating batteries and battery systems with doped conversion material are also provided herein.

10 Claims, 47 Drawing Sheets

Related U.S. Application Data filed on Aug. 28, 2014, provisional application No. 62/189,669, filed on Jul. 7, 2015.

(51) Int. Cl.

| | | |
|---|---|---|
| *H01M 4/136* | (2010.01) | |
| *H01M 4/36* | (2006.01) | |
| *H01M 4/48* | (2010.01) | |
| *H01M 4/485* | (2010.01) | |
| *H01M 4/505* | (2010.01) | |
| *H01M 4/525* | (2010.01) | |
| *H01M 4/58* | (2010.01) | |
| *H01M 10/0525* | (2010.01) | |
| H01M 4/02 | (2006.01) | |
| H01M 4/04 | (2006.01) | |
| H01M 4/1391 | (2010.01) | |

(52) U.S. Cl.
CPC ........... *H01M 4/485* (2013.01); *H01M 4/505* (2013.01); *H01M 4/525* (2013.01); *H01M 4/5825* (2013.01); H01M 4/0483 (2013.01); H01M 4/1391 (2013.01); H01M 4/1397 (2013.01); H01M 10/0525 (2013.01); H01M 2004/028 (2013.01)

(58) Field of Classification Search
CPC ...... H01M 4/364; H01M 4/485; H01M 4/505; H01M 4/525; H01M 4/582; H01M 4/5825; H01M 10/0525; H01M 2004/028
See application file for complete search history.

(56) References Cited

U.S. PATENT DOCUMENTS

| | | |
|---|---|---|
| 3,764,380 A | 10/1973 | Grossman |
| 3,918,988 A | 11/1975 | Abens |
| 3,972,729 A | 8/1976 | Mosetti et al. |
| 4,007,122 A | 2/1977 | Owens et al. |
| 4,127,708 A | 11/1978 | Liang et al. |
| 4,312,718 A | 1/1982 | Watanabe et al. |
| 4,367,267 A | 1/1983 | Oi |
| 4,463,212 A | 7/1984 | Imai |
| 4,476,204 A | 10/1984 | Auborn |
| 4,544,615 A | 10/1985 | Shishikura et al. |
| 4,560,633 A | 12/1985 | Kobayashi et al. |
| 4,589,197 A | 5/1986 | North |
| 4,840,859 A | 6/1989 | Williams et al. |
| 4,845,015 A | 7/1989 | Kurematsu et al. |
| 5,069,764 A | 12/1991 | Watanabe et al. |
| 5,296,318 A | 3/1994 | Gozdz et al. |
| 5,360,686 A | 11/1994 | Peled et al. |
| 5,522,955 A | 6/1996 | Brodd |
| 5,670,277 A | 9/1997 | Barker et al. |
| 5,738,957 A | 4/1998 | Amine et al. |
| 5,744,258 A | 4/1998 | Bai et al. |
| 5,788,738 A | 4/1998 | Pizada et al. |
| 5,759,720 A | 6/1998 | Amatucci |
| 5,783,332 A | 7/1998 | Amine et al. |
| 5,792,574 A | 8/1998 | Mitate et al. |
| 5,824,434 A | 10/1998 | Kawakami et al. |
| 5,945,163 A | 8/1999 | Powel et al. |
| 5,965,293 A | 10/1999 | Idota et al. |
| 6,037,095 A | 3/2000 | Miyasaka |
| 6,037,241 A | 3/2000 | Powell et al. |
| 6,087,042 A | 7/2000 | Sugiyama et al. |
| 6,168,884 B1 | 1/2001 | Neudecker et al. |
| 6,204,219 B1 | 3/2001 | Brezny et al. |
| 6,333,128 B1 | 12/2001 | Sunagawa et al. |
| 6,379,841 B1 | 4/2002 | Potanin et al. |
| 6,413,673 B1 | 7/2002 | Kasai et al. |
| 6,420,069 B2 | 7/2002 | Amine et al. |
| 6,423,131 B1 | 7/2002 | Seeger et al. |
| 6,432,581 B1 | 8/2002 | Amatucci et al. |
| 6,495,481 B1 | 12/2002 | Margaryan |
| 6,517,974 B1 | 2/2003 | Kobayashi et al. |
| 6,635,114 B2 | 10/2003 | Zhao et al. |
| 6,645,452 B1 | 11/2003 | Barker et al. |
| 6,677,082 B2 | 1/2004 | Thackeray et al. |
| 6,680,143 B2 | 1/2004 | Thackeray et al. |
| 6,680,145 B2 | 1/2004 | Obrovac et al. |
| 6,686,090 B2 | 2/2004 | Inagaki et al. |
| 6,689,192 B1 | 2/2004 | Phillips et al. |
| 6,719,848 B2 | 4/2004 | Faykosh et al. |
| 6,753,112 B2 | 6/2004 | Ooya et al. |
| 6,756,155 B1 | 6/2004 | Kweon et al. |
| 6,835,499 B2 | 12/2004 | Phillips |
| 6,890,686 B1 | 5/2005 | Barker |
| 6,964,828 B2 | 11/2005 | Lu et al. |
| 6,974,486 B1 | 12/2005 | Kweon et al. |
| 6,982,132 B1 | 1/2006 | Goldner et al. |
| 7,078,128 B2 | 7/2006 | Lu et al. |
| 7,135,252 B2 | 11/2006 | Thackeray et al. |
| 7,169,471 B1 | 1/2007 | Dreher et al. |
| 7,205,073 B2 | 4/2007 | Kim et al. |
| 7,314,684 B2 | 1/2008 | Kang et al. |
| 7,371,338 B2 | 5/2008 | Amatucci |
| 7,468,223 B2 | 12/2008 | Thackeray et al. |
| 7,517,613 B2 | 4/2009 | Yuasa et al. |
| 7,625,671 B2 | 12/2009 | Amatucci |
| 7,709,149 B2 | 5/2010 | Paulsen et al. |
| 7,780,787 B2 | 8/2010 | Nolan |
| 7,793,611 B2 | 9/2010 | Oladeji |
| 7,910,166 B2 | 3/2011 | Powell et al. |
| 7,927,659 B2 | 4/2011 | Powell et al. |
| 7,931,937 B2 | 4/2011 | Powell et al. |
| 7,947,392 B2 | 5/2011 | Amatucci et al. |
| 7,968,145 B2 | 6/2011 | Powell et al. |
| 7,968,235 B2 | 6/2011 | Amine et al. |
| 8,039,149 B2 | 10/2011 | Amatucci et al. |
| 8,225,744 B2 | 7/2012 | Oladeji |
| 8,241,791 B2 | 8/2012 | Lu et al. |
| 8,268,198 B2 | 9/2012 | Shin et al. |
| 8,277,683 B2 | 10/2012 | Deng et al. |
| 8,388,754 B2 | 3/2013 | Powell et al. |
| 8,389,160 B2 | 3/2013 | Venkatachalam et al. |
| 8,449,950 B2 | 5/2013 | Shang et al. |
| 8,465,602 B2 | 6/2013 | Shmyreva et al. |
| 8,492,030 B2 | 7/2013 | Park et al. |
| 8,518,604 B2 | 8/2013 | Amatucci et al. |
| 8,591,774 B2 | 11/2013 | Koenig et al. |
| 8,623,549 B2 | 1/2014 | Pereira et al. |
| 8,685,565 B2 | 4/2014 | Lu et al. |
| 8,865,348 B2 | 10/2014 | Sun et al. |
| 8,951,668 B2 | 2/2015 | Pereira et al. |
| 9,048,497 B2 | 6/2015 | Amatucci et al. |
| 9,065,137 B2 | 6/2015 | Amatucci et al. |
| 9,070,945 B2 | 6/2015 | Amatucci et al. |
| 9,203,082 B2 | 12/2015 | Pereira et al. |
| 9,543,564 B2 | 1/2017 | Fasching et al. |
| 2001/0046629 A1 | 11/2001 | Inagaki et al. |
| 2002/0086208 A1 | 7/2002 | Hayashi et al. |
| 2002/0098411 A1 | 7/2002 | Gan et al. |
| 2002/0168573 A1 | 11/2002 | Baker et al. |
| 2003/0013019 A1 | 1/2003 | Barker et al. |
| 2003/0148188 A1 | 8/2003 | Umemoto |
| 2003/0170550 A1 | 9/2003 | Ugawa et al. |
| 2004/0062994 A1 | 4/2004 | Amatucci et al. |
| 2004/0121235 A1 | 6/2004 | Amatucci |
| 2004/0126300 A1 | 7/2004 | Barker et al. |
| 2004/0126659 A1 | 7/2004 | Graetz et al. |
| 2004/0185346 A1 | 9/2004 | Takeuchi |
| 2004/0191633 A1 | 9/2004 | Johnson et al. |
| 2005/0003270 A1 | 1/2005 | Phillips |
| 2005/0136328 A1 | 6/2005 | Eylem et al. |
| 2005/0164084 A1 | 7/2005 | Adamson et al. |
| 2006/0014078 A1 | 1/2006 | Swoyer et al. |
| 2006/0019163 A1* | 1/2006 | Amatucci ............... H01M 4/58 429/220 |
| 2006/0035147 A1 | 2/2006 | Lam et al. |
| 2006/0036474 A9 | 2/2006 | Brugger et al. |
| 2006/0199886 A1 | 9/2006 | Ryang |
| 2007/0007109 A1 | 1/2007 | Powell et al. |

(56) References Cited

U.S. PATENT DOCUMENTS

| | | |
|---|---|---|
| 2007/0009800 A1 | 1/2007 | Barker et al. |
| 2007/0042264 A1 | 2/2007 | Desilvestro et al. |
| 2007/0134427 A1 | 6/2007 | Kalynushkin et al. |
| 2007/0188979 A1 | 8/2007 | Takeda et al. |
| 2007/0190414 A1 | 8/2007 | Amatucci et al. |
| 2007/0221635 A1 | 9/2007 | Boulos et al. |
| 2007/0237894 A1 | 10/2007 | Powell |
| 2007/0243466 A1 | 10/2007 | Amatucci et al. |
| 2008/0003496 A1 | 1/2008 | Neudecker et al. |
| 2008/0034579 A1 | 2/2008 | Potanin |
| 2008/0044571 A1 | 2/2008 | Maltby |
| 2008/0081259 A1 | 4/2008 | Freitag et al. |
| 2008/0102373 A1 | 5/2008 | Potanin |
| 2008/0153002 A1 | 6/2008 | Nazar et al. |
| 2008/0199772 A1 | 8/2008 | Amatucci et al. |
| 2008/0238294 A1 | 10/2008 | Xu et al. |
| 2008/0283048 A1 | 11/2008 | Petersen |
| 2008/0299703 A1 | 12/2008 | Oladeji |
| 2008/0314482 A1 | 12/2008 | Suzuki et al. |
| 2009/0004560 A1 | 1/2009 | Amatucci et al. |
| 2009/0029237 A1 | 1/2009 | Yazami |
| 2009/0087362 A1 | 4/2009 | Sun et al. |
| 2009/0246940 A1 | 10/2009 | Powell |
| 2010/0068376 A1 | 3/2010 | Chen et al. |
| 2010/0151332 A1 | 6/2010 | Lopez et al. |
| 2010/0159324 A1 | 6/2010 | Irvin et al. |
| 2010/0210059 A1 | 8/2010 | Milshtein |
| 2010/0210453 A1 | 8/2010 | Hu et al. |
| 2010/0216032 A1 | 8/2010 | Baba et al. |
| 2010/0297502 A1 | 11/2010 | Zhu et al. |
| 2010/0323098 A1 | 12/2010 | Kosuzu et al. |
| 2011/0006254 A1 | 1/2011 | Richard et al. |
| 2011/0027940 A1 | 2/2011 | Oladeji |
| 2011/0039401 A1 | 2/2011 | Nolan |
| 2011/0045206 A1 | 2/2011 | Shang et al. |
| 2011/0065001 A1 | 3/2011 | Pereira et al. |
| 2011/0076556 A1 | 3/2011 | Karthikeyan et al. |
| 2011/0132261 A1 | 6/2011 | Powell et al. |
| 2011/0132262 A1 | 6/2011 | Powell et al. |
| 2011/0132263 A1 | 6/2011 | Powell et al. |
| 2011/0171398 A1 | 7/2011 | Oladeji |
| 2011/0171528 A1 | 7/2011 | Oladeji |
| 2011/0200883 A1 | 8/2011 | Cui et al. |
| 2011/0260099 A1 | 10/2011 | Paulsen et al. |
| 2012/0009469 A1 | 1/2012 | Visco et al. |
| 2012/0032118 A1 | 2/2012 | Fichtner et al. |
| 2012/0056470 A1 | 3/2012 | Kim |
| 2012/0064395 A1 | 3/2012 | Chang et al. |
| 2012/0077082 A1 | 3/2012 | Se-Hee et al. |
| 2012/0100431 A1 | 4/2012 | Yao |
| 2012/0171469 A1 | 7/2012 | Shmyreva |
| 2012/0225356 A1 | 9/2012 | Wietelmann |
| 2012/0244429 A1 | 9/2012 | Lam et al. |
| 2012/0263998 A1 | 10/2012 | Thackeray et al. |
| 2013/0048924 A1 | 2/2013 | Amatucci et al. |
| 2013/0177821 A1 | 7/2013 | Tsuchida et al. |
| 2013/0202502 A1 | 8/2013 | Schulz-Dobrick et al. |
| 2013/0224594 A1 | 8/2013 | Yushin |
| 2013/0236764 A1 | 9/2013 | Hu |
| 2013/0252064 A1 | 9/2013 | Kuriki et al. |
| 2013/0302682 A1 | 11/2013 | Amatucci et al. |
| 2013/0335030 A1 | 12/2013 | Joe |
| 2013/0344391 A1 | 12/2013 | Yushin et al. |
| 2014/0050656 A1 | 2/2014 | Kang et al. |
| 2014/0087092 A1 | 3/2014 | Nieh et al. |
| 2014/0117291 A1 | 5/2014 | Amatucci et al. |
| 2014/0170493 A1* | 6/2014 | Holme .................... H01M 4/04 429/220 |
| 2014/0193714 A1 | 7/2014 | Kim et al. |
| 2014/0234715 A1 | 8/2014 | Fasching et al. |
| 2014/0264190 A1* | 9/2014 | Tong .................... H01M 4/364 252/512 |
| 2014/0272564 A1 | 9/2014 | Holme et al. |
| 2014/0272568 A1 | 9/2014 | Frianeza-Kullberg |
| 2014/0284526 A1 | 9/2014 | Shan |
| 2014/0317912 A1 | 10/2014 | Holme et al. |
| 2014/0322603 A1 | 10/2014 | Holme et al. |
| 2015/0050522 A1 | 2/2015 | Manthiram et al. |
| 2015/0099169 A1 | 4/2015 | Dudney et al. |
| 2015/0207140 A1 | 7/2015 | Amatucci et al. |
| 2015/0236341 A1 | 8/2015 | Amatucci et al. |
| 2016/0049655 A1 | 2/2016 | Fasching et al. |
| 2016/0093874 A1 | 3/2016 | Stimson et al. |
| 2016/0164135 A1 | 6/2016 | Fasching et al. |

FOREIGN PATENT DOCUMENTS

| | | | |
|---|---|---|---|
| CN | 101901936 | * | 12/2010 |
| CN | 101901936 A | | 12/2010 |
| CN | 102388487 A | | 3/2012 |
| DE | 39 30 804 | | 3/1991 |
| EP | 0 149 421 | | 7/1985 |
| EP | 0 651 450 | | 5/1995 |
| EP | 0 938 147 | | 8/1999 |
| EP | 1 049 182 A2 | | 11/2000 |
| EP | 1 914 823 B1 | | 2/2010 |
| EP | 1540752 B1 | | 3/2010 |
| EP | 2 615 057 | | 7/2013 |
| EP | 2 816 639 A2 | | 12/2014 |
| JP | H08-138635 | | 5/1996 |
| JP | 2008-527652 A | | 7/2008 |
| JP | 2009-016234 | | 1/2009 |
| JP | 2009-529222 A | | 8/2009 |
| JP | 2013-073792 | * | 4/2013 |
| JP | 2013-073792 A | | 4/2013 |
| KR | 2001-0063879 | | 7/2001 |
| WO | WO 2001/063879 A1 | | 8/2001 |
| WO | WO 2002/097907 A2 | | 12/2002 |
| WO | WO 2004/034489 A2 | | 4/2004 |
| WO | WO 2006/026773 A2 | | 3/2006 |
| WO | WO 2006/078472 A2 | | 7/2006 |
| WO | WO 2006/137903 A3 | | 12/2006 |
| WO | WO 2007/146453 A2 | | 12/2007 |
| WO | WO2008095197 A2 | | 8/2008 |
| WO | WO 2009/143324 A1 | | 11/2009 |
| WO | WO 2011/057263 | | 5/2011 |
| WO | WO 2012/176907 A1 | | 12/2012 |
| WO | WO 2013/133906 | | 9/2013 |
| WO | WO2013192205 A1 | | 12/2013 |
| WO | WO2014186634 A2 | | 11/2014 |
| WO | WO2014197751 A1 | | 12/2014 |
| WO | WO2015054320 A2 | | 4/2015 |
| WO | WO 2015/130831 A1 | | 9/2015 |

OTHER PUBLICATIONS

Lee, D.H., et al. "Conversion Mechanism of Nickel Fluoride and NiO-doped Nickel Fluoride in Li Ion Batteries", Electrochimica Acta, 2012, vol. 59, pp. 213-221.*

Notification of Transmittal of the International Search Report and the Written Opinion of the International Searching Authority, or the Declaration for International Appln. No. PCT/US2015/045332 dated Nov. 23, 2015, 17 pages.

Wang, F. et al., "Ternary Metal Fluorides As New Cathodes of Rechargable Lithium Batteries with Ultrahigh Energy Density," The Electrochemical Society, 2014, 2 pages.

"European Application Serial No. 14169514.8, Search Report dated Apr. 14, 2015", Apr. 14, 2015, 6 pgs.

Al-Sharab, J. F., et al. "EELS Compositional and Valence Mapping in Iron Fluoride-Carbon Nanocomposites", Journal of Nanoparticle Research, 15: 1500; Mar. 2013, 12 pages.

Amatucci, G. G., et al. "Formation of Lithium Fluoride/Metal Nanocomposites for Energy Storage through Solid State Reduction of Metal Fluorides", Journal of Fluorine Chemistry, 2011, vol. 132, pp. 1086-1094.

Arai, H., "Cathode Performance and Voltage Estimation of Metal Trihalides", Journal of Power Sources, 68, 1997, p. 716-719.

Arai, H., et al. "Characterization and Cathode Performance of Li1-xNi1+xO2 Prepared with the Excess Lithium Method", Solid State Ionics 80, 1995, pp. 261-269.

(56) References Cited

OTHER PUBLICATIONS

Badway, F., et al. "Carbon Metal Fluoride Nanocomposites—High-Capacity Reversible Metal Fluoride Conversion Materials as Rechargeable Positive Electrodes for Li Batteries", Journal of the Electrochemical Society, vol. 150, Issue 10, 2003, pp. A1318-A1327.
Badwa Y, F., et al. "Structure and Electrochemistry of Copper Fluoride Nanocomposites Utilizing Mixed Conducting Matrices", Chemistry of Materials, 2007, vol. 19 (17), pp. 4129-4141.
Behl, W. K., and Read, J. A. "A Study of Cobalt and Manganese Fluorides as Cathode Materials for Rechargeable Lithium Cells", ECS Transactions, 2012, vol. 41, Issue 41, pp. 97-106.
Bervas, M., et al. "Investigation of the Lithiation and Delithiation Conversion Mechanisms of Bismuth Fluoride Nanocomposites", Journal of the Electrochemical Society, 2006, vol. 153, Issue 4, pp. A799-A808.
Cabana, J., et al. "Beyond Intercalation-Based Li-Ion Batteries: The State of the Art and Challenges of Electrode Materials Reacting Through Conversion Reactions", Advanced Materials, vol. 22, Issue 35, Sep. 15, 2010, pp. E170-E192.
Chevrier, V. L., et al. "First-Principles Study of Iron OxyFluorides and Lithiation of FeOF", Physical Review B 87, 094118, Mar. 29, 2013, 9 pages.
Cui, Y., et al. "The Investigation on Electrochemical Reaction Mechanism of CuF2 Thin Film with Lithium", Electrochimica Acta, 2011, vol. 56, pp. 2328-2335.
Cui, Y., et al. "Electrochemical Properties of MnF2 Films Fabricated by Pulsed Laser Deposition", Journal of Inorganic Material.
Doe, R., et al. "First Principles Investigation of Li-Fe-F Phase diagram and Equilibrium and Nonequilibrium Conversion Reactions of Iron Fluorides with Lithium", Chemistry of Materials, 2008, vol. 20, No. 16, pp. 5274-5283.
Doe, R., et al. "First Principles Study of Li-B i-F Phase Diagram and Bismuth Fluoride Conversion Reactions with Lithium", Electrochemical and Solid State Letters, 2009, vol. 12(7), pp. A125-A128.
Ezema, F. I. and Nnabuchi, M. N. "Optical Properties of Chemical Bath Deposited Bismuth Fluoride (Bif3) Thin Films", Discovery and Innovation vol. 19 (1), 2007, pp. 33-36.
Fu, Z.W., et al. "Electrochemical Reaction of Lithium with Cobalt Fluoride Thin Film Electrode", Journal of the Electrochemical Society, 2005, vol. 152, Issue 2, pp. E50-E55.
Gmitter, A. J., et al. "Electrolyte Development for Improved Cycling Performance of Bismuth Fluoride Nanocomposite Positive Electrodes", Journal of Power Sources vol. 217, 2012, pp. 21-28.
Gmitter, A. J., et al. "Formation, Dynamics, and Implication of Solid Electrolyte Interphase in High Voltage Reversible Conversion Fluoride Nanocomposites", Journal of Materials Chemistry, vol. 20, No. 20, May 28, 2010, pp. 4149-4161.
Gocheva, I. D., et al. "Direct Synthesis of Cryolite Type Li3FeF6 and Its Characterization as Positive Electrode in Li Cell", Engineering Sciences Reports, Kyushu University, vol. 31, No. 1, pp. 7-11.
Johnson, Z., et al. "Advanced FeF3 Cathode Enabled Lithium-ion Battery", SAE International Journal of Aerospace, Apr. 2009, vol. 1, No. 1, pp. 1018-1023.
Kim, S., et al. "Fabrication of FeF3 Nanoflowers on CNT Branches and Their Application to High Power Lithium Rechargeable Batteries", Advanced Materials, 2010, vol. 22, pp. 5260-5264.
Larcher, D., et al. "Effect of Particle Size on Lithium Intercalation into a-Fe2O3", Journal of the Electrochemical Society, 2003, vol. 150 (1), pp. A133-A139.
Li, C., et al. "A Mesoporous Iron-Based Fluoride Cathode of Tunnel Structure for Rechargeable Lithium Batteries", Advanced Functional Materials, 2011, vol. 27, pp. 1391-1397.
Li, C., et al. "Carbon Nanotube Wiring of Electrodes for High-Rate Lithium Batteries Using an Imidazolium-Based Ionic Liquid Precursor as Dispersant and Binder: A Case Study on Iron Fluoride Nanoparticles", ACS Nano, 2011, vol. 5, Issue 4, pp. 2930-2938.
Li, C., et al. "Low-Temperature Ionic-Liquid-Based Synthesis of Nanostructured Iron-Based Fluoride Cathodes for Lithium Batteries", Advanced Materials, 2010, vol. 22, pp. 3650-3654.
Li, L., et al. "High-Capacity Lithium-ion Battery Conversion Cathodes Based on Iron Fluoride Nanowires and Insights into the Conversion Mechanism", Nano Letters, vol. 12 (11), pp. 6030-6037.
Li, R. F., et al. "Structural and Electronic Properties of Li-Ion Battery Cathode Material FeF3", The Journal of Physical Chemistry C, 2010, vol. 114(39), pp. 16813-16817.
Li, T., et al. "Reversible Three-Electron Redox Behaviros of FeF3 Nanocrystals as High-Capacity Cathode-Active Materials for Li-Ion Batteries", Journal of Physical Chemistry C, Feb. 25, 2010, vol. 114, Issue 7, pp. 3190-3195.
Liao, P., et al. "Combinatorially Prepared [LiF]1-xFex Nanocomposites for Positive Electrode Materials in Li-Ion Batteries", Chemistry of Materials, 2008, vol. 20 (2), pp. 454-461.
Liu, L., et al. "Excellent Cycle Performance of Co-doped FeF3/C Nanocomposite Cathode Material for Lithium-ion Batteries", Journal of Materials Chemistry, 2012, Issue 22, pp. 17539-17550.
Liu, P., et al. "Thermodynamics and Kinetics of the Li/FeF3 Reaction by Electrochemical Analysis", The Journal of Physical Chemistry C, 2012, vol. 116(10), pp. 6467-6473.
Ma, Y. and Garofalini, S. H. "Atomistic Insights into the Conversion Reaction in Iron Fluoride: A Dynamically Adaptive Force Field Approach", Journal of the American Chemical Society, 2012, vol. 132, pp. 8205-8211.
Ma, D., et al. "Three-Dimensionally Ordered Macroporous FeF3 and its in situ Homogenous Polymerization Coating for High Energy and Power Density Lithium Ion Batteries", Energy & Environmental Science, 2012, 5, pp. 8538-8542.
Makimura, Y., et al. "Electrochemical behavior of low temperature grown iron fluoride thin films", Electrochemistry Communications, 2006, vol. 8, pp. 1769-1774.
Makimura, Y, et al. "Pulsed Laser Deposited Iron Fluoride Thin Films for Lithium-ion Batteries", Applied Surface Science 252 (2006), p. 4587-4592.
Mansour, A.N., et al. "In Situ X-ray Absorption Spectroscopic Investigation of the Electrochemical Conversion Reactions of CuF2-MoO3 Nanocomposite", Journal of Solid State Chemistry, 2010, vol. 183, pp. 3029-3038.
Naghash, A. R. and Lee, J. Y. "Lithium Nickel Oxyfluoride (Li1-zNi1+zFy02-y) and Lithium Magnesium Nickel Oxide (Li1-z(MgxNi1-x)1 +z02) Cathodes for Lithium Rechargeable Batteries: Part I. Synthesis and Characterization of Bulk Phases", Electrochimica Acta, 2001, vol. 46, pp. 941-951.
Nishijima, M., et al. "Cathode Properties of Metal Trifluorides in Li and Na Secondary Batteries", Journal of Power Sources, 2009, vol. 190, pp. 552-562.
Parkinson, M. F., et al. "Effect of Vertically Structured Porosity on Electrochemical Performance of FeF2 Films for Lithium Batteries", Electrochemica Acta, Apr. 2014, vol. 125, p. 71-82.
Pereira, N., et al. "Iron Oxyfluorides as High Capacity Cathode Materials for Lithium Batteries", Journal of the Electrochemical Society, 2009, vol. 156 (6), pp. A407-A416.
Plitz, I., et al. "Structure and Electrochemistry of Carbon-Metal Fluoride Nanocomposites Fabricated by Solid-State Redox Conversion Reaction", Journal of the Electrochemical Society, 152 (2), 2005, A307-A315.
Poizot, P., et al. "Nano-sized Transition-Metal Oxides as Negative-Electrode Materials for Lithium-Ion Batteries", Letters to Nature, Sep. 28, 2000, vol. 407, pp. 496-499.
Prakash, R., et al. "Ferrocene-Based Carbon-Iron Lithium Fluoride Nanocomposite as a Stable Electrode Material in Lithium Batteries", Journal of Materials Chemistry, 2010, vol. 20, pp. 1871-1876.
Prakash, R., et al. "Modified Synthesis of [Fe/LiF/C] Nanocomposite, and its Application as Conversion Cathode Material in Lithium Batteries", Journal of Power Sources, 196, 2011, p. 5936-5944.
Rangan, S., et al. "Conversion Reaction of FeF2 Thin Films Upon Exposure to Atomic Lithium", Journal of Physical Chemistry, 2012, vol. 116 (19), pp. 10498-10503.
Rangan, S., et al. "Electronic Structure and Chemical Composition of Candidate Conversion Material Iron Oxifluoride", 220th ECS Meeting.
Rangan, S., etal. "Abstract #1473, Electronic Structure and Chemical Composition of Candidate Conversion Material Iron Oxifluoride", 220th ECS Meeting.

(56) References Cited

OTHER PUBLICATIONS

Reddy, M.A. and Fichtner, M. "Batteries Based on Fluoride Shuttle", Journal of Materials Chemistry, 2011, vol. 21, pp. 17059-17062.

Reddy, M.A., et al. "CFx Derived Carbon-FeF2 Nanocomposites for Reversible Lithium Storage", Advanced Energy Materials, vol. 3, Issue 3, Mar. 2013, pp. 308-313.

Sharafat, S., and Ghodiem, N. M. "Chemical Compatibility of Structural Materials with Liquid Li and Sn-Li", APEX Meeting, May 10-12, 2000, Argonne National Laboratory, 31 pages.

Shearer-Turrell, S., et al. "Structural Studies of Iron Hexafluorides: Infrared Spectra of M3FeF6 (M=Li, Na, K, Rb, Cs, Ag, Ti)", Journal of Molecular Structure, 1971, vol. 7, pp. 289-300.

Tressaud, et al. "Les Hexafluoferrites MzFeF6 (M=Li, Na, K, Rb, Cs, Ag, Ti, NH4): Etude Radiocristallographique, Spectroscopique et Magnetique", Journal of Inorganic and Nuclear Chemistry, 1970, vol. 32, pp. 2179-2186.

Wang, F., et al. "Conversion Reaction Mechanisms in Lithium Ion Batteries: Study of the Binary Metal Fluoride Electrodes", Journal of the American Chemical Society, vol. 133 (46), pp. 18828-18836.

Wang, F., et al. "Ionic and Electronic Transport in Metal Fluoride Conversion Electrodes", Northeastern Center for Chemical Energy Storage, PRiME 2012, 222nd Meeting Electrochemical Society, Oct. 9, 2012, 23 pages.

Wang, F., et al. "Tracking Lithium Transport and Electrochemical Reactions in Nanoparticles", Nature Communications, vol. 3, Nov. 13, 2012, 8 pages.

Wiaderek, K. M., et al. "Comprehensive Insights into the Structural and Chemical Changes in Mixed- Anion FeOF Electrodes by Using Operando PDF and NMR Spectroscopy", Journal of the American Chemical Society, Jan. 8, 2013, 22 pages.

Yamakawa, N., et al. "Identifying the Local Structures Formed During Lithiation of the Conversion Material, Iron Fluoride, in a Li Ion Battery: A Solid-State NMR, X-ray Diffraction, and Pair Distribution Function Analysis Study", Journal of American Chemical Society, 131, 2009, p. 10525-10536.

Yamakawa, N., et al. "Investigation of the Conversion Reaction Mechanisms for Binary Copper (II) Compounds by Solid-State NMR Spectroscopy and X-ray Diffraction", Chemistry of Materials, 2009, vol. 21, pp. 3162-3176.

Yang, Z., et al. "First Principles Study on the Structural, Magnetic and Electronic Properties of Co-doped FeF3", Computational and Theoretical Chemistry, 2012, vol. 980, pp. 44-48.

Yao, W., et al. "Multilayered Cobalt Oxide Platelets for Negative Electrode Material of a Lithium-ion Battery", Journal of the Electrochemical Society, 2008, vol. 155, Issue 12, pp. A903-A908.

Zhang, H., et al. "Nanostructured Nickel Fluoride Thin Film as a New Li Storage Material", Solid State Sciences, 2008, vol. 10, pp. 1166-1172.

Zhang, W., et al. "Synthesis and Characterization of in Situ Fe2O3-Coated FeF3 Cathode Materials for Rechargeable Lithium Batteries", Journal of Materials Chemistry, 2012, vol. 22, pp. 24769-24775.

Zhou, M., et al. "Thermal Stability of FeF3 Cathode for Li-ion batteries", Journal of Power Sources, 195, 2010, p. 4952-4956.

Zhou, Y., et al. "LiF/Co Nanocomposite as a New Li Storage Material", Electrochemical and Solid-State Letters, vol. 9, No. 3, 2006, p. A147-A150.

Zu, C. and Li, H. "Thermodynamic Analysis on Energy Densities of Batteries", Energy & Environmental Science, 2011, vol. 4, pp. 2614-2624.

"European Application Serial No. 14169514.8, Search Report dated Apr. 14, 2015", dated Apr. 14, 2015, 6 pgs.

Li, C., et al. "Carbon Nanotube Wiring of Electrodes for High-Rate Lithium Batteries Using an lmidazolium-Based Ionic Liquid Precursor as Dispersant and Binder: A Case Study on Iron Fluoride Nanoparticles", ACS Nano, 2011, vol. 5, Issue 4, pp. 2930-2938.

Naghash, A. R. And Lee, J. Y. "Lithium Nickel Oxyfluoride (Li1-zNi1+zFy02-y) and Lithium Magnesium Nickel Oxide (Li1-z(MgxNi1-x)1 +z02) Cathodes for Lithium Rechargeable Batteries: Part I. Synthesis and Characterization of Bulk Phases", Electrochimica Acta, 2001, vol. 46, pp. 941-951.

U.S. Appl. No. 90/012,243, dated Jul. 19, 2013, Thackeray et al.

Adam, "Fluoride glass research in France: fundamentals and applications", Journal of Fluorine Chemistry, vol. 107, Feb. 2001, pp. 265-270.

Amaresh et al., "Facile synthesis of $ZrO_2$ coated $Li_2CoPO_4F$ cathode materials for lithium secondary batteries with improved electrochemical properties," Journal of Power Sources, 2013, vol. 244, pp. 395-402.

Amatucci et al., "Fluoride Based Electrode Materials for Advanced Energy Storage Devices", Journal of Fluorine Chemistry 128, 2007, available online Dec. 13, 2006, pp. 243-262.

Amine et al., "A New Three-Volt Spinel $Li_{1+x}Mn_{1.5}Ni_{0.5}O_4$ for Secondary Lithium Batteries," J. Electrochem. Soc., vol. 143, No. 5, May 1996, pp. 1607-1613.

Arico et al., "Nanostructured Materials for Advanced Energy conversion and Storage Devices", Nature Materials, May 2005, vol. 4, pp. 366-377.

Ariyoshi et al., "Structural change of $LiNi_{1/2}Mn_{1/2}O_2$ during charge and discharge in nonaqueous lithium cells," Journal of Physics and Chemistry of Solids, 2008, vol. 69, pp. 1238-1241.

Armstrong et al., "Synthesis of Layered $LiMnO_2$ as an Electrode for Rechargeable Lithium Batteries", Nature, Jun. 6, 1996, vol. 381, pp. 499-500.

Armstrong et al., "Demonstrating Oxygen Loss and Associated Structural Reorganization in the Lithium Battery Cathode $Li[Ni_{0.2}Li_{0.2}Mn_{0.6}]O_2$," J. Am. Chem. Soc. 2006, vol. 128, pp. 8694-8698.

Armstrong et al., "The Layered Intercalation Compounds $Li(Mn_{1-y}Co_y)O_2$: Positive Electrode Materials for Lithium-Ion Batteries," Journal of Solid State Chemistry, vol. 145, 1999, pp. 549-556.

Ates et al., "A Li-Rich Layered Cathode Material with Enhanced Strucutural Stability and Rate Capability for Li-ion Batteries" Journal of the Electrochemical Society, 161 (3), 2014, pp. A355-A363.

Ates et al., "Mitigation of Layered to Spinel Conversion of a Li-Rich Layered Metal Oxide Cathode Material for Li-Ion Batteries," Journal of the Electrochemical Society, 161 (3), 2014, pp. A290-A301.

Aurbach et al., "Studies of Aluminum-Doped $LiNi_{0.5}Co_{0.2}Mn_{0.3}O_2$: Electrochemical Behavior, Aging, Structural Transformations, and Thermal Characteristics," Journal of the Electrochemical Society, 162 (6), (2015), pp. A1014-A1027.

Badway, F. et al., "Carbon Metal Fluoride Nanocomposites", Journal of Electrochemcial Society, 2003, available electronically Jul. 17, 2003, vol. 150, No. 9, pp. A1209-A1218.

Bains et al., "$Li(Ni_{0.40}Mn_{0.40}Co_{0.15}Al_{0.05})O_2$: A promising positive electrode material for high-power and safe lithium-ion batteries," Journal of Power Sources, 2011, vol. 196, pp. 8625-8631.

Bareño al., "Local Structure of Layered Oxide Electrode Materials for Lithium-Ion Batteries," Adv. Mater., 2010, vol. 22, pp. 1122-1127.

Bareño et al., "Long-Range and Local Structure in the Layered Oxide $Li_{1.2}Co_{0.4}Mn_{0.4}O_2$," Chem. Mater., 2011, vol. 23, pp. 2039-2050.

Benedek et al., "Theory of Overlithiation Reaction in $LiMO_2$ Battery Electrodes," Chem. Mater., 2006, vol. 18, pp. 1296-1302.

Bervas et al., "Bismuth fluoride nanocomposite as a positive electrode material for rechargeable lithium batteries", Electrochemical Solid-State Letters, 2005, available electronically Feb. 10, 2005, vol. 8, No. 4, pp. A179-A183.

Bervas et al., "Reversible conversion reactions with lithium in bismuth oxyfluoride nanocomposites", Journal of the Electrochemical Society, 2006, vol. 153, No. 1, pp. A159-A170.

Bettge et al., "Improving high-capacity $Li_{1.2}Ni_{0.15}Mn_{0.55}Co_{0.1}O_2$-based lithium-ion cells by modifiying the positive electrode with alumina," Journal of Power Sources, 2013, vol. 233, pp. 346-357.

Bhattacharya et al., "Prediction of Quaternary Spinel Oxides as Li-Battery Cathodes: Cation Site Preference, Metal Mixing, Voltage and Phase Stability," Journal of the Electrochemical Society, 161 (9), 2014, pp. A1440-A1446.

(56) References Cited

OTHER PUBLICATIONS

Bobe et al., "Ion conductivity and diffusion in $ZrF_4$-based fluoride glasses containing LiF ($0 \leq x_{LiF} \leq 0.60$)", Journal of Non-Crystalline Solids, Jan. 1997, vol. 209, pp. 122-136.

Caldin et al., "Kinetics and Thermodynamics of the Complex-formation of Nickel(II) and Cobalt(II) Ions with Ammonia and Pyridine-2-azodimethylaniline in Water, at Pressures from 1 bar to 2 kbar," Journal of the Chemical Society, Faraday Transactions 1, vol. 68, 1972, pp. 2247-2258.

Camardese et al., "Synthesis of Spherical Core-Shell $Ni(OH)_2$–$Ni_{1/2}Mn_{1/2}(OH)_2$ Particles via a Continuously Stirred Tank Reactor," Journal of the Electrochemical Society, 161 (6), 2014, pp. A890-A895.

Cheng et al., "Enhanced Cycleabity in Lithium Ion Batteries: Resulting from Atomic Layer Depostion of Al2O3 or $TiO_2$ on $LiCoO_2$ Electrodes," J. Phys. Chem. C, 2012, 116, pp. 7629-7637.

Chiang et al., "High Capacity, Temperature-Stable Lithium Aluminum Manganese Oxide Cathodes for Rechargeable Batteries," Electrochemical and Solid-State Letters, 1999, vol. 2, No. 3, pp. 107-110.

Chiba et al., "$Na_xLi_{0.7-x}Ni_{1-y}Mn_yO_2$ as a new positive electrode material for lithium-ion batteries," Journal of Power Sources, 2016, vol. 311, pp. 103-110.

Cho, Jaephil et al., "A Breakthrough in the Safety of Lithium Secondary Batteries by Coating the Cathode Material with $AIPO_4$ Nanoparticles," Angew. Chem. Int. Ed. 2003, 42, pp. 1618-1621.

Cho, Woosuk et al., "Improved electrochemical and thermal properties of nickel rich $LiNi_{0.6}Co_{0.2}Mn_{0.2}O_2$ cathode materials by $SiO_2$ coating," Journal of Power Sources, 282, 2015, 45-50.

Cho, Yonghyun et al., "A New Type of Protective Surface Layer for High-Capacity Ni-Based Cathode Materials: Nanoscaled Surface Pillaring Layer," Nano Lett., 2013, 13, pp. 1145-1152.

Cho, Yonghyun et al., *Supporting Information* "New Type of Protective Surface Layer for High-Capacity Ni-Based Cathode Materials: Nanoscaled Surface Pillaring Layer," Nano Lett., 2013, vol. 13, 16 pages.

Choi et al., "Factors Influencing the Layered to Spinel-like Phase Transition in Layered Oxide Cathodes," Journal of the Electrochemical Society, 2002, 149 (9), pp. A1157-A1163.

Choi et al., "Investigation of the Irreversible Capacity Loss in the Layered $LiNi_{1/3}Mn_{1/3}Co_{1/3}O_2$ Cathodes," Electrochemical and Solid-State Letters, 8 (8), 2005, pp. C102-C105.

Chung et al., "Comparative studies between oxygen-deficient $LiMn_2O_4$ and Al-doped $LiMn_2O_4$," Journal of Power Sources, 146, 2005, pp. 226-231.

Claims pending in Chinese Patent Application No. 201310302774.5 when Office action and Search Report of Chinese Application No. 201310302774.5 mailed; 7 pages.

Clause et al., "Preparation and Characterization of Nickel-Aluminum Mixed Oxides Obtained by Thermal Decomposition of Hydrotalcite-Type Precursors," Journal of Catalysis, 1992, vol. 133, pp. 231-246.

Conry et al., "Structural Underpinnings of the Enhanced Cycling Stability upon Al-Substitution in $LiNi_{0.45}Mn_{0.45}Co_{0.1-y}Al_yO_2$ Positive Electrode Materials for Li-ion Batteries," Chem. Mater. 2012, 24, pp. 3307-3317.

Cui et al. "Electrochemical Properties of $MnF_2$ Films Fabricated by Pulsed Laser Deposition," Journal of Inorganic Materials, 2010, 25(2), pp. 145-150. Abstract in English on the first page.

Definition of coextensive (www.dictionary.com) (Feb. 20, 2017).

Definition of overlap (www.dictionary.com) (Feb. 20, 2017).

Delmas et al. "Layered Li(Ni, M)$O_2$ Systems as the Cathode Material in Lithium-Ion Batteries," MRS Bulletin, Aug. 2002, pp. 608-612.

Deng et al., "Influence of Cationic Substitutions on the Oxygen Loss and Reversible Capacity of Lithium-Rich Layered Oxide Cathodes," J. Phys. Chem. C, 2011, 115, pp. 7097-7103.

Deng et al., "Nanostructured Lithium Nickel Manganese Oxides for Lithium-Ion Batteries," Journal of the Electrochemical Society, 157 (4), 2010, pp. A447-A452.

Doan et al., "Recent developments in synthesis of $xLi_2MnO_3 \cdot (1-x)LiMO_2$ (M=Ni, Co, Mn) cathode powders for high-energy lithium rechargeable batteries," Frontiers in Energy Research, Energy Storage, Sep. 2014, vol. 2, Article 36, 1 page.

Dou, Shumei, "Review and prospect of layered lithium nickel manganese oxide as cathode materials for Li-ion batteries," J Solid State Electrochem (2013) 17, pp. 911-926.

Dugat, P. et al., "Crystal Structures of $Li_4ZrF_8$ and $Li_3Zr_4F_{19}$ and Reinvestigation of the $LiF-ZrF_4$ Phase Diagram", Journal of Solid State Chemistry, Nov. 15,1995, vol. 120, pp. 187-196.

Dyatkin et al., "The Acidic Properties of Fluorine-Containing Alcohols, Hydroxylamines and OximeS," Tetrahedron, 1965, vol. 21, pp. 2991-2995.

El Mofid et al., "A high performance layered transition metal oxide cathode material obtained by simultaneous aluminum and iron cationic substitution," Journal of Power Sources, 2014, vol. 268, pp. 414-422.

Eom, et al. "Dependence of Electrochemical Behavior on Concentration and Annealing Temperature of $Li_xCoPO_4$ Phase-Grown $LiNi_{0.8}Co_{0.16}Al_{0.04}O_2$ Cathode Materials," Journal of the Electrochemical Society, 155 (3), 2008, pp. A228-A233.

Fiordiponti, P., et al., "Nonaqueous Batteries with $BiF_3$ Cathodes", Journal of the Electrochemical Society, Apr. 1978, vol. 125, No. 4, pp. 511-515.

Fu et al., "Nickel-Rich Layered Microspheres Cathodes: Lithium/Nickel Disordering and Electrochemical Performance" ACS Appl. Mater. Interfaces, 2014, vol. 6, No. 18, pp. 15822-15831.

Fu, Xian-Zhu et al., "Nickel oxyhydroxides with various oxidation states prepared by chemicaloxidation of spherical β-$Ni(OH)_2$," Solid State Ionics, vol. 178, 2007, pp. 987-993.

Gallagher, et al., "Correlating hysteresis and voltage fade in lithium- and manganese-rich layered transition-metal oxide electrodes," Electrochemistry Communications, vol. 33, 2013, pp. 96-98.

Ghosh et al., "Ion dynamics and mixed mobile ion effect in fluoride glasses", Journal of Applied Physics, Jun. 21, 2005, vol. 97, pp. 123525-1 through 123525-5.

Ghosh, S. et al., "Electrical conductivity and conductivity relaxation in mixed alkali fluoride glasses", Solid State Ionics, 2002, accepted Mar. 28, 2002, vol. 149, pp. 67-72.

Glaeser et al., "The Kinetics of Ammonia Exchange between Nickel Ammine Complexes and Ammonia in Aqueous and Anhydrous Ammonia Solutions Measured by Nuclear Magnetic Resonance of Nitrogen-14", Inorganic Chemistry, vol. 4, No. 2, Feb. 1965, pp. 206-208.

Gopalakrishnan, "Chimie Douce Approaches to the Synthesis of Metastable Oxide Materials," Chemistry of Materials, vol. 7, No. 7, Jul. 1995, pp. 1265-1275.

Gummow, R J et al., "Lithium Extraction From Orthorhombic Lithium Manganese Oxide and the Phase Transformation to Spinel," Mat. Res. Bull., vol. 28, 1993, pp. 1249-1256.

Gummow, R.J. et al., "Improved capacity retention in rechargeable 4 V lithium/lithiummanganese oxide (spinel) cells," Solid State Ionics, vol. 69, 1994, pp. 59-67.

Gutierrez, A. et al., "Understanding the Effects of Cationic and Anionic Substitutions in Spinel Cathodes of Lithium-Ion Batteries," Journal of the Electrochemical Society, 160 (6), 2013, pp. A901-A905.

Han, Ah Reum et al., "Soft Chemical Dehydration Route to Carbon Coating of Metal Oxides: Its Application for Spinel Lithium Manganate," J. Phys. Chem. C, 2007, vol. 111, pp. 11347-11352.

Hayashi, N. et al., "Cathode of $LiMg_yMn_{2-y}O_4$ and $LiMg_yMn_{2-y}O_{4\sigma}$Spinel Phases for Lithium Secondary Batteries," Journal of the Electrochemical Society, 146 (4), 1999, pp. 1351-1354.

He, Wei et al., "Improved electrochemical performances of nanocrystalline $Li[Li_{0.2}Mn_{0.54}Ni_{0.13}Co_{0.13}]O_2$ cathode material for Li-ion batteries" RSC Advances, 2012, vol. 2, pp. 3423-3429.

Hong, Jihyun et al., "Critical Role of Oxygen Evolved from Layered Li-excess Metal Oxides in Lithium Rechargeable Batteries," Chem. Mater., 2012, 24 (14), pp. 2692-2697.

Hou, Peiyu et al., "A high energy density Li-rich positive-electrode material with superior performances via a dual chelating agent co-precipitation route," J. Mater. Chem. A, 2015, 3, pp. 9427-9431.

(56) References Cited

OTHER PUBLICATIONS

Hou, Peiyu et al., *Supporting Information* "A high energy density Li-rich positive-electrode material with superior performances via a dual chelating agent co-precipitation route," J. Mater. Chem. A, 2015, vol. 3, 11 pages.

Hua, Chuanshan et al., "Study of full concentration-gradient Li(Ni$_{0.8}$Co$_{0.1}$Mn$_{0.1}$)O$_2$ cathode material for lithium ion batteries," Journal of Alloys and Compounds, vol. 614, 2014, pp. 264-270.

Hua, Weibo et al., "Na-doped Ni-rich LiNi$_{0.5}$Co$_{0.2}$Mn$_{0.3}$O$_2$ cathode material with both high rate capability and high tap density for lithium ion batteries," Dalton Trans., 2014, vol. 43, pp. 14824-14832.

Hwang et al., "Influence of Mn content on the morphology and electrochemical performance of LiNi$_{1-x-y}$Co$_x$Mn$_y$O$_2$ cathode materials" J. Mater. Chem., 2003, vol. 13, pp. 1962-1968.

Hwang et al., "Investigation of Changes in the Surface Structure of Li$_x$Ni$_{0.8}$Co$_{0.15}$Al$_{0.05}$O$_2$ Cathode Materials Induced by the Initial Charge," Chem. Mater. 2014, vol. 26, pp. 1084-1092.

Hwang et al., "Using Real-Time Electron Microscopy to Explore the Effects of Transition-Metal Composition on the Local Thermal Stability in Charged Li$_x$Ni$_y$Mn$_z$Co$_{1-y-z}$O$_2$ Cathode Materials," Chem. Mater., 2015, 27, pp. 3927-3935.

Hy, Sunny et al., "Understanding the Role of Ni in Stabilizing the Lithium-Rich High-Capacity Cathode Material Li[Ni$_x$Li$_{(1-2x)/3}$Mn$_{(2-x)/3}$]O$_2$(0≤x≤0.5)," Chem. Mater. 2014, 26, pp. 6919-6927.

Irving, H. et al., "The Stability of Transition-metal Complexes," Journal of the Chemical Society, Issue 0, 1953, pp. 3192-3210.

Jarvis, Karalee A. et al., "Atomic Structure of a Lithium-Rich Layered Oxide Material for Lithium-Ion Batteries: Evidence of a Solid Solution," Chem. Mater., 2011, 23 (16), pp. 3614-3621.

Johnson et al. "Structural and electrochemical studies of a-manganese dioxide($\alpha$-Mn$_{O2}$)" Journal of Power Sources 68 (1997) pp. 570-577.

Johnson et al., "Structural Characterization of Layered Li$_x$Ni$_{0.5}$Mn$_{0.5}$O$_2$ (0≤x≤2) Oxide Electrodes for Li Batteries," Chem. Mater. 2003, vol. 15, pp. 2313-2322.

Johnson et al., "Synthesis, Characterization and Electrochemistry of Lithium Battery Electrodes: xLi$_2$MnO$_3$ • (1-x)LiMn$_{0.333}$Ni$_{0.333}$Co$_{0.333}$O$_2$ (0≤x≤0.7)," Chem. Mater. 2008, vol. 20, pp. 6095-6106.

Johnson et al., "The role of Li$_2$MO$_2$ structures (M=metal ion) in the electrochemistry of (x)LiMn$_{0.5}$Ni$_{0.5}$O$_2$•(1-x)Li$_2$TiO$_3$ electrodes for lithium-ion batteries," Electrochemistry Communications, vol. 4, 2002, pp. 492-498.

Jouanneau et al., "Preparation, Structure, and Thermal Stability of New Ni$_x$Co$_{1-2x}$Mn$_x$(OH)$_2$ (0≤x≤1/2) Phases," Chem. Mater., vol. 15, No. 2, 2003 pp. 495-499.

Ju et al., "Optimization of Layered Cathode Material with Full Concentration Gradient for Lithium-Ion Batteries," J. Phys. Chem. C, 2014, vol. 118, pp. 175-182.

Kam et al., "Aliovalent titanium substitution in layered mixed Li Ni—Mn—Co oxides for lithium battery applications," J. Mater. Chem., 2011, vol. 21, pp. 9991-9993.

Kam, Kinson C. et al., "Electrochemical and Physical Properties of Ti-Substituted Layered Nickel Manganese Cobalt Oxide (NMC) Cathode Materials," Journal of the Electrochemical Society, 159 (8), 2012, pp. A1383-A1392.

Kang et al., "Effects of Li Content on Structure and Electrochemical Properties of Li$_{1+x}$(Ni$_{0.5}$Mn$_{0.5}$)$_{1-x}$O$_2$ (0≤x≤0.15) Electrodes in Lithium Cells (1.0—4.8 V)," Journal of the Electrochemical Society, 154 (4), 2007, pp. A268-A274.

Kang et al., "Enhancing the rate capability of high capacity xLi$_2$MnO$_3$ • (1-x)LiMO$_2$ (M=Mn, Ni, Co) electrodes by Li—Ni—PO$_4$ treatment," Electrochemistry Communications, vol. 11, 2009, pp. 748-751.

Kang et al., "First-cycle irreversibility of layered Li—Ni—Co—Mn oxide cathode in Li-ion batteries," Electrochimica Acta, vol. 54, 2008, pp. 684-689.

Kang et al., "Investigating the first-cycle irreversibility of lithium metal oxide cathodes for Li batteries," J Mater Sci, 2008, vol. 43, pp. 4701-4706.

Kang et al., "The Effects of Acid Treatment on the Electrochemical Properties of 0.5 Li$_2$MnO$_3$•0.5 LiNi$_{0.44}$Co$_{0.25}$Mn$_{0.31}$O$_2$ Electrodes in Lithium Cells," Journal of the Electrochemical Society, 153 (6), 2006, pp. A1186-A1192.

Kang, Kisuk et al., "Electrodes with High Power and High Capacity for Rechargeable Lithium Batteries," Science, vol. 311, Feb. 17, 2006, pp. 977-980.

Kang, Kisuk et al., "Factors that affect Li mobility in layered lithium transition metal oxides," Physical Review B, vol. 74, 2006, pp. 094105-1-094195-7.

Kestner et al. "An Experimental and Modeling Analysis of Vapor Transport Deposition of Cadmium Telluride", *Solar Energy Materials & Solar Cells*, 2004, vol. 83, pp. 55-65.

Kim et al., "Design of Nickel-rich Layered Oxides Using d Electronic Donor for Redox Reactions," Chem. Mater. 2015, vol. 27, pp. 6450-6456.

Kim, Chunjoong et al., "Stabilization of Battery Electrode/Electrolyte Interfaces Employing Nanocrystals with Passivating Epitaxial Shells," Chem. Mater. 2015, 27, pp. 394-399.

Kim, H.-J. et al., "Coprecipitation and Characterization of Nickel-Cobalt-Manganese Hydroxides Precursor for Battery Cathode Materials," Abstract #849, 224th ECS Meeting, 2013 the Electrochemical Society, 1 page.

Kim, Hyun-Soo et al. "Enhanced electrochemical properties of LiNi$_{1/3}$Co$_{1/3}$Mn$_{1/3}$O$_2$ cathode material by coating with LiAlO$_2$ nanoparticles," Journal of Power Sources, 161, 2006, pp. 623-627.

Kim, Jeom-Soo et al., "Electrochemical and Structural Properties of xLi$_2$M'O$_3$•(1-x)LiMn$_{0.5}$Ni$_{0.5}$O$_2$ Electrodes for Lithium Batteries (M'=Ti, Mn, Zr; 0≤x≤0.3)," Chem. Mater. 2004, 16, pp. 1996-2006.

Kim, Ji Woo et al., "Unexpected high power performance of atomic layer deposition coated Li[Ni$_{1/3}$Mn$_{1/3}$Co$_{1/3}$]O$_2$ cathodes," Journal of Power Sources, 254, 2014, pp. 190-197.

Kita et al. "Magnetic Properties of Fe/fluorides (CaF2, LiF) Multilayered Thin Films", Journal of Magnetism and Magnetic Materials, 1992, vol. 117, pp. 294-300, North-Holland.

Kong et al., "Multivalent Li-Site Doping of Mn Oxides for Li-Ion Batteries," J. Phys. Chem. C, 2015, vol. 119, pp. 21904-21912.

Kosova, N. V. et al., "Mixed layered Ni—Mn—Co hydroxides: Crystal structure, electronic state of ions, and thermal decomposition," Journal of Power Sources 174, 2007, pp. 735-740.

Kosova, N. V. et al., "Optimization of Ni$^{2+}$/Ni$^{3+}$ratio in layered Li(Ni,Mn,Co)O$_2$ cathodes for better electrochemistry," Journal of Power Sources, 174, 2007, pp. 965-969.

Kovanda, František et al., "Mixed oxides obtained from Co and Mn containing layered double hydroxides: Preparation, characterization, and catalytic properties," Journal of Solid State Chemistry, vol. 179, 2006, pp. 812-823.

Kovanda, František et al., "Thermal behaviour of Ni—Mn layered double hydroxide and characterization of formed oxides," Solid State Sciences, vol. 5, 2003, pp. 1019-1026.

Koyama, Yukinori et al., "Crystal and electronic structures of superstructural Li$_{1-x[Co1/3]}$Ni$_{1/3}$Mn$_{1/3}$]O$_2$ (0≤x≤1)," Journal of Power Sources 119-121, 2003, pp. 644-648.

Lee et al., "High capacity Li[Li$_{0.2}$Ni$_{0.2}$Mn$_{0.6}$]O$_2$ cathode materials via a carbonate co-precipitation method," Journal of Power Sources 162, 2006, pp. 1346-1350.

Lee et al., "Low-temperature atomic layer deposited Al$_2$O$_3$ thin film on layer structure cathode for enhanced cycleability in lithium-ion batteries," Electrochimica Acta 55, 2010, pp. 4002-4006.

Lee et al., "Synthetic optimization of Li[Ni$_{1/3}$Co$_{1/3}$Mn$_{1/3}$]O$_2$ via co-precipitation," Electrochimica Acta, vol. 50, 2004, pp. 939-948.

Li et al., "Li-Storage via Heterogeneous Reaction in Selected Binary Metal Fluorides and Oxides", Journal of Electrochemical Society, 2004, accepted Oct. 21, 2003, vol. 151, No. 11, pp. A1878-A1885.

Li et al., "Reversible formation and decomposition of LiF clusters using transition metal fluorides as precursors and their application in rechargeable Li batteries," Advanced Materials, May 2, 2003, vol. 15, No. 9, pp. 736-739.

Li et al., "Improve First-Cycle Efficiency and Rate Performance of Layered-Layered Li$_{1.2}$Mn$_{0.6}$Ni$_{0.2}$O$_2$ Using Oxygen Stabilizing Dopant," ACS Appl. Mater. Interfaces, 2015, 7, pp. 16040-16045.

(56) References Cited

OTHER PUBLICATIONS

Li et al., "Synthesis and Characterization of the Lithium-Rich Core-Shell Cathodes with Low Irreversible Capacity and Mitigated Voltage Fade," Chem. Mater. 2015, 27, pp. 3366-3377.
Li, Y. et al., "Understanding Long-Term Cycling Performance of $Li_{1.2}Ni_{0.15}Mn_{0.55}Co_{0.1}O_2$-Graphite Lithium-Ion Cells," Journal of the Electrochemical Society, 160 (5), 2013, pp. A3006-A3019.
Li, Zheng et al., "Stability and Rate Capability of Al Substituted Lithium-Rich High-Manganese Content Oxide Materials for Li-Ion Batteries," Journal of the Electrochemical Society, 159 (2), 2012, pp. A116-A120.
Liang, Jianbo et al., "Topochemical Synthesis, Anion Exchange, and Exfoliation of Co-Ni Layered Double Hydroxides: A Route to Positively Charged Co-Ni Hydroxide Nanosheets with Tunable Composition," Chem. Mater. 2010, vol. 22, pp. 371-378.
Liao, Jin-Yun et al., "Surface-modified concentration-gradient Ni-rich layered oxide cathodes for high-energy lithium-ion batteries," Journal of Power Sources, vol. 282, 2015, 429-436.
Lim, Jae-Hwan et al., "Electrochemical characterization of $Li_2MnO_3$-$Li[Ni_{1/3}Co_{1/3}Mn_{1/3}]O_2$-$LiNiO_2$ cathode synthesized via co-precipitation for lithium secondary batteries," Journal of Power Sources, 189, 2009, pp. 571-575.
Lin, Feng et al., "Surface reconstruction and chemical evolution of stoichiometric layered cathode materials for lithium-ion batteries," Nature Communications, Mar. 27, 2014, pp. 1-9.
Liu et al. "Spherical nanoporous $LiCoPO_4$/C composites as high performance cathode materials for rechargeable lithium-ion batteries," J. Mater. Chem., 2011, 21, pp. 9984-9987.
Liu et al., "Carbon-coated high capacity layered $Li[Li_{0.2}Mn_{0.54}Ni_{0.13}Co_{0.13}]O_2$ cathodes," Electrochemistry Communications 12 (2010), pp. 750-753.
Liu et al., "Conductive Surface Modification with Aluminum of High Capacity Layered $Li[Li_{0.2}Mn_{0.54}Ni_{0.13}Co_{0.13}]O_2$ Cathodes," J. Phys. Chem. C 2010, 114, pp. 9528-9533.
Liu et al., "Electrochemical and in Situ Synchrotron XRD Studies on $Al_2O_3$-Coated $LiCoO_2$ Cathode Material", Journal of the Electrochemical Society, 2004, vol. 151 (9), pp. A1344-A1351.
Liu et al., "$Li_3V_2(PO_4)_3$-coated $Li_{1.17}Ni_{0.2}Co_{0.05}Mn_{0.58}O_2$ as the cathode materialswith high rate capability for Lithium ion batteries," Electrochimica Acta 147, 2014, pp. 696-703.
Liu et al., "Long cycle life lithium ion battery with lithium nickel cobalt manganese oxide (NCM) cathode," Journal of Power Sources, vol. 261, 2014, pp. 285-291.
Liu et al., "Nickel-Rich Layered Lithium Transitional-Metal Oxide for High-Energy Lithium-Ion Batteries," Angew. Chem. Int. Ed. 2015, vol. 54, pp. 4440-4458.
Liu et al. "Structure Evolution and Electrochemical Performance of $Al_2O_3$-coated $LiNi_{0.4}Co_{0.2}Mn_{0.4}O_2$ During Charge-discharge Cycling," Chem. Res. Chinese Universities 2012, 28(4), pp. 686-690.
Liu et al., "Study on the capacity fading of pristine and $FePO_4$ coated $LiNi_{1/3}Co_{1/3}Mn_{1/3}O_2$ by Electrochemical and Magnetical techniques," Electrochimica Acta 148, 2014, pp. 26-32.
Liu et al., "Understanding the Improvement in the Electrochemical Properties of Surface Modified 5 V $LiMn_{1.42}Ni_{0.42}Co_{0.16}O_4$ Spinel Cathodes in Lithium-ion Cells," Chem. Mater. 2009, 21, pp. 1695-1707.
Liu Zhaoping et al., "Synthesis, Anion Exchange, and Delamination of Co-Al Layered Double Hydroxide: Assembly of the Exfoliated Nanosheet/Polyanion Composite Films and Magneto-Optical Studies," J. Am. Chem. Soc., 2006, 128, pp. 4872-4880.
Liu, H. et al., "Electrochemical performance of $LiFePO_4$ cathode material coated with $ZrO_2$ nanolayer," Electrochemistry Communications 10 (2008), pp. 165-169.
Luo et al., "Can Zr be Substituted for Co in $Co_{1-z}Al_z(OH)_2$ and $LiCo_{1-z}Zr_zO_2$?," Journal of the Electrochemical Society, 158, (2), 2011, pp. A110-A114.
Luo et al., "Preparation of $Co_{1-z}Al_z(OH)_2(NO_3)_z$ Layered Double Hydroxides and $Li(Co1\_zAlz)02$," Chem. Mater., 2009, vol. 21, pp. 56-62.
Luo et al., "Synthesis, Characterization, and Thermal Stability of $LiNi_{1/3}Mn_{1/3}Co_{1/3-z}Mg_zO_2$, $LiNi_{1/3-z}Mn_{1/3}Co_{1/3}Mg_zO_2$, and $LiNi_{1/3}Mn_{1/3-z}Co_{1/3}Mg_zO_2$," Chem. Mater., 2010, vol. 22, pp. 1164-1172.
Luo et al., "The Impact of Zr Substitution on the Structure, Electrochemical Performance and Thermal Stability of $Li[Ni_{1/3-z}Co_{1/3}Zr_z]O_2$," Journal of the Electrochemical Society, 158 (4), 2011, pp. A428-A433.
Ma et al., "A highly homogeneous nanocoating strategy for Li-rich Mn-based layered oxides based on chemical conversion," Journal of Power Sources, vol. 277, 2015, pp. 393-402.
Ma et al., "Structural and electrochemical behavior of $LiMn_{0.4}Ni_{0.4}Co_{0.2}O_2$," Journal of Power Sources, 2007, vol. 165, pp. 517-534.
Makimura et al., "Lithium insertion material of $LiNi_{1/2}Mn_{1/2}O_2$ for advanced lithium-ion batteries," Journal of Power Sources, 119-121, 2003, pp. 156-160.
Manthiram, "Materials Challenges and Opportunities of Lithium Ion Batteries," J. Phys. Chem. Lett., 2011, vol. 2, pp. 176-184.
Markus et al., "Computational and Experimental Investigation of Ti Substitution in $Li_1(Ni_xMn_xCo_{1-2x-y}Ti_y)O_2$ for Lithium Ion Batteries," J. Phys. Chem. Lett., 2014, vol. 5, pp. 3649-3655.
McCalla et al., "Formation of Layered-Layered Composites in the Li—Co—Mn Oxide Pseudoternary System during Slow Cooling," Chem. Mater. 2013, 25, pp. 912-918.
McCalla et al., "How Phase Transformations during Cooling Affect Li—Mn—Ni—O Positive Electrodes in Lithium Ion Batteries," Journal of the Electrochemical Society, 160 (8), 2013, pp. A1134-A1138.
McCalla et al., "Lithium loss mechanisms during synthesis of layered $Li_xNi_{2-x}O_2$ for lithium ion batteries," Solid State Ionics 219, 2012, pp. 11-19.
McCalla et al., "Structural Study of the Li—Mn—Ni Oxide Pseudoternary System of Interest for Positive Electrodes of Li-Ion Batteries," Chem. Mater., 2013, vol. 25, pp. 989-999.
McCalla et al., "The Role of Metal Site Vacancies in Promoting Li—Mn—Ni—O Layered Solid Solutions," Chem. Mater., 2013, vol. 25, pp. 2716-2721.
McCalla et al., "The spinel and cubic rocksalt solid-solutions in the Li—Mn—Ni oxide pseudo-ternary system," Solid State Ionics, vol. 242, 2013, pp. 1-9.
Meng et al., "Combining Ab Initio Computation with Experiments for Designing New Electrode Materials for Advanced Lithium Batteries: $LiNi_{1/3}Fe_{1/6}Co_{1/6}Mn_{1/3}O_2$," Journal of the Electrochemical Society, 151 (8), 2004, pp. A1134-A1140.
Mizushima et al., "$Li_xCoO_2(0<x<1)$: A New Cathode Material for Batteries of High Energy Density", Mat. Res. Bull, 1980, vol. 15, No. 6, pp. 783-789.
Mohanty, Debasish et al., "Structural transformation of a lithium-rich $Li_{1.2}Co_{0.1}Mn_{0.55}Ni_{0.15}O_2$ cathode during high voltage cycling resolved by in situ X-ray diffraction," Journal of Power Sources, vol. 229, 2013, pp. 239-248.
Mueller-Neuhaus et al., "Understanding Irreversible Capacity in $Li_xNi_{1-y}Fe_yO_2$ Cathode Materials," Journal of the Electrochemical Society, 147 (10), 2000, pp. 3598-3605.
Mulder et al., "Comparison of commercial battery cells in relation to material properties," Electrochimica Acta, vol. 87, 2013, pp. 473-488.
Myung, Seung-Taek et al., "Progress in High-Capacity Core-Shell Cathode Materials for Rechargeable Lithium Batteries," J. Phys. Chem. Lett., vol. 5, 2014, pp. 671-679.
Naghash et al., "Effect of oxygen non-stoichiometry on the electrochemical performance of lithium manganese oxide spinels," Journal of Power Sources, vol. 102, 2001, pp. 68-73.
Nel et al., "Toxic Potential of Materials at the Nanolevel", Science, Feb. 3, 2006, vol. 311, pp. 622-627.
Noh et al., "Cathode Material with Nanorod Structure—An Application for Advanced High-Energy and Safe Lithium Batteries," Chem. Mater., 2013, vol. 25, pp. 2109-2115.
Noh et al., "Comparison of the structural and electrochemical properties of layered $Li[Ni_xCo_yMn_z]O_2$(x=1/3, 0.5, 0.6, 0.7, 0.8 and 0.85) cathode material for lithium-ion batteries," Journal of Power Sources, 2013, vol. 233, pp. 121-130.

(56) References Cited

OTHER PUBLICATIONS

Noh et al., "Formation of a Continuous Solid-Solution Particle and its Application to Rechargeable Lithium Batteries," Adv. Funct. Mater., 2013, vol. 23, pp. 1028-1036.

Ochi et al. "Interface Mixing in Fe/LiF Multilayered Thin Film", *Journal of the Physical Society of Japan*, Jan. 1992, vol. 61, No. 1, pp. 35-38.

Oh et al., *Supporting Information* "Superior Long-Term Energy Retention and Volumetric Energy Density for Li-Rich Cathode Materials," Nano Lett., 2014, vol. 14, 12 pages.

Oh, Pilgun et al., "Superior Long-Term Energy Retention and Volumetric Energy Density for Li-Rich Cathode Materials," Nano Lett., 2014, vol. 14, pp. 5965-5972.

Ohzuku et al., "Electrochemistry and Structural Chemistry of $LiNiO_2$ (R3m) for 4 Volt Secondary Lithium Cells," J. Electrochem. Soc., 140(7), 1993, pp. 1862-1870.

Ohzuku et al., "High-capacity lithium insertion materials of lithium nickel manganese oxides for advanced lithium-ion batteries: toward rechargeable capacity more than 300 mA h $g^{-1}$" J. Mater. Chem., 2011, vol. 21, pp. 10179-101888.

Ohzuku et al., "Synthesis and Characterization of $Li[Ni_{1/2}Mn_{3/2}]O_4$ by Two-Step Solid State Reaction," Journal of the Ceramic Society of Japan, 110 (5), 2002, pp. 501-505.

Oishi' Masatsugu et al., "Direct observation of reversible charge compensation by oxygen ion in Li-rich manganese layered oxide positive electrode material, $Li_{1.16}Ni_{0.15}Co_{0.19}Mn_{0.50}O_2$," Journal of Power Sources, 276, 2015, pp. 89-94.

Oka, Y. et al., "High-Temperature Cycling Performance of $LiNi_{1/3}Co_{1/3}Mn_{1/3}O_2$ Cathode with DLC Protective Film," Journal of the Electrochemical Society, 162 (2), 2015, pp. A3032-A3037.

Okada, Shigeto et al., "Fluoride Phosphate $Li_2CoPO_4F$ as a High Voltage Cathode in Li-ion Batteries," Journal of Power Sources, 146, 2005, pp. 565-569.

Okamoto, Kaoru et al., "X-Ray Absorption Fine Structure Study on Layered $LiMO_2$(M=Ni, Mn, Co) Cathode Materials," Journal of the Electrochemical Society, 153 (6), 2006, pp. A1120-A1127.

Padhi et al., "Effect of Structure on the $Fe^{3+}/Fe^{2+}$Redox Couple in Iron Phosphates", J. Electrochem. Soc., May 5, 1997, vol. 144, No. 5, pp. 1609-1613.

Padhi et al., "Phospho-olivines as Positive-Electrode Materials for Rechargeable Lithium Batteries", J. Electrochem. Soc., Apr. 4, 1997, vol. 144, No. 4, pp. 1188-1194.

Paik et al., "Lithium and Deuterium NMR Studies of Acid-Leached Layered Lithium Manganese Oxides," Chem. Mater., 2002, vol. 14, pp. 5109-5115.

Palacin et al., "Electrochemical and structural study of the 3.3 V reduction step in defective $Li_xMn_2O_4$ and $LiMn_2O_{(4-y)}F_y$ compounds," Journal of Power Sources 81-82, 1999, pp. 627-631.

Palacin et al., "On the role of defects in decreasing the extra 3.3/3.95 and 4.5 V redox steps in Li—Mn—O spinels," Journal of Power Sources, 97-98, 2001, pp. 398-401.

Pan et al., "Recent development of $LiNi_xCo_yMn_zO_2$: Impact of micro/nano structures for imparting improvements in lithium batteries," Trans. Nonferrous Met. Soc. China, vol. 23, 2013, pp. 108-119.

Park et al., "Amorphous Metal Fluoride Passivation Coatings Prepared by Atomic Layer Deposition on $LiCoO_2$ for Li-Ion Batteries," Chem. Mater. 2015, 27, pp. 1917-1920.

Park et al., "Improvement of structural and electrochemical properties of $AlF_3$-coated $Li[Ni_{1/3}Co_{1/3}Mn_{1/3}]O_2$ cathode materials on high voltage region," Journal of Power Sources, vol. 178, 2008, pp. 826-831.

Park et al., "Lithium-manganese-nickel-oxide electrodes with integrated layered-spinel structures for lithium batteries," Electrochemistry Communications, vol. 9, 2007, pp. 262-268.

Patnaik, P., "Handbook of Inorganic Chemicals," 2003, McGraw-Hill, NY, NY, pp. 410-413, 428-429, 486-491, 500, 507-508.

Paulsen et al., "Layered Li—Mn-Oxide with the O2 Structure: A Cathode Material for Li-Ion Cells Which Does Not Convert to Spinel," Journal of the Electrochemical Society, 146 (10), 1991, pp. 3560-3565.

Pereira et al., "The Electrochemistry of Germanium Nitride with Lithium", J. Electrochem. Soc., 2003, available electronically Jul. 1, 2003, vol. 150, No. 8, pp. A1118-A1128.

Pouillerie et al., "The $Li_xNi_{1-y}Mg_yO_2$ (y=0.05, 0.10) system: structural modifications observed upon cycling," Solid State Ionics, vol. 132, 2000, pp. 15-29.

Poulain M., "Advanced Glasses", Ann. Chim. Sci. Mat., 2003, vol. 28, pp. 87-94.

Prabu et al., "Synthesis, impedance and electrochemical studies of lithium iron fluorophosphate, $LiFePO_4F$ cathode", Electrochimica Acta 85, 2012, pp. 572-578.

Prasad, R. et al., "Dopant-induced stabilization of rhombohedral $LiMnO_2$ against Jahn-Teller distortion," Physical Review B 71, 2005, pp. 134111-1-134111-11.

Qian et al., "Uncovering the roles of oxygen vacancies in cation migration in lithium excess layered oxides" Phys. Chem. Chem. Phys., 2014, vol. 16, pp. 14665-14668.

Ramasamy et al., "Discharge characteristics of silver vanadium oxide cathodes", Journal of Applied Electrochemistry (2006), vol. 36, pp. 487-497; DOI 10.1007/s10800-005-9103-x.

Rashid, Muhammad et al., "Effect of Relaxation Periods over Cycling Performance of a Li-Ion Battery," Journal of the Electrochemical Society, 162 (2), 2015, pp. A3145-A3153.

Riley, Leah A., "Electrochemical effects of ALD surface modification on combustion synthesized $LiNi_{1/3}Mn_{1/3}Co_{1/3}O_2$ as a layered-cathode material," Journal of Power Sources, 196, 2011, pp. 3317-3324.

Robert, Rosa et al., "Enhancement of the high potential specific charge in layered electrode materials for lithium-ion batteries," J. Mater. Chem. A, 2014, 2, pp. 8589-8598.

Roth et al. "Nanocrystalline LiF via microemulsion systems", J. Mater. Chem., 1999, accepted Nov. 16, 1998, vol. 9, pp. 493-497.

Rowe, Aaron W. et al., "Positive Electrode Materials in the Li—Mn—Ni—O System Exhibiting Anomalous Capacity Growth during Extended Cycling," Journal of the Electrochemical Society, 161 (3), 2014, pp. A308-A317.

Saavedra-Arias, Jose J. et al., "Synthesis and electrochemical properties of $Li(Ni_{0.8}Co_{0.1}Mn_{0.1})O_2$ cathode material: Ex situ structural analysis by Raman scattering and X-ray diffraction at various stages of charge-discharge process," Journal of Power Sources, 183, 2008, pp. 761-765.

Sekizawa, Oki et al., "Crystal and electronic structure change determined by various method for delithiation process of $Li_x(Ni,Mn)O_2$-based cathode material," Journal of Power Sources, 196, 2011, pp. 6651-6656.

Shen, Chong-Heng et al., "Facile Synthesis of the Li-Rich Layered Oxide $Li_{1.23}Ni_{0.09}Co_{0.12}Mn_{0.56}O_2$ with Superior Lithium Storage Performance and New Insights into Structural Transformation of the Layered Oxide Material during Charge-Discharge Cycle: In Situ XRD Characterization" ACS Appl. Mater. Interfaces, 2014, 6 (8), pp. 5516-5524.

Shunmugasundaram, Ramesh et al., "High Capacity Li-Rich Positive Electrode Materials with Reduced First-Cycle Irreversible Capacity Loss," Chem. Mater. 2015, 27, pp. 757-767.

Son, In Hyuk et al., "Self-Terminated Artificial SEI Layer for Nickel-Rich Layered Cathode Material via Mixed Gas Chemical Vapor Deposition," Chem. Mater. 2015, 27, pp. 7370-7379.

Song, Jie et al., "Role of Oxygen Vacancies on the Performance of $Li[Ni_{0.5-x}Mn_{1.5+x}]O_4$ (x=0, 0.05, and 0.08) Spinel Cathodes for Lithium-Ion Batteries," Chem. Mater., 2012, 24 (15), pp. 3101-3109.

Sorokin, "Anion-conducting fluoride and oxyfluoride glasses", Russian Chemical Reviews, 2001, vol. 70, No. 9, pp. 801-807.

Sun et al., "High-energy cathode material for long-life and safe lithium batteries," Nature Materials, vol. 8, 2009, pp. 320-324.

Sun et al., "Nanostructured high-energy cathode materials for advanced lithium batteries," Nature Materials, vol. 11, 2012, pp. 942-947.

(56) References Cited

OTHER PUBLICATIONS

Sun et al., "Synthesis and Characterization of Li[(Ni$_{0.8}$Co$_{0.1}$Mn$_{0.1}$)$_{0.8}$(Ni$_{0.5}$Mn$_{0.5}$)$_{0.2}$]O$_2$ with the Microscale Core-Shell Structure as the Positive Electrode Material for Lithium Batteries," J. Am. Chem. Soc., 2005, vol. 127, pp. 13411-13418.

Sun et al., "The Role of AlF$_3$ Coatings in Improving Electrochemical Cycling of Li-Enriched Nickel-Manganese Oxide Electrodes for Li-Ion Batteries," Adv. Mater. 2012, 24, pp. 1192-1196.

Sun, Yang-Kook, "Concentration-Gradient Materials," Energy Storage & Conversion Material Laboratory, Hanyang University, (03-05-30), 14 pages.

Sural et al., "Conductivity relaxation in zirconium fluoride glasses: effect of substitution of Zr$^{4+}$ by Y$^{3+}$ ions", Solid State Ionics, 1999, vol. 120, pp. 27-32.

Tan et al., "Highly enhanced low temperature discharge capacity of LiNi$_{1/3}$Co$_{1/3}$Mn$_{1/3}$O$_2$ with lithium boron oxide glass modification," Journal of Power Sources, vol. 277, 2015, pp. 139-146.

Tarascon et al., "Issues and challenges facing rechargeable lithium batteries", Nature, Nov. 15, 2001, vol. 414, pp. 359-367.

Tarascon et al., "The Spinel Phase of LiMn$_2$O$_4$ as a Cathode in Secondary Lithium Cells", J. Electrochem. Soc., Oct. 1991, vol. 138, No. 10, pp. 2859-2864.

Tarascon et al., "Synthesis Conditions and Oxygen Stoichiometry Effects on Li Insertion into the Spinel LiMn$_2$O$_4$," Journal of Electrochem. Soc., vol. 141, No. 6, Jun. 1994, pp. 1421-1431.

Thackeray et al., "Lithium Insertion into Manganese Spinels", Mater. Res. Bull., Feb. 1983, vol. 18, No. 4, pp. 461-472.

Thackeray et al., "Advances in manganese-oxide 'composite' electrodes for lithium-ion batteries," J. Mater. Chem., 2005, vol. 15, pp. 2257-2267.

Thackeray et al., "Comments on the structural complexity of lithium-rich Li$_{1+x}$M$_{1-x}$O$_2$ electrodes (M=Mn, Ni, Co) for lithium batteries," Electrochemistry Communications 8, 2006, pp. 1531-1538.

Thackeray et al., "Li$_2$MnO$_3$-stabilized LiMO$_2$ (M=Mn, Ni, Co) electrodes for lithium-ion batteries," J. Mater. Chem., 2007, vol. 17, pp. 3112-3125.

Thackeray et al., "ZrO$_2$-and Li$_2$ZrO$_3$-stabilized spinel and layered electrodes for lithium batteries," Electrochemistry Communications, vol. 5, 2003, pp. 752-758.

Thackeray, M. M., "Structural Considerations of Layered and Spinel Lithiated Oxides for Lithium Ion Batteries," J. Electrochem. Soc., vol. 142, No. 8, Aug. 1995, pp. 2558-2563.

Thomas et al., "Synthesis and Structural Characterization of the Normal Spinel Li [Ni$_2$]O$_4$", Mater. Res. Bull., Mar. 25, 1985, vol. 20, No. 10, pp. 1137-1146.

Thursday Morning, Nov. 3, 2011; Energy Frontiers Focus Topic, Room: 103—Session EN+NS-ThM; "Nanostructures for Energy Storage and Fuel Cells I"; Moderator: J. Lewis, RTI International; 1 page.

Trnovcova, V. et al., "Physical Properties of Multicomponent Fluoride Glasses for Photonic and Superionic Applications", Ionics, Jul. 2001, vol. 7, Issue 4, pp. 456-462.

Van Bommel et al., "Analysis of the Growth Mechanism of Coprecipitated Spherical and Dense Nickel, Manganese, and Cobalt-Containing Hydroxides in the Presence of Aqueous Ammonia," Chem. Mater., 2009, 21, pp. 1500-1503.

Van Bommel et al., "Synthesis of Spherical and Dense Particles of the Pure Hydroxide Phase Ni$_{1/3}$Mn$_{1/3}$Co$_{1/3}$(OH)$_2$," Journal of The Electrochemical Society, 156 (5), 2009, pp. A362-A365.

Van Der Ven et al. "Lithium Diffusion in Layered Li$_x$CoO$_2$," Electrochemical and Solid-State Letters, 3 (7) (2000), pp. 301-304.

Vlasse et al., "The Refinement of the Crystal Structure of Iron Oxyfluoride, FeOF", Journal of Solid State Chemistry, Oct. 1973, vol. 8, Issue 2, pp. 109-113.

Wang et al., "High capacity double-layer surface modified Li[Li$_{0.2}$Mn$_{0.54}$Ni$_{0.13}$Co$_{0.13}$]O$_2$ cathode with improved rate capability," Journal of Mater. Chem., 2009, vol. 19, pp. 4965-4972.

Wang et al., "Synthesis of high capacity cathodes for lithium-ion batteries by morphology-tailored hydroxide co-precipitation," Journal of Power Sources, vol. 274, 2015, pp. 451-457.

Wang et al., "Synthesis of Lithium and Manganese-Rich Cathode Materials via an Oxalate Co-Precipitation Method," Journal of the Electrochemical Society, 160 (5), 2013, pp. A3108-A3112.

Wang et al., "Synthesis optimization of Li$_{1+x}$[Mn$_{0.45}$Co$_{0.40}$Ni$_{0.15}$]O$_2$ with different spherical sizes via co-precipitation," Powder Technology, vol. 187, 2008, pp. 124-129.

Wei et al., "Kinetics Tuning of Li-ion Diffusion in Layered Li(Ni$_x$Mn$_y$Co$_z$)O$_2$," J. Am. Chem. Soc., 2015, vol. 137, pp. 8364-8367.

Wiaderek et al. "Comprehensive Insights into the Structural and Chemical Changes in Mixed-Anion FeOF Electrodes by Using Operando PDF and NMR Spectroscopy", Journal of the American Chemical Society, 2013, 135, pp. 4070-4078.

Wilcox et al., "Structure and Electrochemistry of LiNi$_{1/3}$Co$_{1/3-y}$M$_y$Mn$_{1/3}$O$_2$(M=Ti, Al, Fe) Positive Electrode Materials," Journal of the Electrochemical Society, 156 (3), 2009, pp. A192-A198.

Wilcox et al., "The Impact of Aluminum and Iron Substitution on the Structure and Electrochemistry of Li(Ni$_{0.4}$Co$_{0.2-y}$M$_y$Mn$_{0.4}$)O$_2$ Materials," Journal of the Electrochemical Society, 156 (12) 2009, pp. A1011-A1018.

Wolf-Goodrich et al., "Tailoring the surface properties of LiNi$_{0.4}$Mn$_{0.4}$Co$_{0.2}$O$_2$ by titanium substitution for improved high voltage cycling performance," Phys. Chem. Chem. Phys., 2015, vol. 17, pp. 21778-21781.

Woo et al., "Improvement of electrochemical and thermal properties of Li[Ni$_{0.5}$Co$_{0.1}$Mn$_{0.1}$]O$_2$ positive electrode materials by multiple metal (Al, Mg) substitution," Electrochimica Acta, 54, 2009, pp. 3851-3856.

Wu et al., "Effect of Ni$^{2+}$ Content on Lithium/Nickel Disorder for Ni-Rich Cathode Materials," ACS Appl. Mater. Interfaces, 2015, vol. 7, pp. 7702-7708.

Wu et al., "Effect of precursor and synthesis temperature on the structural and electrochemical properties of Li(Ni$_{0.5}$Co$_{0.2}$Mn$_{0.3}$)O$_2$," Electrochimica Acta, 75, 2012, pp. 393-398.

Wu et al., "Sol-gel Synthesis of Li$_2$CoPO$_4$F/C Nanocomposite as a High-Power Cathode Material for Lithium Ion Batteries," Journal of Power Sources, vol. 220, 2012, pp. 122-129.

Wu et al., "Structural stability of chemically delithiated layered (1−z)Li[Li$_{1/3}$Mn$_{2/3}$]O$_{2-zLi[Mn0.5-y}$Ni$_{0.5'y}$Co$_{2y}$]O$_2$ solid solution cathodes," Journal of Power Sources, 183, 2008, pp. 749-754.

Xiang et al., "Understanding the Effect of Co$^{3+}$ Substitution on the Electrochemical Properties of Lithium-Rich Layered Oxide Cathodes for Lithium-Ion Batteries," J. Phys. Chem. C, 2014, 118, pp. 21826-21833.

Xiong et al., "A modified LiF coating process to enhance the electrochemical performance characteristics of LiNi$_{0.8}$Co$_{0.1}$Mn$_{0.1}$O$_2$ cathode materials," Materials Letters, 110, 2013, pp. 4-9.

Xiujian et al., "Mixed-alkali effect in fluorozirconate glasses", Journal of Materials Science Letters, Feb. 1987, vol. 6, Issue 2, pp. 143-144.

Xu et al., "Identifying surface structural changes in layered Li-excess nickel manganese oxides in high voltage lithium ion batteries: A Joint experimental and theoretical study," Energy Environ. Sci., 2011, DOI: 10.1039/c1ee01131f; 11 pages.

Yabuuchi et al., "High-capacity electrode materials for rechargeable lithium batteries: Li$_3$NbO$_4$-based system with cation-disordered rocksalt structure," PNAS, vol. 112, No. 25, Jun. 23, 2015, pp. 7650-7655.

Yabuuchi et al., "Novel lithium insertion material of LiCo$_{1/3}$Ni$_{1/3}$Mn$_{1/3}$O$_2$ for advanced lithium-ion batteries," Journal of Power Sources 119-121, 2003, pp. 171-174.

Yan et al., "Atomic-Resolution Visualization of Distinctive Chemical Mixing Behavior of Ni, Co, and Mn with Li in Layered Lithium Transition-Metal Oxide Cathode Materials," Chem. Mater., 2015, 27 (15), pp. 5393-5401.

Yan et al., "Recent progress in Li-rich layered oxides as cathode materials for Li-ion batteries," RSC Adv., 2014, 4, pp. 63268-63284.

(56) References Cited

OTHER PUBLICATIONS

Yang, Feifei et al., "Nanoscale Morphological and Chemical Changes of High Voltage Lithium-Manganese Rich NMC Composite Cathodes with Cycling," Nano Lett., 2014, 14, pp. 4334-4341.
Yang, Xiao-Qing et al., "Crystal structure changes of $LiMn_{0.5}Ni_{0.5}O_2$ cathode materials during charge and discharge studied by synchrotron based in situ XRD," Electrochemistry Communications, vil. 4, 2002, pp. 649-654.
Yang, Yuan et al., "A membrane-free lithium/polysulfide semi-liquid battery for large-scale energy storage," Energy Environ. Sci., 2013, vol. 6, pp. 1552-1558.
Yano et al., "Surface Structure and High-Voltage Charge/Discharge Characteristics of Al-Oxide Coated $LiNi_{1/3}Co_{1/3}Mn_{1/3}O_2$ Cathodes," Journal of the Electrochemical Society, 162 (2), 2015, pp. A3137-A3144.
Ye et al., "Ni-induced stepwise capacity increase in Ni-less Li-rich cathode materials for high performance lithium ion batteries," Nano Research, 8(3), Feb. 2014, pp. 808-820.
Yin et al., "X-ray/Neutron Diffraction and Electrochemical Studies of Lithium De/Re-Intercalation in $Li_{1-x}Co_{1/3}Ni_{1/3}Mn_{1/3}O_2$ (x=0→1)", Chem. Mater. 2006,18, pp. 1901-1910.
Yoon et al. "Investigation of the Charge Compensation Mechanism on the Electrochemically Li-Ion Deintercalated $Li_{1-x}Co_{1/3}Ni_{1/3}Mn_{1/3}O_2$ Electrode System by Combination of Soft and Hard X-ray Absorption Spectroscopy", J. Am. Chem. Soc., 2005, vol. 127, pp. 17479-17487.
Yoon et al., "Electronic structural changes of the electrochemically Li-ion deintercalated $LiNi_{0.8}Co_{0.15}Al_{0.05}O_2$ cathode material investigated by X-ray absorption spectroscopy," Journal of Power Sources, 174, 2007, pp. 1015-1020.
Yoon et al., "Improved Performances of $Li[Ni_{0.65}Co_{0.08}Mn_{0.27}]O_2$ Cathode Material with Full Concentration Gradient for Li-Ion Batteries," Journal of the Electrochemical Society, 162 (2), 2015, pp. A3059-A3063.
Yoon et al., "In Situ X-ray Absorption Spectroscopic Study on $LiNi_{0.5}Mn_{0.5}O_2$ Cathode Material during Electrochemical Cycling," Chem. Mater., 2003, vol. 15, pp. 3161-3169.
Yoon et al., "Investigation of the Local Structure of the $LiNi_{0.5}Mn_{0.5}O_2$ Cathode Material during Electrochemical Cycling by X-Ray Absorption and NMR Spectroscopy," Electrochemical and Solid-State Letters, 5 (11), 2002, pp. A263-A266.
Yoon et al., "Li MAS NMR and in situ X-ray studies of lithium nickel manganese oxides," Journal of Power Sources 119-121, 2003, pp. 649-653.
Yu, Haijun et al., "Study of the lithium/nickel ions exchange in the layered $LiNi_{0.42}Mn_{0.42}Co_{0.18}O_2$ cathode material for lithium ion batteries: experimental and first-principles calculations" Energy Environ. Sci., 2014, vol. 7, pp. 1068-1078.
Yue et al., "Growth mechanisms for spherical mixed hydroxide agglomerates prepared by co-precipitation method: A case of $Ni_{1/3}Co_{1/3}Mn_{1/3}(OH)_2$", Journal of Alloys and Compounds, vol. 619, 2015, pp. 846-853.
Yue et al., "A low temperature fluorine substitution on the electrochemical performance of layered $LiNi_{0.8}Co_{0.1}Mn_{0.1}O_{2-z}F_z$ cathode materials," Electrochimica Acta, vol. 92,2013, pp. 1-8.
Yue et al., "Effect of fluorine on the electrochemical performance of spherical $LiNi_{0.8}Co_{0.1}Mn_{0.1}O_2$ cathode materials via a low temperature method", Powder Technology, vol. 237, 2013 pp. 623-626.
Zhang et al., "Self-Assembled Hollow Spheres of β-$Ni(OH)_2$ and Their Derived Nanomaterials," Chem. Mater., 2009, vol. 21, pp. 871-883.
Zhang et al., "Surface nitridation of Li-rich layered $Li(Li_{0.17}Ni_{0.25}Mn_{0.58})O_2$ oxide as cathode material for lithium-ion battery", J. Mater. Chem., 2012, vol. 22, pp. 13104-13109.
Zhao et al., "Enhanced Electrochemical Performance of $Li[Li_{0.2}Ni_{0.2}Mn_{0.6}]O_2$ Modified by Manganese Oxide Coating for Lithium-Ion Batteries," Electrochemical and Solid-State Letters, vol. 14 (1), 2011, pp. A1-A5.
Zhou et al., "Advantages of Simultaneous Substitution of Co in $Li[Ni_{1/3}Mn_{1/3}Co_{1/3}]O_2$ by Ni and Al," Electrochemical and Solid-State Letters, 12 (4), 2009, pp. A81-A83.
Zhou et al., "Coprecipitation Synthesis of $Ni_xMn_{1-x}(OH)_2$ Mixed Hydroxides," Chem. Mater., vol. 22, No. 3, 2010, pp. 1015-1021.
Zhou et al., "Solid-State Synthesis as a Method for the Substitution of Al for Co in $LiNi_{1/3}Mn_{1/3-z}Al_zO_2$," Journal of the Electrochemical Society, 156 (10), 2009, pp. A796-A801.
Zhou et al., "The effect of Al substitution on the reactivity of delithiated $LiNi_{1/3}Mn_{1/3}Co_{(1/3-z)}Al_zO_2$ with non-aqueous electrolyte," Electrochemistry Communications 10 (2008), pp. 1168-1171.
Zhu et al., "Positive Electrode Passivation by LiDFOB Electrolyte Additive in High-Capacity Lithium-Ion Cells," Journal of the Electrochemical Society, 159 (12), 2012, pp. A2109-A2117.

* cited by examiner

Discharged

Charging

Charged

Discharging

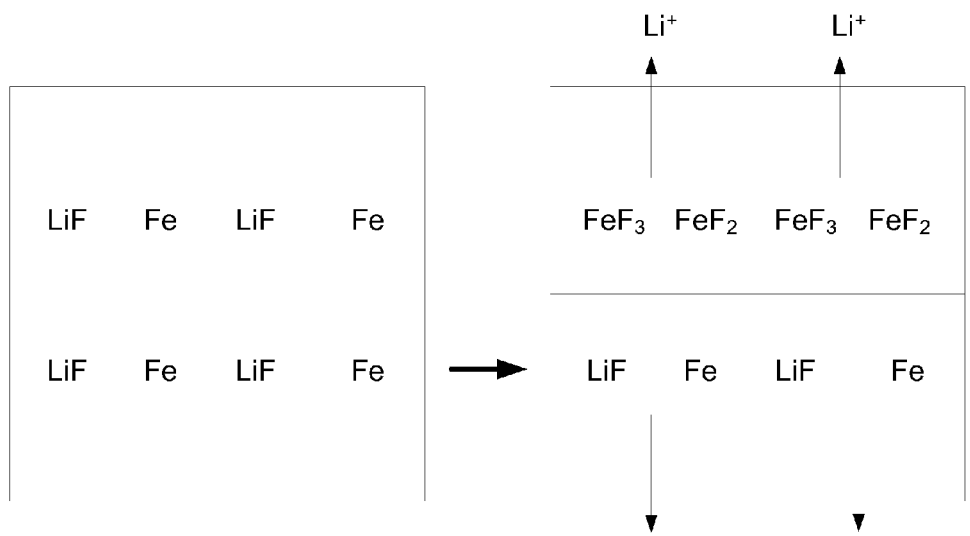
Discharged
FIG. 4A
Charging
FIG. 4B
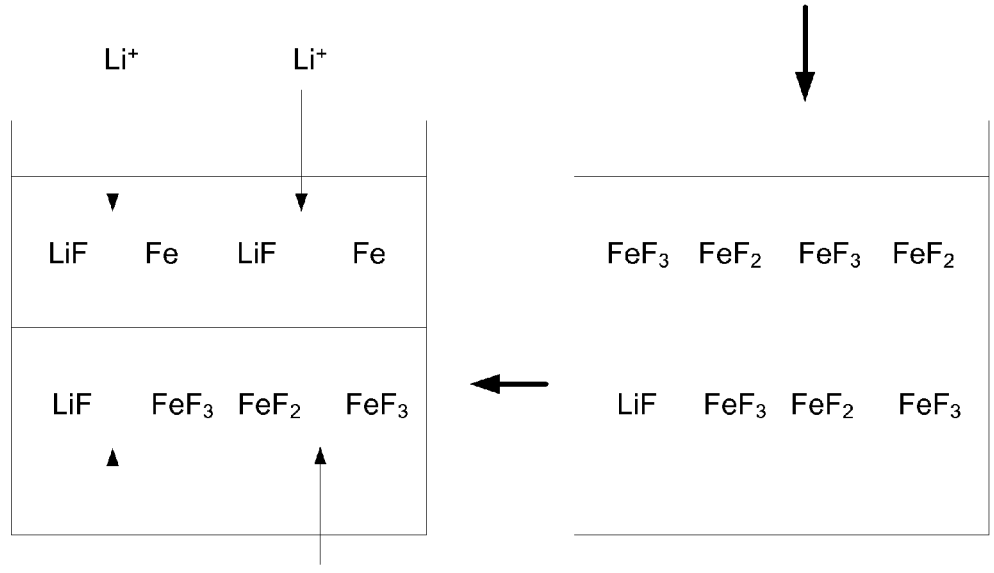
Discharging
FIG. 4D
Charged
FIG. 4C

| Conversion reaction | V vs Li | Wt% doped | at% doped |
|---|---|---|---|
| $NiF_2$ | $NiF_2 + 2Li \rightarrow 2LiF + Ni$ | 2.96* | 21.0% | 6.7% |
| $CrF_3$ | $CrF_3 + 2Li \rightarrow 3LiF + Cr$ | 2.28* | 24.4% | 7.1% |
| $SiF_4$ | $SiF_4 + 4Li \rightarrow 4LiF + Si$ | 2.03 | 25.0% | 7.7% |
| $ZrF_4$ | $ZrF_4 + 4Li \rightarrow 4LiF + Zr$ | 1.41 | 18.7% | 3.4% |
| $AlF_3$ | $AlF_3 + 3Li \rightarrow 3LiF + Al$ | 1.16 | 19.9% | 7.1% |
| $MgF_2$ | $MgF_2 + 2Li \rightarrow 2LiF + Mg$ | 0.55 | 21.7% | 10.3% |
| $CaF_2$ | $CaF_2 + 2Li \rightarrow 2LiF + Ca$ | 0.02 | 25.7% | 10.3% |
| $CrF_2$ | $CrF_2 + 2Li \rightarrow 2LiF + Cr$ | | 19.8% | 6.7% |

FIG. 11

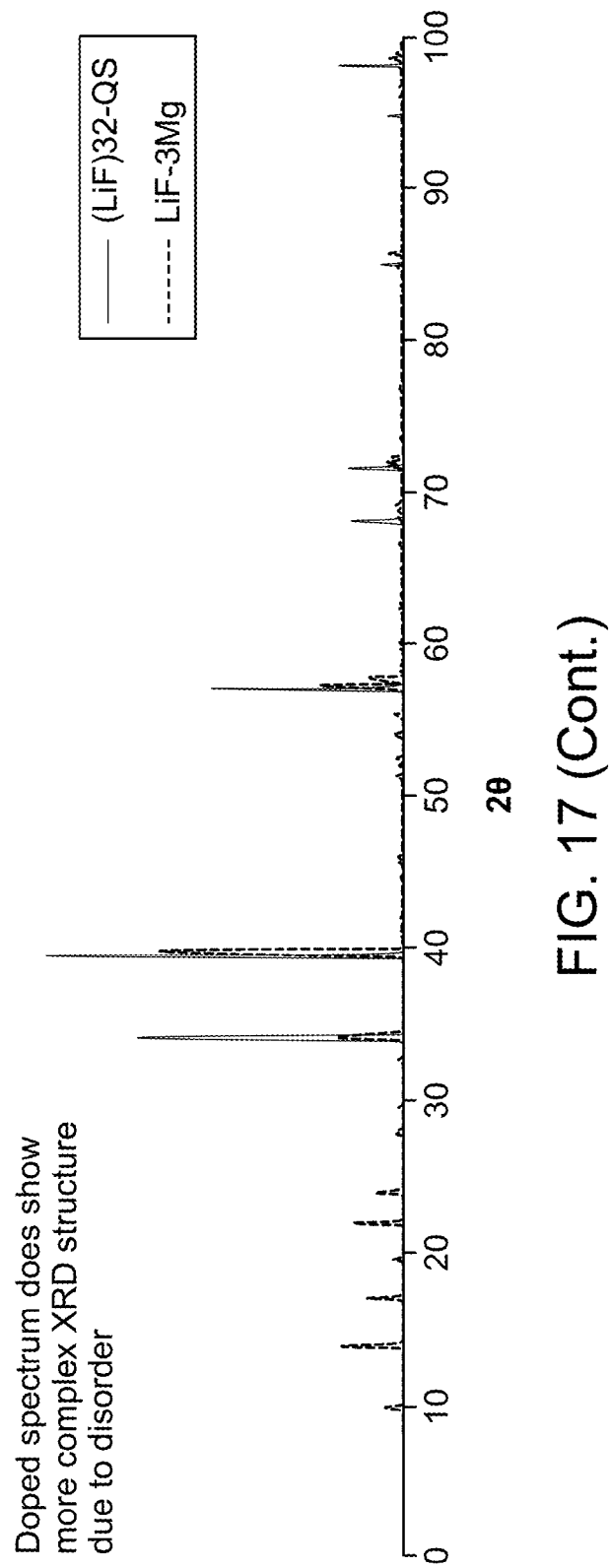

CrF₃ doping: structure $32LiF + 3O \rightarrow Li_{32}F_{26}O_3$

DOPED CONVERSION MATERIALS FOR SECONDARY BATTERY CATHODES

CROSS-REFERENCE TO RELATED APPLICATIONS

This application claims the benefit under 35 U.S.C. § 119(e) of U.S. Provisional Patent Application 62/038,059 filed on Aug. 15, 2014, U.S. Provisional Patent Application 62/043,353 filed on Aug. 28, 2014, and U.S. Provisional Patent Application 62/189,669 filed on Jul. 7, 2015, all of which are incorporated herein by reference in their entirety for all purposes.

BACKGROUND

Recent advances in clean technologies for storing energy include rechargeable lithium ion batteries, i.e., Li-secondary batteries, in which lithium ions move from a negative electrode to the positive electrode during discharge of the battery. In some Li-secondary batteries, the positive electrode includes materials, e.g., conversion materials, which undergo a chemical reaction during discharge of the battery.

Certain conversion materials provide large energy densities in Li-secondary batteries, particularly when these materials are paired with Li-metal anodes. However, some of these materials are limited in other respects, such as, but not limited to, electrical and ionic conductivity, life-cycle stability, and power delivery.

The instant disclosure sets forth compositions, and methods of making and using the same, which overcome the aforementioned limitations with respect to Li-secondary batteries as well as other unmet challenges in the relevant field to which the instant disclosure relates.

SUMMARY

The instant disclosure sets forth secondary battery cathode materials having doped conversion material compositions, and methods for making and using the same. The types, amounts, and particular combinations of dopants in the conversion materials set forth herein significantly increase the electrical and ionic conductivity, energy density, and/or power delivery, of the secondary batteries that incorporate these materials. In certain examples, the novel doped conversion materials set forth herein are suitable for use with solid state electrolytes, such as, but not limited to, sulfide-based electrolytes, lithium-sulfur-phosphorus-based electrolytes, and lithium-stuffed-garnet-based electrolytes.

In some examples, the instant disclosure sets forth a cathode for an energy storage device, including a conversion chemistry material having a dopant, wherein the dopant is present in the conversion chemistry material in an amount from about 0.01% to 25% (atomic %). In some of these examples, the dopant is selected from a member, or combination thereof, selected from the group consisting of oxygen, carbon, a metal selected from the Li, Mg, Al, Si, Ca, Ti, V, Cr, Mn, Fe, Co, Ni, Cu, Zn, Mo, Y, Zr, Nb, Ba, or Hf, a metal oxide of said metal, a metal oxy fluoride of said metal, a cation of said metal, and a metal fluoride of said metal. In certain embodiments, the doped conversion material has either, or both, a Li-ion conductivity greater than $1*10^{-7}$ S/cm or an electronic conductivity greater than $10^{-8}$ S/cm. In certain embodiments, the doped conversion material has a Li-ion conductivity greater than $1*10^{-6}$ S/cm.

In some examples, the instant disclosure sets forth a method of charging a cathode, described herein, by applying a voltage to the cathode to convert a metal fluoride conversion material dopant therein to a metal in order to increase the electronic conductivity of the doped conversion material.

In some examples, the instant disclosure sets forth a method of fabricating an energy storage device including preparing an electrochemically active material by melting or evaporating one or more precursors of a conversion chemistry material and a dopant source, atomizing the precursors, and cooling the atomized particles to form an amorphous conversion chemistry material. In some examples, the method further includes fabricating a cathode that includes the electrochemically active material in electrical communication with a current collector. In some examples, the method further includes combining the fabricated cathode with an anode and an electrolyte to form the energy storage device.

In some examples, the instant disclosure sets forth a method of forming a doped conversion material including providing a first precursor material including a metal material, such as but not limited to, Li, LiF, Fe, $FeF_3$, $FeF_2$, $MoO_2$, $MoO_3$, Cu, $CuF_2$, Ni, $NiF_3$, Co, or $CoF_2$, and providing a second precursor material including a reducing cation material such as but not limited to, Li, LiF, Na, NaF, K, or KF. In some of these examples, the first precursor material and second precursor materials are characterized by a tendency to phase separate. In some of these examples, the first precursor material and second precursor materials are characterized by a tendency to form a eutectic mixture. In some examples, the method includes providing a dopant source. In some examples, the method includes melting or evaporating the first precursor material, the second precursor material, and the dopant source, separately as well as in combinations. In some examples, the method includes injecting the first precursor material, the second precursor material, and the dopant source into a cooling environment, wherein the first precursor material, the second precursor material, and the dopant source form a mixed material that is cooled to generate formed particles. In some examples, the material is actively cooled. In some other examples, the material is passively cooled. In some examples, the method includes collecting the formed particles.

These and other aspects are described further below with reference to the drawings.

BRIEF DESCRIPTION OF THE DRAWINGS

FIGS. 4A-4D are schematic drawings of mechanisms of transport.

FIG. 11 shows calculated Voltage (V) vs Li for doping LiF with a metal fluoride of a metal selected from Ni, Cr, Si, Zr, Al, Mg, or Ca.

DETAILED DESCRIPTION

Introduction

Figure 1A:
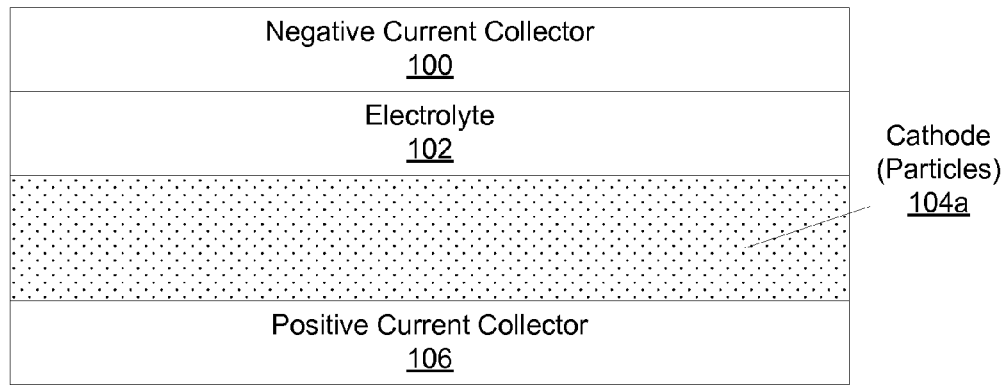
FIGS. 1A and 1B are schematic illustrations of electrochemical cells.

The following description is presented to enable one of ordinary skill in the art to make and use the disclosed embodiments and to incorporate them in the context of particular applications. Various modifications, as well as a variety of uses in different applications will be readily apparent to those skilled in the art, and the general principles defined herein may be applied to a wide range of embodiments. Thus, the disclosed embodiments are not intended to be limited to the embodiments presented, but are to be accorded the widest scope consistent with the principles and novel features disclosed herein.

As used herein, the term "amorphous," refers to a material that is not crystalline or that does not contain a majority crystalline phase. Amorphous refers to a material that does not evidence a crystalline property, for example, well-defined x-ray diffraction peaks as measured by x-ray diffraction. An amorphous material is at least primarily amorphous and characterized as having more amorphous components than crystalline components. Substantially amorphous refers to a material that does not include well defined x-ray diffraction peaks or that is characterized by an x-ray diffraction pattern that includes broad reflections that are recognized by a person having ordinary skill in the art as having the majority constituent component phase as an amorphous phase. A material that is substantially amorphous may have nanosized domains of crystallinity but which is still characterized by an x-ray diffraction pattern to be primarily in an amorphous phase. In a substantially amorphous material, TEM SADP may evidence regions of crystallinity but would also evidence a majority of the volume of the material as amorphous.

As used herein, the phrase "nanodimensioned" refers to a composite material wherein the constituent components are separated by nanodimensions. For example, a nanodimensioned composite material may include a Li-containing compound, e.g., LiF, and an Fe-containing material or compound, e.g., Fe, wherein the domains of Fe and the domains of LiF have median physical dimensions of approximately 1-100 nm, or 2-50 nm, or 1-10 nm, or 2-5 nm, or 5-15 nm, 5-20 nm, or the like as measured in a TEM micrograph by identification of regions of visual contrast of different nanodomains.

As used herein, the term "nanodomains" refers to a part of a material having a median characteristic dimension of about 20 nm or less. Nanodomains include a material component having a boundary edge that has a median characteristic dimension of about 20 nm or less from one boundary edge to another boundary edge at the greatest separation distance between edges of the material component. In some examples, the median characteristic dimension of the particles or nanodomains is about 5 nm or less. In some materials, the metal in the particles is present as metal nanodomains having a median dimension of less than about 20 nm. In some materials, the particles or nanodomains are substantially homogeneous within a volume of about 1000 nm$^3$.

As used herein, the term "crystalline domains" refers to a part, portion, or component of a material having crystalline character and that is physically ordered as a crystal. The domain represents the boundaries of the crystalline component. As used herein, a crystalline solid is a material whose constituent atoms, molecules, or ions are arranged in an ordered pattern extending in three spatial dimensions. The boundaries of the constituent ordered portion of the material are referred to as the crystalline domain. For a material that has both crystalline and non-crystalline components, the crystalline components are referred to as the crystalline domains. The size of the domains represents the dimensions of the boundaries encompassing a given crystalline component. For example, some of the materials set forth herein have both amorphous and crystalline components, wherein the crystalline components are ordered for 1-20 nm. Such materials are referred to as nanodomained crystals.

As used herein, the term "primarily nanocrystalline" refers to a material that includes nanodimensioned crystalline domains as the majority phase or majority component, which contributes to the crystalline character of the material.

As used herein, the terms "cathode" and "anode" refer to the electrodes of a battery. During a charge cycle in a Li-secondary battery, Li ions leave the cathode and move through an electrolyte and to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode.

As used herein, the phrase "conversion chemistry material" refers to a material that undergoes a chemical reaction during the charging and discharging cycles of a secondary battery. It may be described in its charged or its discharged state. For example, a conversion material can include, but is not limited to, LiF and Fe, FeF$_3$, LiF and Cu, CuF$_2$, LiF and Ni, NiF$_2$ or a combination thereof. In the charged state, the conversion material includes unlithiated metal fluorides, e.g., FeF$_3$, NiF$_2$, or CuF$_2$. In the discharged state, the conversion material includes lithiated metal fluorides, e.g., Li$_x$FeF$_3$, Li$_x$NiF$_2$, or Li$_x$CuF$_2$ and/or LiF and/or reduced metals (e.g., Fe, Ni, Cu).

As used herein, the term "dopant" refers to an impurity, or an added element, ion, chemical or material, which is present in amounts less than the amount of the substance into which the dopant is added in order to alter the properties of the substance into which the dopant is present. For example, 1-10 atomic % Li$_2$O may be added to a conversion material, e.g., LiF, wherein the LiF is present at 99-90%, respectively, in order to increase the conductivity of the LiF. In this example, Li$_2$O is a dopant and is present in the LiF. Also, as used herein, the term "dopant" refers to the form in which impurities are added to the conversion chemistry material, or it may be reflective of the chemical constituents of the material after doping. For example, when Li$_2$O is a dopant, Li$_2$O may be added to the conversion chemistry material during fabrication, and/or the elements Li and O are present in the final composition. Also, for example, when SiF$_4$ is a dopant, SiF$_4$ may be added to the conversion chemistry material during fabrication, and/or the elements Si and F are present in the final composition. In some examples, Li$_2$O is a dopant but not observed by x-ray crystallography if, for example, the crystal structure of Li$_2$O is incorporated in the LiF matrix. In some examples, this is also the case for other dopants, such as, but not limited to SiF$_4$. In some examples, SiF$_4$ is a dopant but not observed by x-ray crystallography if, for example, the crystal structure of SiF$_4$ is incorporated in the LiF matrix.

As used herein, the phrase "present in the conversion chemistry material" refers to the state of one element, ion, chemical, material, or substance being physically confined or located within the conversion chemistry material. As used herein, "present" includes any type of bonding, e.g., chemical, ionic, covalent, van der Waals, adsorption, or adhesion, which physical associates or bonds the material present in the conversion material with or to the conversion material, so as to alter the properties of the conversion material, e.g., electrical properties.

As used herein, the phrase "about 0.01% to 25% w/w" refers to amounts and ranges of materials qualified by this phrase which are functionally equivalent with the recited percentage range. For example, if 0.01% of a dopant in a conversion material is functionally equivalent with 0.015% of a dopant, then "about 0.01% to 25% w/w" includes "0.015% to 25% w/w." For example, if about "0.01% to 10% w/w" is functionally equivalent with "0.01% to 11% w/w" then about "0.01% to 10% w/w" includes "0.01% to 11% w/w." As used herein, functionally equivalent refers to two materials which may have different chemical characteristics but which have the same property, given a particular context in which the phrase is used. For example, if 1% of a dopant in LiF results in the same Li-ion conductivity in LiF as does 1.01%, then for this Li-ion conductivity context, 1% dopant and 1.01% dopant are functionally equivalent. Two materials which are functionally equivalent for one context does not necessarily mean that these two materials are functionally equivalent for all contexts.

As used herein, the phrase "intercalation chemistry material," refers to a material that undergoes a lithium insertion reaction during the charging and discharging cycles of a secondary battery. For example, intercalation chemistry materials include LiFePO$_4$ and LiCoO$_2$. In these materials, Li$^+$ inserts into and also deintercalates out of the intercalation material during the discharging and charging cycles of a secondary battery.

As used herein, the phrase "solid state catholyte," refers to an electrolyte that is intimately mixed, or surrounding, the cathode active material.

As used herein, the term "electrolyte," refers to a material that allows ions, e.g., Li+, to migrate therethrough but which does not allow electrons to conduct therethrough. Electrolytes are useful for electrically isolating the cathode and anodes of a secondary battery while allowing ions, e.g., $Li^+$, to transmit through the electrolyte.

As used herein, $d_{50}$ refers to the median diameter or the median size, in a distribution of sizes, measured by microscopy techniques, such as, but not limited to, scanning electron microscopy. As used herein, $d_{50}$ includes the characteristic dimension at which 50% of the particles are smaller than the recited size. For example, the phrase "$d_{50}$ particle size of 1 nm to 5 µm," refers to a material wherein the median diameter or the median particle size, in a distribution of particle sizes, measured by microscopy techniques is 1 nm to 5 µm.

As used herein, the phase "glassy," refers to a material that is characterized as a glass. Glasses include amorphous solid materials that exhibit a glass transition, which is the reversible transition in amorphous materials (or in amorphous regions within semicrystalline materials) from a hard and relatively brittle state into a molten or rubber-like state.

As used herein the phrase "precursors of a conversion chemistry material and a dopant" refer to the chemicals or reactants which are useful for forming or preparing a conversion chemistry material or dopant (i.e., the products) by way of a chemical reaction.

As used herein, the phrase "lithium component intermixed with the metal component," refers to a material that has uniform, homogenous, or substantially homogenous mixture of Li, or a lithium compound, with a metal or a metal component of a material having metal therein.

As used herein, "injecting" refers to the process of introducing or transmitting a material into the space or area into which injection occurs.

In the following detailed description, numerous specific details are set forth in order to provide a more thorough understanding of the disclosed embodiments. However, it will be apparent to one skilled in the art that the disclosed embodiments may be practiced without necessarily being limited to these specific details. In other instances, well-known structures and devices are shown in block diagram form, rather than in detail, in order to avoid obscuring the disclosed embodiments.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. § 112(f). In particular, the use of "step of" or "act of" in the Claims herein is not intended to invoke the provisions of 35 U.S.C. § 112(f).

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

I. CATHODES INCLUDING DOPED CONVERSION MATERIALS

In some examples, set forth herein is a cathode for an energy storage device, including a conversion chemistry material having a dopant, wherein the dopant is present in the conversion chemistry material in an amount from about 0.01% to 25% (atomic %). In these examples, the dopant is selected from a member or combination thereof selected from the group consisting of oxygen, carbon, a metal selected from Li, Mg, Al, Si, Ca, Ti, V, Cr, Mn, Fe, Co, Ni, Cu, Zn, Y, Zr, Nb, Ba, Mo, or Hf, a metal oxide of said metal, a cation of said metal, and a metal fluoride of said metal. In certain examples, the doped conversion material has either, or both, a Li-ion conductivity greater than $1*10^{-7}$ S/cm or an electronic conductivity greater than $10^{-8}$ S/cm. In some examples, the dopant is selected from the group consisting of oxygen, carbon, a metal selected from Li, Mg, Al, Si, Ca, Ti, V, Cr, Mn, Fe, Co, Ni, Cu, Zn, Y, Zr, Nb, Ba, Mo or Hf, and combinations thereof. In certain other examples, the dopant is a metal oxide of a metal selected from the group consisting of Li, Mg, Al, Si, Ca, Ti, V, Cr, Mn, Fe, Co, Ni, Cu, Zn, Y, Zr, Nb, Ba, Mo and Hf. In yet other examples, the dopant is a metal fluoride of a metal selected from the group consisting of Li, Mg, Al, Si, Ca, Ti, V, Cr, Mn, Fe, Co, Ni, Cu, Zn, Y, Zr, Nb, Ba, Mo and Hf. In still other examples, the dopant is a cation of a metal selected from the group consisting of Li, Mg, Al, Si, Ca, Ti, V, Cr, Mn, Fe, Co, Ni, Cu, Zn, Y, Zr, Nb, Ba, Mo and Hf. In some examples, set forth herein is a cathode for an energy storage device, including a conversion chemistry material having a dopant, wherein the dopant is present in the conversion chemistry material in an amount from about 0.01% to 15% (atomic %). In some examples, set forth herein is a cathode for an energy storage device, including a conversion chemistry material having a dopant, wherein the dopant is present in the conversion chemistry material in an amount from about 0.01% to 10% (atomic %). In some examples, set forth herein is a cathode for an energy storage device, including a conversion chemistry material having a dopant, wherein the dopant is present in the conversion chemistry material in an amount from about 1% to 15% (atomic %).

In any of the above examples, the dopant may be a metal selected from Li, an oxide of Li, or a fluoride of Li. In any of the above examples, the dopant may be a metal selected from Mg, an oxide of Mg, or a fluoride of Mg. In any of the above examples, the dopant may be a metal selected from Al, an oxide of Al, or a fluoride of Al. In any of the above examples, the dopant may be a metal selected from Si, an oxide of Si, or a fluoride of Si. In any of the above examples, the dopant may be a metal selected from Ca, an oxide of Ca, or a fluoride of Ca. In any of the above examples, the dopant may be a metal selected from Ti, an oxide of Ti, or a fluoride of Ti. In any of the above examples, the dopant may be a metal selected from V, an oxide of V, or a fluoride of V. In any of the above examples, the dopant may be a metal selected from Cr, an oxide of Cr, or a fluoride of Cr. In any of the above examples, the dopant may be a metal selected from Mn, an oxide of Mn, or a fluoride of Mn. In any of the above examples, the dopant may be a metal selected from Fe, an oxide of Fe, or a fluoride of Fe. In any of the above examples, the dopant may be a metal selected from Co, an oxide of Co, or a fluoride of Co. In any of the above examples, the dopant may be a metal selected from Ni, an oxide of Ni, or a fluoride of Ni. In any of the above examples, the dopant may be a metal selected from Cu, an oxide of Cu, or a fluoride of Cu. In any of the above examples, the dopant may be a metal selected from Zn, an oxide of Zn, or a fluoride of Zn. In any of the above examples, the dopant may be a metal selected from Y, an oxide of Y, or a fluoride of Y. In any of the above examples, the dopant may be a metal selected from Zr, an oxide of Zr, or a fluoride of Zr. In any of the above examples, the dopant may be a metal selected from Nb, an oxide of Nb, or a fluoride of Nb. In any of the above examples, the dopant may be a metal selected from Ba, an oxide of Ba, or a fluoride of Ba. In any of the above examples, the dopant may be a metal selected from Mo, an oxide of Mo, a fluoride of Mo, or an oxyfluoride of Mo. In any of the above examples, the dopant may be a metal selected from Hf, an oxide of Hf, or a fluoride of Hf.

In some examples, set forth here is a cathode wherein the conversion chemistry material is selected from LiF, Fe, Cu, Ni, $FeF_2$, $FeO_dF_{3-2d}$, $FeF_3$, $CoF_3$, $CoF_2$, $CuF_2$, or $NiF_2$; wherein $0 \leq d \leq \frac{1}{2}$. In some of these examples, the conversion chemistry material is selected from LiF, $FeF_2$, $NiF_2$, $FeO_dF_{3-2d}$, $FeF_3$, $CoF_3$, $CoF_2$, $CuF_2$, or combinations thereof; wherein $0 \leq d \leq \frac{1}{2}$. In certain of these examples, the conversion chemistry material is selected from LiF, $NiF_2$, or $FeF_3$.

In some examples, set forth here is a cathode wherein the dopant comprises $Li_2O$ in an amount from about 0.01% to 10% (atomic %). In some of these examples, the dopant comprises $Li_2O$ in an amount from about 0.01% to 10% (atomic %). In certain examples, the dopant comprises $Li_2O$ in an amount of about 10% (atomic %). In some of these examples, the dopant comprises $Li_2O$ in an amount of about 9.5% (atomic %). In some other of these examples, the dopant comprises $Li_2O$ in an amount of about 9% (atomic %). In certain other of these examples, the dopant comprises $Li_2O$ in an amount of about 8.5% (atomic %). In some of these examples, the dopant comprises $Li_2O$ in an amount of about 8% (atomic %). In yet other of these examples, the dopant comprises $Li_2O$ in an amount of about 7.5% (atomic %). In some other of these examples, the dopant comprises $Li_2O$ in an amount of about 7% (atomic %). In some of these examples, the dopant comprises $Li_2O$ in an amount of about 6.5% (atomic %). In some other of these examples, the dopant comprises $Li_2O$ in an amount of about 6% (atomic %). In certain other of these examples, the dopant comprises $Li_2O$ in an amount of about 5.5% (atomic %). In some of these examples, the dopant comprises $Li_2O$ in an amount of about 5% (atomic %). In some of these examples, the dopant comprises $Li_2O$ in an amount of about 4.5% (atomic %). In some other of these examples, the dopant comprises $Li_2O$ in an amount of about 4% (atomic %). In some of these examples, the dopant comprises $Li_2O$ in an amount of about 3.5% (atomic %). In certain other of these examples, the dopant comprises $Li_2O$ in an amount of about 3% (atomic %). In some of these examples, the dopant comprises $Li_2O$ in an amount of about 2.5% (atomic %). In yet other of these examples, the dopant comprises $Li_2O$ in an amount of about 2% (atomic %). In some other of these examples, the dopant comprises $Li_2O$ in an amount of about 1.5% (atomic %). In some of these examples, the dopant comprises $Li_2O$ in an amount of about 1% (atomic %). In yet other of these examples, the dopant comprises $Li_2O$ in an amount of about 0.5% (atomic %). In some other of these examples, the dopant comprises $Li_2O$ in an amount of about 0.25% (atomic %).

In some examples, set forth herein is a cathode wherein the conversion chemistry material is LiF and the dopant is selected from a metal fluoride wherein the metal is Mg, Al, Si, Ca, Ti, V, Cr, Mn, Fe, Co, Ni, Cu, Zn, Y, Zr, Nb, Hf, Mo, or combinations thereof. In certain examples, the dopant is selected from a metal fluoride wherein the metal is Fe, Co, Ni, or Cu. In some examples, the metal is Mg. In some other examples, the metal is Al. In some examples, the metal is Si. In yet other examples, the metal is Ca. In some examples, the metal is Ti. In other examples, the metal is V. In some examples, the metal is Cr. In some examples, the metal is Mn. In some other examples, the metal is Fe. In some examples, the metal is Co. In some examples, the metal is Ni. In some examples, the metal is Cu. In some examples, the metal is Zn. In some examples, the metal is Y. In some examples, the metal is Zr. In some other examples, the metal is Nb. In some examples, the metal is Hf.

In some examples, set forth herein is a cathode wherein the dopant is $NiF_2$ present at less than 21% w/w and greater than 1% (wt %). In some examples, set forth herein is a cathode wherein the dopant is $NiF_2$ present at about 1, 2, 3, 4, 5, 6, 7, 8, 9, or 10 atomic %. In some examples, set forth herein is a cathode wherein the dopant is $NiF_2$ present at about 1 atomic %. In some examples, set forth herein is a cathode wherein the dopant is $NiF_2$ present at about 5 atomic %. In some examples, set forth herein is a cathode wherein the dopant is $NiF_2$ present at about 10 atomic %. In some examples, set forth herein is a cathode wherein the dopant is $NiF_2$ present at about 12 atomic %. In some examples, set forth herein is a cathode wherein the dopant is $NiF_2$ present at about 15 atomic %.

In some examples, set forth herein is a cathode wherein the dopant is $CrF_3$ present at less than 24.4% w/w and greater than 1% (wt %). In some examples, set forth herein is a cathode wherein the dopant is $CrF_3$ present at about 1, 2, 3, 4, 5, 6, 7, 8, 9, or 10 atomic %. In some examples, set forth herein is a cathode wherein the dopant is $CrF_3$ present at about 1 atomic %. In some examples, set forth herein is a cathode wherein the dopant is $CrF_3$ present at about 5 atomic %. In some examples, set forth herein is a cathode wherein the dopant is $CrF_3$ present at about 10 atomic %. In some examples, set forth herein is a cathode wherein the dopant is $CrF_3$ present at about 12 atomic %. In some examples, set forth herein is a cathode wherein the dopant is $CrF_3$ present at about 15 atomic %.

In some examples, set forth herein is a cathode wherein the dopant is $SiF_4$ present at less than 25.0% w/w and greater than 1% (wt %). In some examples, set forth herein is a cathode wherein the dopant is $SiF_4$ present at about 1, 2, 3, 4, 5, 6, 7, 8, 9, or 10 atomic %. In some examples, set forth herein is a cathode wherein the dopant is $SiF_4$ present at about 1 atomic %. In some examples, set forth herein is a cathode wherein the dopant is $SiF_4$ present at about 5 atomic %. In some examples, set forth herein is a cathode wherein the dopant is $SiF_4$ present at about 10 atomic %. In some examples, set forth herein is a cathode wherein the dopant is $SiF_4$ present at about 12 atomic %. In some examples, set forth herein is a cathode wherein the dopant is $SiF_4$ present at about 15 atomic %.

In some examples, set forth herein is a cathode wherein the dopant is $ZrF_4$ present at less than 18.7% w/w and greater than 1% (wt %). In some examples, set forth herein is a cathode wherein the dopant is $ZrF_4$ present at less than 24% w/w and greater than 1% (wt %). In some examples, set forth herein is a cathode wherein the dopant is $ZrF_4$ present at about 1, 2, 3, 4, 5, 6, 7, 8, 9, or 10 atomic %. In some examples, set forth herein is a cathode wherein the dopant is $ZrF_4$ present at about 1 atomic %. In some examples, set forth herein is a cathode wherein the dopant is $ZrF_4$ present at about 5 atomic %. In some examples, set forth herein is a cathode wherein the dopant is $ZrF_4$ present at about 10 atomic %. In some examples, set forth herein is a cathode wherein the dopant is $ZrF_4$ present at about 12 atomic %. In some examples, set forth herein is a cathode wherein the dopant is $ZrF_4$ present at about 15 atomic %.

In some examples, set forth herein is a cathode wherein the dopant is $AlF_3$ present at less than 19.9% w/w and greater than 1% (wt %). In some examples, set forth herein is a cathode wherein the dopant is $AlF_3$ present at less than 20% w/w and greater than 1% (wt %). In some examples, set forth herein is a cathode wherein the dopant is $AlF_3$ present at about 1, 2, 3, 4, 5, 6, 7, 8, 9, or 10 atomic %. In some examples, set forth herein is a cathode wherein the dopant is $AlF_3$ present at about 1 atomic %. In some examples, set forth herein is a cathode wherein the dopant is $AlF_3$ present at about 5 atomic %. In some examples, set forth herein is a cathode wherein the dopant is $AlF_3$ present at about 10 atomic %. In some examples, set forth herein is a cathode wherein the dopant is $AlF_3$ present at about 12 atomic %. In some examples, set forth herein is a cathode wherein the dopant is $AlF_3$ present at about 15 atomic %.

In some examples, set forth herein is a cathode wherein the dopant is $MgF_2$ present at less than 21.7% w/w and greater than 1% (wt %). In some examples, set forth herein is a cathode wherein the dopant is $MgF_2$ present at about 1, 2, 3, 4, 5, 6, 7, 8, 9, or 10 atomic %. In some examples, set forth herein is a cathode wherein the dopant is $MgF_2$ present at about 1 atomic %. In some examples, set forth herein is a cathode wherein the dopant is $MgF_2$ present at about 5 atomic %. In some examples, set forth herein is a cathode wherein the dopant is $MgF_2$ present at about 10 atomic %. In some examples, set forth herein is a cathode wherein the dopant is $MgF_2$ present at about 12 atomic %. In some examples, set forth herein is a cathode wherein the dopant is $MgF_2$ present at about 15 atomic %.

In some examples, set forth herein is a cathode wherein the dopant is $CaF_2$ present at less than 25.7% w/w and greater than 1% (wt %). In some examples, set forth herein is a cathode wherein the dopant is $CaF_2$ present at about 1, 2, 3, 4, 5, 6, 7, 8, 9, or 10 atomic %. In some examples, set forth herein is a cathode wherein the dopant is $CaF_2$ present at about 1 atomic %. In some examples, set forth herein is a cathode wherein the dopant is $CaF_2$ present at about 5 atomic %. In some examples, set forth herein is a cathode wherein the dopant is $CaF_2$ present at about 10 atomic %. In some examples, set forth herein is a cathode wherein the dopant is $CaF_2$ present at about 12 atomic %. In some examples, set forth herein is a cathode wherein the dopant is $CaF_2$ present at about 15 atomic %.

In some examples, set forth herein is a cathode wherein the dopant is $CrF_2$ present at less than 19.8% w/w and greater than 1% (wt %). In some examples, set forth herein is a cathode wherein the dopant is $CrF_2$ present at less than 20.0% w/w and greater than 1% (wt %). In some examples, set forth herein is a cathode wherein the dopant is $CrF_2$ present at less than 24.4% w/w and greater than 1% (wt %). In some examples, set forth herein is a cathode wherein the dopant is $CrF_2$ present at about 1, 2, 3, 4, 5, 6, 7, 8, 9, or 10 atomic %. In some examples, set forth herein is a cathode wherein the dopant is $CrF_2$ present at about 1 atomic %. In some examples, set forth herein is a cathode wherein the dopant is $CrF_2$ present at about 5 atomic %. In some examples, set forth herein is a cathode wherein the dopant is $CrF_2$ present at about 10 atomic %. In some examples, set forth herein is a cathode wherein the dopant is $CrF_2$ present at about 12 atomic %. In some examples, set forth herein is a cathode wherein the dopant is $CrF_2$ present at about 15 atomic %.

In some examples, set forth herein is a cathode wherein the conversion chemistry material is $FeF_3$ and the dopant is Cu and $Li_2O$. In this example, the conversion chemistry material is in the charged stated. In the discharged state, in some examples, the conversion chemistry material is LiF and Fe and the dopant is Cu and $Li_2O$. In this example, the Cu is present at about 1, 2, 3, 4, 5, 6, 7, 8, 9, or 10 atomic %.

In some examples, set forth herein is a cathode wherein the conversion chemistry material is $FeF_3$ and the dopant is $CuF_2$ and $Li_2O$. In this example, the conversion chemistry material is in the charged stated. In the discharged state, in some examples, the conversion chemistry material is LiF and Fe and the dopant is $CuF_2$ and $Li_2O$. In this example, the Cu is present at about 1, 2, 3, 4, 5, 6, 7, 8, 9, or 10 atomic %.

In some examples, set forth herein is a cathode wherein the conversion chemistry material is LiF and the dopant is $ZrF_4$ present at less than 24% and greater than 1% (wt %). In some of these examples, set forth herein is a cathode wherein the dopant is $ZrF_4$ present at about 1, 2, 3, 4, 5, 6, 7, 8, 9, or 10 atomic %. In some examples, set forth herein is a cathode wherein the dopant is $ZrF_4$ present at about 1 atomic %. In some examples, set forth herein is a cathode wherein the dopant is $ZrF_4$ present at about 5 atomic %. In some examples, set forth herein is a cathode wherein the dopant is $ZrF_4$ present at about 10 atomic %. In some examples, set forth herein is a cathode wherein the dopant is $ZrF_4$ present at about 12 atomic %. In some examples, set forth herein is a cathode wherein the dopant is $ZrF_4$ present at about 15 atomic %.

In some examples, set forth herein is a cathode wherein the dopant is selected from $ZrF_x$, $HfF_x$, $CrF_x$, $AlF_x$, $NbF_x$, $BaF_x$, $BeF_x$, $LaF_x$, NaF, $TaF_x$, $TiF_x$, $VF_x$, $ZnF_x$, $CoF_x$, $NiF_x$, $YF_x$, $SiF_x$, $MgF_x$, $CaF_x$ or combinations thereof; and wherein $0<X<5$.

In some examples, set forth herein is a cathode wherein the dopant is a metal oxide of a metal selected from Zr, Hf, Cr, Al, Nb, Ba, Be, La, Na, Ta, Ti, V, Zn, Co, Ni, Y, Si, Mg, Ca or combinations thereof.

In some examples, set forth herein is a cathode wherein the cathode further comprises an intercalation chemistry material selected from $LiMPO_4$, $Li_xTi_yO_2$, $LiMn_yO_4$, $LiMn_y$—$Ni_zO_4$, $LiCoO_2$, $Li(NiCoMn)O_2$, $Li(NiCoAl)O_2$, NCM, or NCA. In these examples, wherein M is Fe, Ni, Co, or Mn, wherein $0<x<5$, wherein $0.1<y<7$; and, wherein $0<z<1$.

In some examples, set forth herein is a cathode wherein the intercalation chemistry material is selected from $LiCoO_2$, $LiMn_2O_4$, $LiFePO_4$, $LiNiMnCoO_2$, $LiNi0.5Mn_{1.5}O_4$, $LiNiCoAlO_2$, $Li_4Ti_5O_{12}$, $TiS_2$, FeS, CuS, $Li_{0-1}TiO_2$, $Li_{0-1}FeCuS_2$, $Li_{0-1}FeO_2$, $Li_{0-1}MnO_2$, $Li_{1.33-2}CuO_2$, or combinations thereof.

In some examples, set forth herein is a cathode comprising a solid state catholyte. In certain examples, the catholyte is an electrolyte comprising Li, S, and P. In certain examples, the catholyte is an electrolyte comprising Li, S, P, and O. In some examples, the catholyte is an electrolyte comprising Li, S, P, and Si. In some examples, the catholyte is an electrolyte comprising Li, S, P, Si, and O. In some examples, the catholyte is an electrolyte comprising Li, S, P, Sn, and Si. In some examples, the catholyte is an electrolyte comprising Li, S, P, Sn, Si, and O. In some examples, the catholyte is an electrolyte comprising Li, S, P, Ge, and Si. In some examples, the catholyte is an electrolyte comprising Li, S, P, Ge, Si, and O. In some examples, the catholyte is an electrolyte comprising a lithium stuffed garnet. In some examples, the garnet is characterized by $Li_7La_3Zr_2O_{12}$. In some examples, the garnet is characterized by $Li_7La_3Zr_2O_{12}$ and is doped with aluminum.

In some examples, set forth herein is a cathode wherein the doped conversion chemistry material has a $d_{50}$ particle size of 1 nm to 5 µm. In certain examples, the doped conversion chemistry material has a $d_{50}$ particle size of 1 nm to 3 µm. In some examples, the doped conversion chemistry material has a $d_{50}$ particle size of 1 nm to 1 µm. In some other examples, the doped conversion chemistry material has a $d_{50}$ particle size of 1 nm to 900 nm. In some examples, the doped conversion chemistry material has a $d_{50}$ particle size of 1 nm to 850 nm. In other examples, the doped conversion chemistry material has a $d_{50}$ particle size of 1 nm to 800 nm. In some other examples, the doped conversion chemistry material has a $d_{50}$ particle size of 1 nm to 750 nm. In some examples, the doped conversion chemistry material has a $d_{50}$ particle size of 1 nm to 700 nm. In other examples, the doped conversion chemistry material has a $d_{50}$ particle size of 1 nm to 650 nm. In some other examples, the doped conversion chemistry material has a $d_{50}$ particle size of 1 nm to 600 nm. In some examples, the doped conversion chemistry material has a $d_{50}$ particle size of 1 nm to 550 nm. In other examples, the doped conversion chemistry material has a $d_{50}$ particle size of 1 nm to 500 nm. In some other examples, the doped conversion chemistry material has a $d_{50}$ particle size of 1 nm to 450 nm. In some examples, the doped conversion chemistry material has a $d_{50}$ particle size of 1 nm to 400 nm. In other examples, the doped conversion chemistry material has a $d_{50}$ particle size of 1 nm to 350 nm. In some other examples, the doped conversion chemistry material has a $d_{50}$ particle size of 1 nm to 300 nm. In some examples, the doped conversion chemistry material has a $d_{50}$ particle size of 1 nm to 250 nm. In other examples, the doped conversion chemistry material has a $d_{50}$ particle size of 1 nm to 200 nm. In some other examples, the doped conversion chemistry material has a $d_{50}$ particle size of 1 nm to 150 nm. In some examples, the doped conversion chemistry material has a $d_{50}$ particle size of 1 nm to 100 nm. In other examples, the doped conversion chemistry material has a $d_{50}$ particle size of 1 nm to 50 nm. In some other examples, the doped conversion chemistry material has a $d_{50}$ particle size of 1 nm to 40 nm. In some examples, the doped conversion chemistry material has a $d_{50}$ particle size of 1 nm to 35 nm. In other examples, the doped conversion chemistry material has a $d_{50}$ particle size of 1 nm to 30 nm. In some other examples, the doped conversion chemistry material has a $d_{50}$ particle size of 1 nm to 25 nm. In some examples, the doped conversion chemistry material has a $d_{50}$ particle size of 1 nm to 20 nm. In other examples, the doped conversion chemistry material has a $d_{50}$ particle size of 1 nm to 15 nm. In some examples, the doped conversion chemistry material has a $d_{50}$ particle size of 1 nm to 10 nm. In other examples, the doped conversion chemistry material has a $d_{50}$ particle size of 1 nm to 5 nm.

In other examples, the doped conversion chemistry material has a $d_{50}$ particle size of 5 nm to 500 nm. In some other examples, the doped conversion chemistry material has a $d_{50}$ particle size of 5 nm to 450 nm. In some examples, the doped conversion chemistry material has a $d_{50}$ particle size of 5 nm to 400 nm. In other examples, the doped conversion chemistry material has a $d_{50}$ particle size of 5 nm to 350 nm. In some other examples, the doped conversion chemistry material has a $d_{50}$ particle size of 5 nm to 300 nm. In some examples, the doped conversion chemistry material has a $d_{50}$ particle size of 5 nm to 250 nm. In other examples, the doped conversion chemistry material has a $d_{50}$ particle size of 5 nm to 200 nm. In some other examples, the doped conversion chemistry material has a $d_{50}$ particle size of 5 nm to 150 nm. In some examples, the doped conversion chemistry material has a $d_{50}$ particle size of 1 nm to 100 nm. In other examples, the doped conversion chemistry material has a $d_{50}$ particle size of 5 nm to 50 nm. In some other examples, the doped conversion chemistry material has a $d_{50}$ particle size of 5 nm to 40 nm. In some examples, the doped conversion chemistry material has a $d_{50}$ particle size of 5 nm to 35 nm. In other examples, the doped conversion chemistry material has a $d_{50}$ particle size of 5 nm to 30 nm. In some other examples, the doped conversion chemistry material has a $d_{50}$ particle size of 5 nm to 25 nm. In some examples, the doped conversion chemistry material has a $d_{50}$ particle size of 5 nm to 20 nm. In other examples, the doped conversion chemistry material has a $d_{50}$ particle size of 5 nm to 15 nm. In some examples, the doped conversion chemistry material has a $d_{50}$ particle size of 5 nm to 10 nm.

In other examples, the doped conversion chemistry material has a $d_{50}$ particle size of 10 nm to 500 nm. In some other examples, the doped conversion chemistry material has a $d_{50}$ particle size of 10 nm to 450 nm. In some examples, the doped conversion chemistry material has a $d_{50}$ particle size of 10 nm to 400 nm. In other examples, the doped conversion chemistry material has a $d_{50}$ particle size of 10 nm to 350 nm. In some other examples, the doped conversion chemistry material has a $d_{50}$ particle size of 10 nm to 300 nm. In some examples, the doped conversion chemistry material has a $d_{50}$ particle size of 10 nm to 250 nm. In other examples, the doped conversion chemistry material has a $d_{50}$ particle size of 10 nm to 200 nm. In some other examples, the doped conversion chemistry material has a $d_{50}$ particle size of 10 nm to 150 nm. In some examples, the doped conversion chemistry material has a $d_{50}$ particle size of 10 nm to 100 nm. In other examples, the doped conversion chemistry material has a $d_{50}$ particle size of 10 nm to 50 nm. In some other examples, the doped conversion chemistry material has a $d_{50}$ particle size of 10 nm to 40 nm. In some examples, the doped conversion chemistry material has a $d_{50}$ particle size of 10 nm to 35 nm. In other examples, the doped conversion chemistry material has a $d_{50}$ particle size of 10 nm to 30 nm. In some other examples, the doped conversion chemistry material has a $d_{50}$ particle size of 10 nm to 25 nm. In some examples, the doped conversion chemistry material has a $d_{50}$ particle size of 10 nm to 20 nm. In other examples, the doped conversion chemistry material has a $d_{50}$ particle size of 10 nm to 15 nm.

In some examples, set forth herein is a cathode wherein the doped conversion material has a Li-ion conductivity greater than $1*10^{-6}$ S/cm over at least about 100 charge-discharge cycles. In some examples, the doped conversion material has a Li-ion conductivity greater than $1*10^{-5}$ S/cm over at least about 100 charge-discharge cycles. In certain examples, the doped conversion material has a Li-ion conductivity greater than $1*10^{-4}$ S/cm over at least about 100 charge-discharge cycles.

In some examples, set forth herein is a cathode wherein the doped conversion material has an electronic conductivity greater than $1*10^{-7}$ S/cm over at least about 100 charge-discharge cycles. In some examples, the doped conversion material has an electronic conductivity greater than $1*10^{-6}$ S/cm over at least about 100 charge-discharge cycles. In some other examples, set forth herein is a cathode wherein the doped conversion material has an electronic conductivity greater than $1*10^{-5}$ S/cm over at least about 100 charge-discharge cycles.

In some examples, set forth herein is an energy storage device, comprising an anode, an electrolyte, and a cathode according the cathodes set forth above.

In some examples, set forth herein is a cathode wherein the doped conversion chemistry material is glassy or amorphous in which crystalline domains, if present, are primarily nanocrystalline.

In some embodiments, the cathode includes a mixed electron-ion conducting component ("MEIC component") together with an active component. The MEIC component may generally be made of any material that is compatible with the other materials of the device and allows electron and lithium ion transport sufficient for operation of the device. In some examples, the MEIC component is a material having an electronic conductivity of $10^{-7}$ S/cm or greater at the device operating temperature. In some examples, the MEIC component is a material having a lithium ion conductivity of $10^{-7}$ S/cm or greater at the device operating temperature.

Examples of materials that may be used as the MEIC component include, without limitation, lithium titanates, lithium iron phosphates, vanadium oxides, cobalt oxides, manganese oxides, lithium sulphides, molybdenum sulphides, iron sulphides, LiPON, $MoO_3$, $V_2O_5$, carbon, copper oxides, lithium insertion compounds such as $LiCoO_2$, $Li(CoMn)O_2$, $LiMn_2O_4$, $Li(CoNiMn)O_2$, $Li(NiCoAl)O_2$, or other materials having relatively high lithium ion conductivity. In some examples, the MEIC component is made of the same material as that of the solid state electrolyte. In one version, the MEIC component is made of a different material than that of the solid state electrolyte. The MEIC component may itself possess electrochemical activity (e.g., $MoO_3$ or $V_2O_5$) or may not show electrochemical activity (e.g., LiPON). In one version, the MEIC is LiPON.

If the cathode includes an MEIC component, the minimum amount of MEIC component will generally be the amount that allows sufficient lithium ion and electron transport for functioning of the device. The maximum amount will be that amount of MEIC that provides an electrochemically active cathode material with the required specific capacity or other electrical characteristics when operating at required rates, voltage windows, and states of charge. In one version of the devices including an MEIC, the minimum amount of MEIC is about 1% or about 5% of the cathode material by weight. In one version of the devices including an MEIC, the maximum amount of MEIC is about 50% or 25% of the cathode material by weight.

The MEIC material may be provided in the electrode in various forms. In one example, small particles of MEIC are mixed with the electrochemically active particles and compressed. In another example, the MEIC arrays into vertical wires. The MEIC may include at least two materials, one having high electron conductivity and another having high ionic conductivity.

In some versions of the device, the cathode includes an electron conductor dispersed to increase the electron conductivity of the electrode. In some embodiments, the component has an electron conductivity value about $10^{-7}$ S/cm. This compound may be a carbon or metal compound in some embodiments. Examples of forms of carbon that may be employed include graphite, activated carbon, ketjen black, nanotubes, nanofibers, nanowires, graphene, graphene oxide, etc. A cathode may include active material with about 10% or about 20% of an electron conductor by weight or less. Examples of such material may be nanowires, nanoparticles, and nanocrystals and materials may be oriented in the direction from the electrode to the electrolyte, or may be randomly dispersed. In certain embodiments, the material forms a percolating network throughout the cathode.

In some embodiments, the cathode includes a Li ionic conductor dispersed to increase the ion conductivity of the electrode. Example materials may be nanowires, nanoparticles, or nanocrystals. These may be oriented in the direction from the electrode to the electrolyte, or may be randomly dispersed. The ion material may be formed in coverings around active material particles. In certain embodiments, the material forms a percolating network throughout the cathode. In some embodiments, the material has an ion conductivity of at least $10^{-7}$ S/cm, or at least $10^{-5}$ S/cm, or at least $10^{-4}$ S/cm at the operating temperature of the device. A non-limiting list of example materials includes lithium iron phosphate, carbon, $Li_2O$—$SiO_2$—$ZrO_2$, Li—Al—Ti—P—O—N, $LiMO_2$, $Li_{10}GeP_2S_{12}$, $Li_{1.5}Al_{0.5}Ge_{1.5}(PO_4)_3$, $Li_7La_3Zr_2O_{12}$, $Li_9SiAlO_8$, $Li_3Nd_3Te_2O_{12}$, $Li_5La_3M_2O_{12}$(M=Nb, Ta), $Li_{5+x}M_xLa_{3-x}Ta_2O_{12}$ (M=Ca, Sr, Ba), LiPON, lithium sulfide, lithium iron sulfide, iron sulfide, lithium phosphate, Lisicon, thio-lisicon, glassy structures, lanthanum lithium titanate, garnet structures, β" alumina, and lithium solid electrolytes. In some embodiments, the material has an ion conductivity at least greater than the ion conductivity of the electrolyte. The ion conductor may be present in amounts of about 20% or less or about 10% or less of the active material in the cathode.

In some embodiments, a thin film of electrochemically active cathode material is formed between a positive current collector and the electrolyte, which in turn contacts an anode or anode current collector. Optionally, an MEIC component may also be included. Any active component and MEIC component described above may be used. The thin film may be a continuous layer, which may be deposited by sputtering. Alternatively, it may be a layer including particles and/or nanodomains and is optionally held together by a binder. In some embodiments, the thin film cathode has a thickness of between about 2.5 nm and about 500 nm, or between about 5 nm and 300 nm, or about 200 nm or greater.

In certain embodiments, the cathode may contain a first thickness of lithium fluoride material configured in either amorphous or polycrystalline state. The cathode may also include a first plurality of nucleated iron metal species overlying the first thickness of lithium fluoride material. The cathode may also have a second thickness of lithium fluoride material formed overlying the first plurality of iron metal species. The second thickness of lithium fluoride material may be configured in either an amorphous or polycrystalline state to cause formation of a lithiated conversion material. The cathode region may be characterized by an energy density of greater than 80% to about 100% of a theoretical energy density of the cathode region. In some embodiments, the plurality of metal species nucleated overlying the first thickness of lithium fluoride material causes formation of exposed regions of the first thickness of lithium fluoride material, or a thinner region of iron metal species disposed between a pair of the plurality of iron metal species. For example, each of the first thickness of lithium fluoride material or the second thickness of lithium fluoride material may be between about 30 nm and 0.2 nm. Each of the first plurality of iron metal species may have a diameter of about 5 nm to 0.2 nm. The plurality of first iron metal species may be spatially disposed evenly overlying the thickness of the first thickness of lithium fluoride material.

II. CERTAIN CONVERSION MATERIALS WITH AND WITHOUT DOPANTS

In some other examples, the doped conversion material includes lithium fluoride and at least one disordering dopant.

In these examples, the doped conversion material including lithium fluoride maintains a lithium ion conductivity of greater than about 1E-8 S/cm over at least about 500 charge/discharge cycles or greater than about 1E-8 S/cm over at least about 1000 cycles. In some examples, the disordering dopant includes a compound of a multivalent metal. In certain examples, the disordering dopant includes a metal, wherein the metal may be selected from the group consisting of Zr, Al, Hf, Nb, Cr, C, Cu, Ti, V, Co, Ni, Mn, Mo, Zn, and combinations thereof. In some examples, the disordering dopant includes a metal fluoride selected from the group consisting of $ZrF_x$, $HfF_x$, $CrF_x$, $AlF_x$, $NbF_x$, $BaF_2$, $BeF_x$, $LaF_x$, $NaF$, $TaF_x$, $TiF_x$, $VF_x$, $ZnF_x$, $CoF_x$, $CuF_x$, $NiF_x$, $YF_x$, $BiF_x$, $SiF_x$, $MgF_x$, $CaF_x$ and combinations thereof. In some embodiments, the disordering dopant further includes an oxide, e.g., cobalt oxide (e.g., $CoO_2$ and/or $Co_2O_3$), molybdenum oxide ($MoO_x$, e.g., $MoO_2$ or $MoO_3$), aluminum oxide ($Al_2O_3$), copper oxide ($Cu_xO_y$, e.g., CuO or $Cu_2O_3$), magnesium oxide (MgO), and combinations thereof. In some embodiments, the dopant is a metal oxy fluoride such as $MoO_aF_b$, where a is between about 0 and 3 and b is, independently, between about 0 and 6. In some embodiments, a is between about 1 and 3 and b is between about 1 and 6. In some embodiments, more than one type of dopant is combined in conversion material. Example combinations include: Cu and $MoO_2$, Cu and $MoO_3$, $CuF_2$ and $MoO_2$, $CuF_2$ and $MoO_3$, Ni and $CuF_2$, Cu and $AlF_3$, Ni and $AlF_3$, Cu and $CuF_2$, and Mo and $CuF_2$. In some embodiments, the disordering dopant further includes a phosphate. For example, the phosphate, when present, includes, but is not limited to, a lithium phosphate, a lithium metaphosphate, a lithium dihydrogen phosphate, a phosphate nanocomposite, or a hydrogen phosphate. In some examples, the dopant is present at 1, 2, 3, 4, 5, 6, 7, 8, 9, 10, 11, 12, 13, 14, 15, 16, 17, 18, 19, 20, 21, 22, 23, 24, or 25 atomic percent (corresponding to 0.1 to 30 percent by weight).

In some examples, the disordering dopant is an oxygen or a nitride network former. In some examples, the disordering dopant is lithium metal which is present in a concentration of between about 0.1% and about 10% (atomic percent), or about 5% to about 10%, in the doped conversion material. In some examples, the conversion material comprises a sulfide, an oxide, a halide, a phosphide, a nitride, a chalcogenide, an oxysulfide, an oxyfluoride, a sulfur-fluoride, or a sulfur-oxyfluoride. In some examples, the conversion material is doped with a metal component, such as, but not limited to, Fe, Cu, or Ni, and a lithium compound component, such as, but not limited to, lithium fluoride or lithium oxide, e.g., $Li_2O$.

Cathodes contain materials that participate in reactions that facilitate charge and discharge to produce electrical energy, and such materials may be broadly termed "active materials" or "electrochemically active materials". In various embodiments, about 40% of a cathode may include active material. In some embodiments, about 50% of a cathode may include active material. In some other embodiments, about 55% of a cathode may include active material. In certain embodiments, about 90% of a cathode may include active material. Cathodes may contain a high capacity active material that reversibly undergoes a redox reaction at a high rate over many cycles of charge and discharge. Such materials are sometimes referred to herein as "conversion" materials. They generally have lower cost and higher energy density than cathode materials in conventional lithium-ion batteries. Another example of an active material is an intercalation material.

In general, intercalation and/or conversion materials may be used in battery systems. For example, a cathode material may be used for intercalation or conversion with lithium. Intercalation materials, which can be prepared at a macro scale or at a nano scale, typically have relatively low energy density (e.g., less than about 800 Wh/kg of active material).

Conversion materials, in contrast, can provide much higher energy density (e.g., about 1000 Wh/kg to 2500 Wh/kg of active material). Battery systems and structures utilizing conversion material are described in U.S. Nonprovisional patent application Ser. No. 14/207,493, filed on Mar. 12, 2014, titled "IRON, FLUORINE, SULFUR COMPOUNDS FOR BATTERY CELL POSITIVE ELECTRODES;" and U.S. Nonprovisional patent application Ser. No. 13/922,214, filed on Jun. 19, 2013, and titled "NANOSTRUCTURED MATERIALS FOR ELECTROCHEMICAL CONVERSION REACTIONS," all of which are incorporated by reference herein in their entireties.

When considered across a range of states of charge, the conversion material may include an oxidizing species, a reducing cation species, and a metal species. These species are sometimes referred to herein as constituents or components. As disclosed herein, such materials also include a small amount of "dopant," a material that introduces disorder in the conversion material and thereby improves conductivity. This section describes conversion materials in general terms usually without reference to dopants, which are described in a later section.

III. CERTAIN TYPES OF DOPANTS

The oxidizing species is typically a strongly electronegative element, compound, or anion. Examples of oxidizing species anions include halides (fluorides, chlorides, bromides, and iodides), oxides, sulfides, and the like. The reducing cation species is typically an electropositive element or cation such as lithium, sodium, potassium, or magnesium, and ions thereof. The metal species is typically less electropositive than the reducing cation species. Transition metals are sometimes used as the metal species. Examples include cobalt, copper, nickel, manganese, and iron.

The conversion material may contain two or more oxidizing species, two or more reducing cation species, and/or two or more metal species. In some embodiments, the discharged conversion material includes a metal component and a lithium compound component.

Cathode conversion materials may exist in a discharged state, a charged state, or an intermediate charge state. In some examples, a battery is designed or operated so that full discharge is never attained. Thus, if the fully charged conversion material is ferric fluoride ($FeF_3$), for example, the "fully" discharged cathode may contain a mixture of elemental iron (Fe), lithium fluoride (LiF), possibly some ferric fluoride ($FeF_3$), and possibly some ferrous fluoride ($FeF_2$). The use of "discharged" or "discharged state" herein is a relative term, referring only to a state of a conversion material that is more discharged than a charged state of the conversion material. The use of "charged" or "charged state" herein refers to a state of a conversion material that is more charged than a corresponding discharge state of the material.

In the discharged state, the metal species is generally more reduced than in the charged state. For example, the metal species may be an elemental state or have a lower oxidation state (e.g., +2 rather than +3). Further, during discharge, the oxidizing species may pair with the reducing cation species and unpair from the metal species. Also during discharge, the reducing cation species may tend to move into the cathode where it becomes oxidized by pairing with the oxidizing species. Pairing is typically manifest by formation of a chemical bond, such as a covalent or ionic bond.

In certain implementations, the conversion material in the discharged state includes an elemental metal material, one or more oxidizing species, and a reducing cation material. As an example, the discharge state may include at least an elemental metal such as iron (Fe) and a reducing cation halide such as lithium fluoride (LiF). The components of the discharged conversion material may be intimately distributed with one other in the discharged material. These materials may be intermixed or distributed at a scale of about 20 nm or smaller.

In the charged state, the metal species may tend to pair with the oxidizing species, often forming a compound. During charging, the oxidizing species tends to unpair from the reducing cation species and pair with the metal species. The reducing cation species tend to move out of the cathode and migrate and/or diffuse to the anode, where they exist in a more strongly reduced state (e.g., as an elemental metal such as lithium metal, or lithium inserted in a matrix of carbon or silicon).

As an example, during charge, elemental iron (Fe) may pair with fluorine anions ($F^-$) to form ferric fluoride ($FeF_3$) and/or ferrous fluoride ($FeF_2$). Concurrently, fluoride anions ($F^-$) may unpair from a reducing cation metal species such as lithium of lithium fluoride (LiF). The newly freed lithium cation ($Li^+$) may then migrate and/or diffuse to the anode, where it is reduced to elemental lithium (Li) or a lithium intercalation material.

IV. CELL STRUCTURE TYPES

In various embodiments, the cathode includes particles of electrochemically active material. FIG. 1A shows an example of a cell structure, which includes negative current collector 100, electrolyte 102, cathode layer 104a including particles, and positive current collector 106. The negative current collector 100 contacts the electrolyte 102, which in turn contacts the cathode layer including its constituent particles 104a. The cathode layer of particles 104a also contacts the positive current collector 106. The cathode may include an additive to improve electronic conductivity between the active cathode particles and the positive current collector. Such an additive may be a carbon particle or a mixed electron-ion conductor (MEIC).

In some embodiments, the cell includes a single liquid phase electrolyte, often in conjunction with an intercalation type anode. In such embodiments, a porous separator may be used to prevent contact between the anode and cathode.

In some embodiments, a two-phase electrolyte may be used. In one example, the cathode includes a catholyte surrounding the particles of active cathode material, and the catholyte may be separated from the anode by a layer of solid state electrolyte. The catholyte and cathode particles together form a cathode layer as depicted in layer 104a and the electrolyte layer may correspond to layer 102 as shown in FIG. 1A. The catholyte material is conductive to ions but may be insufficiently conductive to electrons, in which case an additive, such as carbon or another electronically conductive material, may be added to the cathode. In embodiments employing lithium or another metal anode, the solid state portion of the separator or electrolyte may help prevent metal dendrites from forming.

Liquid catholyte compositions may include carbonate electrolytes (e.g., EC (ethylene carbonate), DEC (diethyl carbonate), DMC (dimethyl carbonate), EMC (ethyl methyl carbonate), VC (vinylene carbonate), FEC (fluoroethylene carbonate), PC (propylene carbonate) with salts such as LiTFSI (lithium bis(trifluoromethanesulfonyl)imide), $LiPF_6$ (lithium hexafluorophosphate), LiBOB (lithium bis(oxalate) borate), LiODFB (lithium oxalyldifluoroborate), LiFAP (lithium fluoroalkylphosphate), LiFSI (lithium bis(fluorosulfonyl)imide), etc.) or non-carbonate electrolytes (e.g., ionic liquids, siloxanes, organosilicones, ethers, nitriles, glymes, etc.). Catholytes may have high voltage and low voltage stability (down to about 1V since the cathode may operate down to a low voltage limit, and up to about 4.5V or greater). Some species for catholyte compositions have high temperature stability, such as siloxanes and other organosilicons.

In some examples, a solid phase electrolyte and/or catholyte may be used. The cathode may also include an electron conductor, an ion conductor, and/or an MEIC. Various solid phase electrolytes are described in International PCT Patent Application PCT/US2014/038283, filed, May 15, 2014, which is incorporated herein by reference in its entirety. Examples of solid phase electrolytes include LXPS, LSPS, and LiPON (lithium phosphorus oxynitride). Carbon or carbon materials may be added to improve the electronic conductivity. As used herein, LXPS refers to an electrolyte material characterized by the formula $Li_aP_bS_cM_d$ (M=Si, Ge, and/or Sn). Also as used herein, LSPS refers to an electrolyte material characterized by the formula $L_aSiP_bS_c$, wherein, where $2 \leq a \leq 10$, $0.5 \leq b \leq 2.5$, $4 \leq c \leq 12$, $d \leq 3$. In some examples, $1 \leq a \leq 12$, $0.25 \leq b \leq 3.0$, $3 \leq c \leq 14$, $0 \leq d \leq 3$. Example LXPS materials are found, for example, in International PCT Patent Application N. PCT/US14/38283, the contents of which are herein incorporated by reference in their entirety for all purposes. In some examples, the electrolyte is $Li_{10}Sn_{0.5}Si_{0.5}P_2S_{12}$, $Li_8Sn_{0.5}Si_{0.5}P_2S_{12}$, $Li_6Sn_{0.5}Si_{0.5}P_2S_{12}$, or $Li_4Sn_{0.5}Si_{0.5}P_2S_{12}$.

Figure 1B:
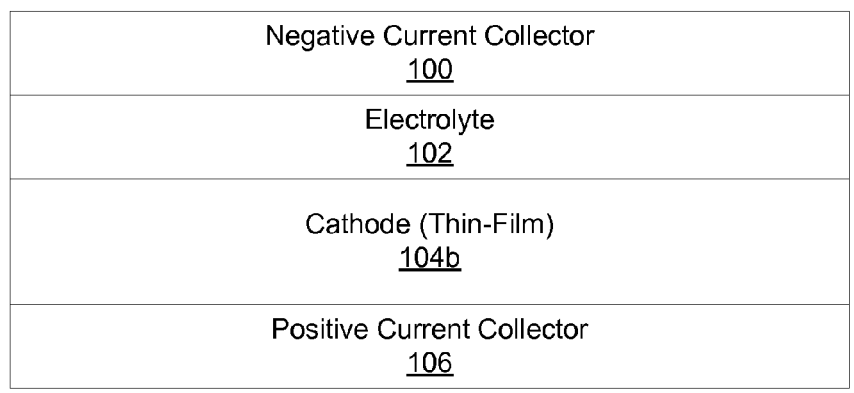

FIG. 1B schematically depicts a thin-film cell format. In various embodiments, a thin film of electrochemically active cathode material 104b is provided between a positive current collector 106 and a thin protective layer (not shown but described in more detail below). The cathode thin film may be a continuous and non-particulate. The protective layer may contact an electrolyte 102, which may be in solid phase or liquid phase. The electrolyte 102, in turn, contacts an anode (not shown) or negative current collector 100. If the electrolyte 102 contacts the negative current collector 100, it may do so only in the discharged state. In a charged state, a metallic anode (not shown) may be deposited in between the electrolyte 102 and the negative current collector 100. Lithium is one example of such a metallic anode material. In various embodiments, the cathode layer 104b without cathode particles may have a thickness of about 1 micrometer or less, or about 500 nanometers or less, or about 200 nanometers or less.

Figure 9:
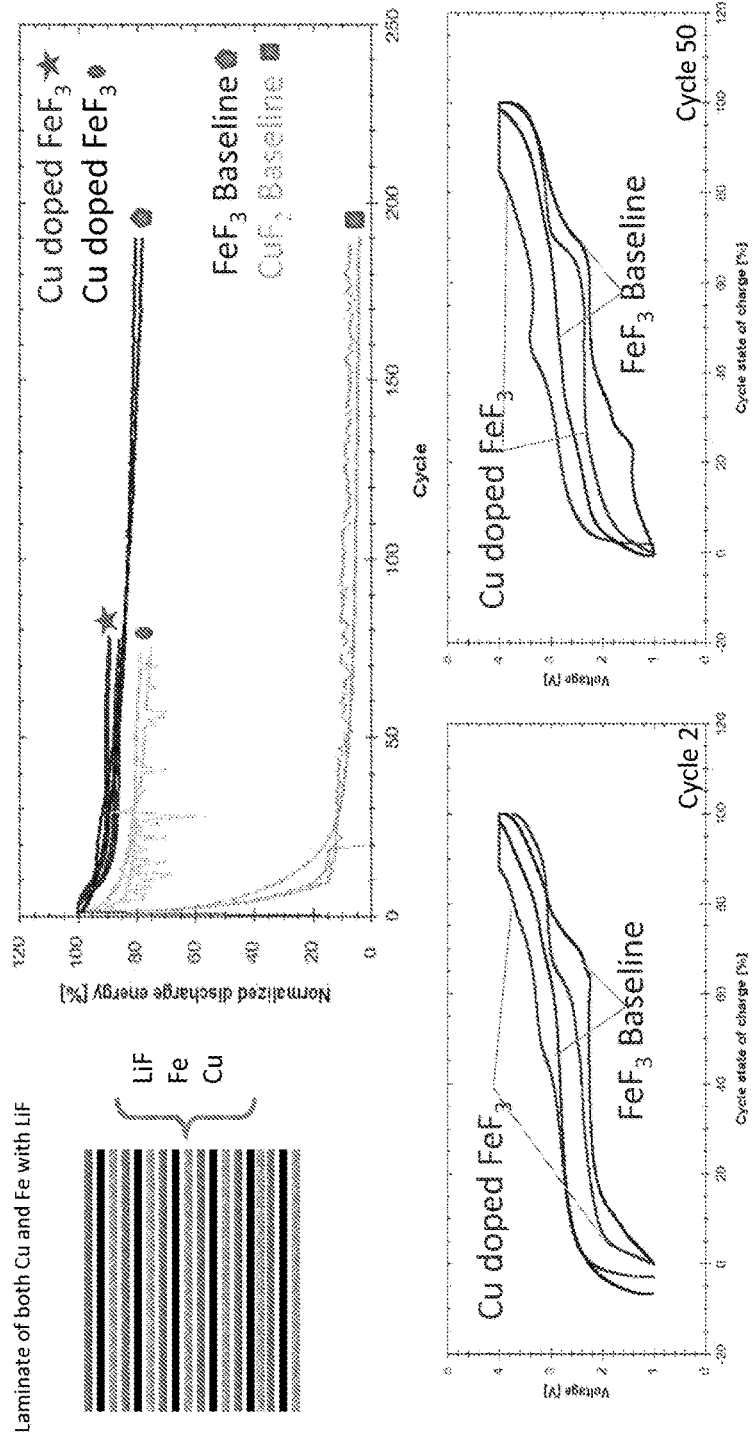
FIG. 9 depicts experimental results for thin films of Cu-doped $FeF_3$ materials with comparison to thin films of undoped $FeF_3$. Top plot shows Normalized Discharge Energy (%) as a function of charge-discharge cycle. Bottom left plot shows Voltage (V) as a function of the cycle state of charge (%) for the second cycle of $FeF_3$ and also $FeF_3$ doped with Cu. Bottom right plot shows Voltage (V) as a function of the cycle state of charge (%) for the $50^{th}$ cycle of baseline $FeF_3$ with comparison to $FeF_3$ doped with Cu.

As shown in FIG. 9, about 1% atomic Cu doping improves the conductivity and the voltage range for cycling $FeF_3$ according to the methods set forth herein. FIG. 9 also demonstrates the stoichiometric control of the dopants that is uniquely possible using the methods and systems set forth herein. Cycling behavior of Cu doped mixture resembles $FeF_3$ but with increased energy (higher conversion plateau).

Figure 29:
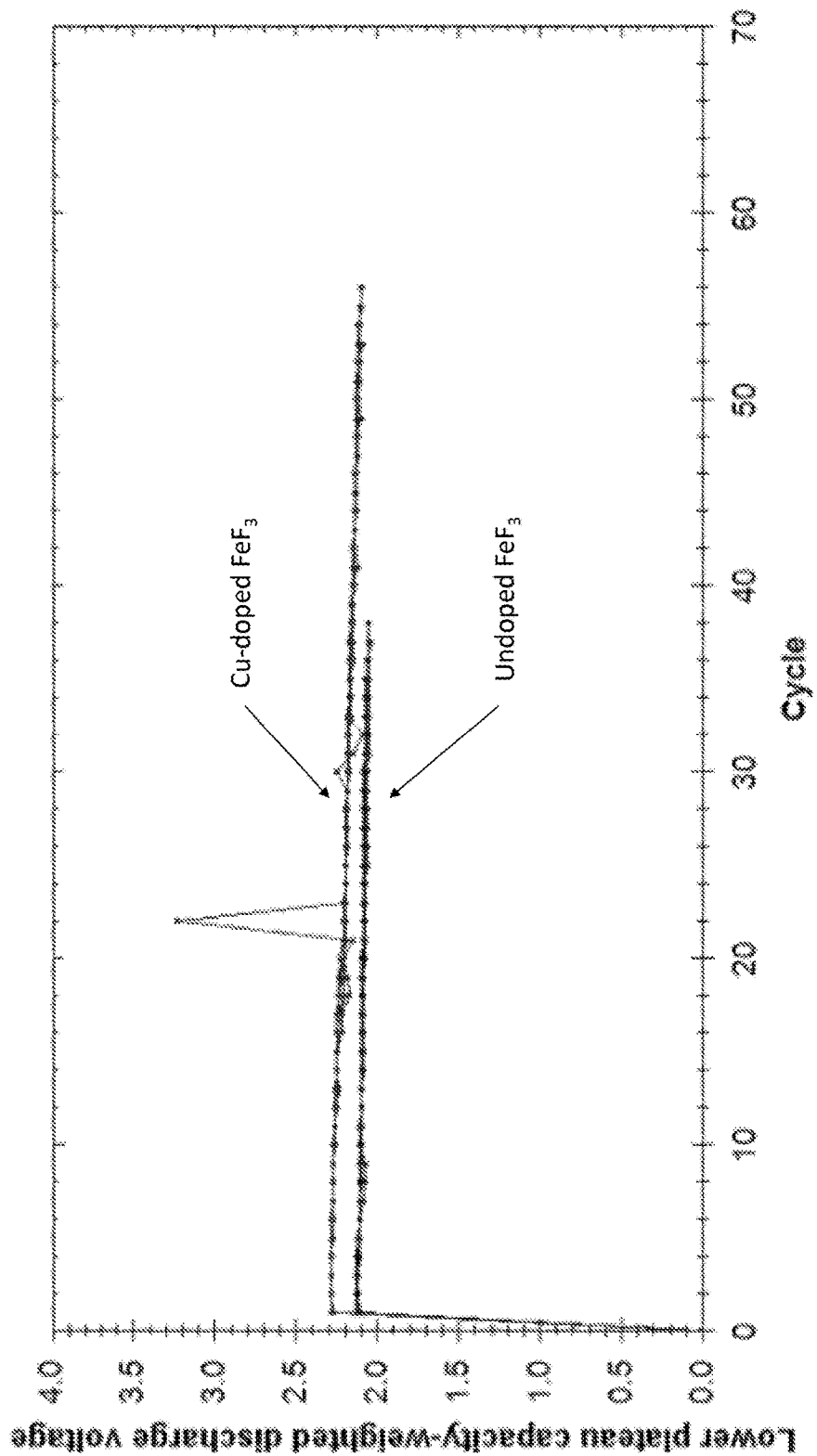
FIG. 29 shows the increase in conversion voltage plateau for Cu-doped $FeF_3$ with comparison to undoped $FeF_3$.

In FIG. 9, the Cu-doped $FeF_3$ material has an increased discharge voltage. This increased discharge voltage shows how doping can increase in the energy density of the doped material with respect to the undoped material. As shown in FIG. 29, this increased discharge voltage, for the doped material with respect to the undoped material, persists over at least 40 or more charge-discharge cycles.

Figure 10:
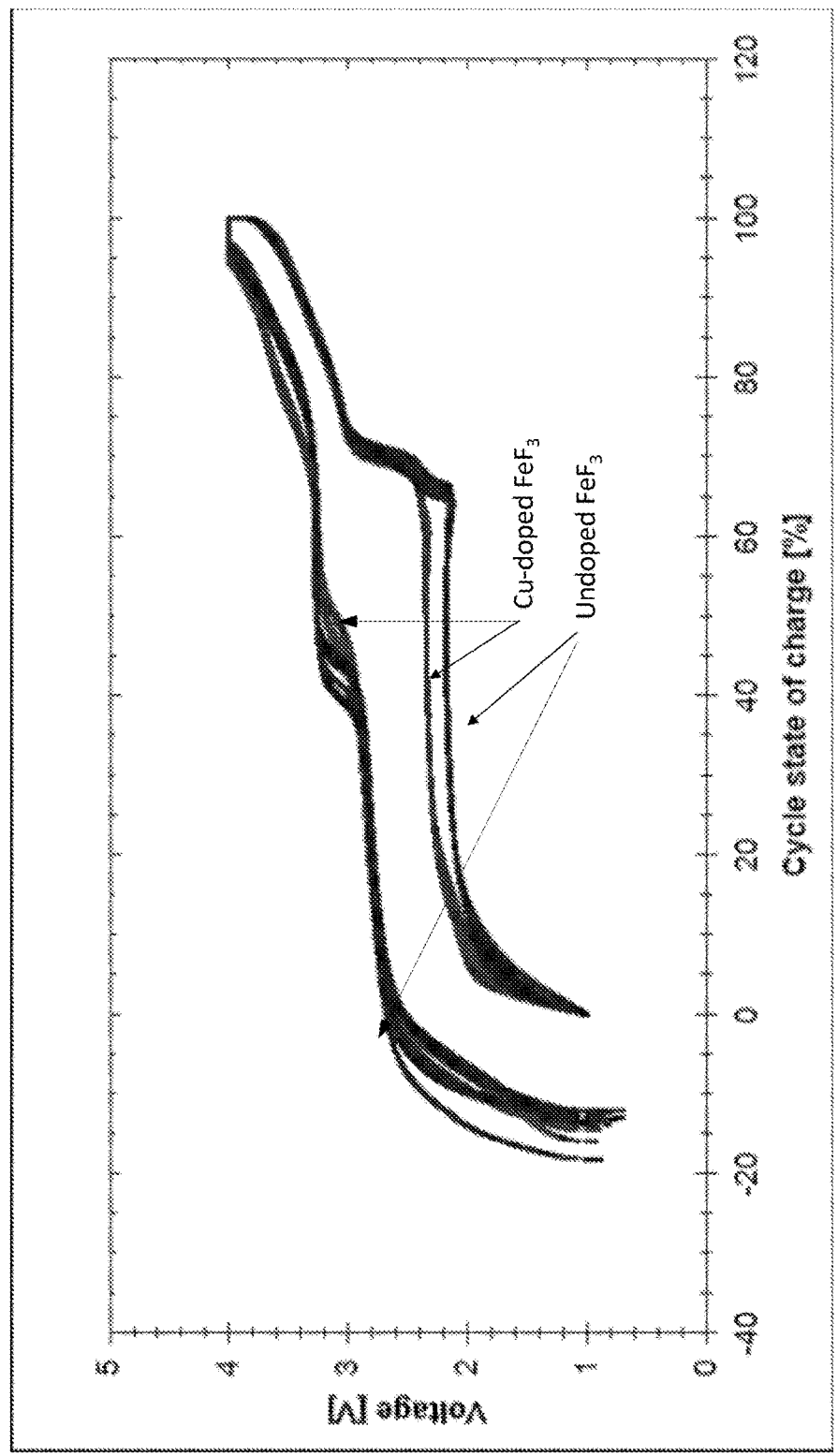
FIG. 10 shows Voltage (V) as a function of the cycle state of charge (%) for baseline thin films of $FeF_3$ with comparison to thin films of $FeF_3$ doped with Cu.
Figure 12:
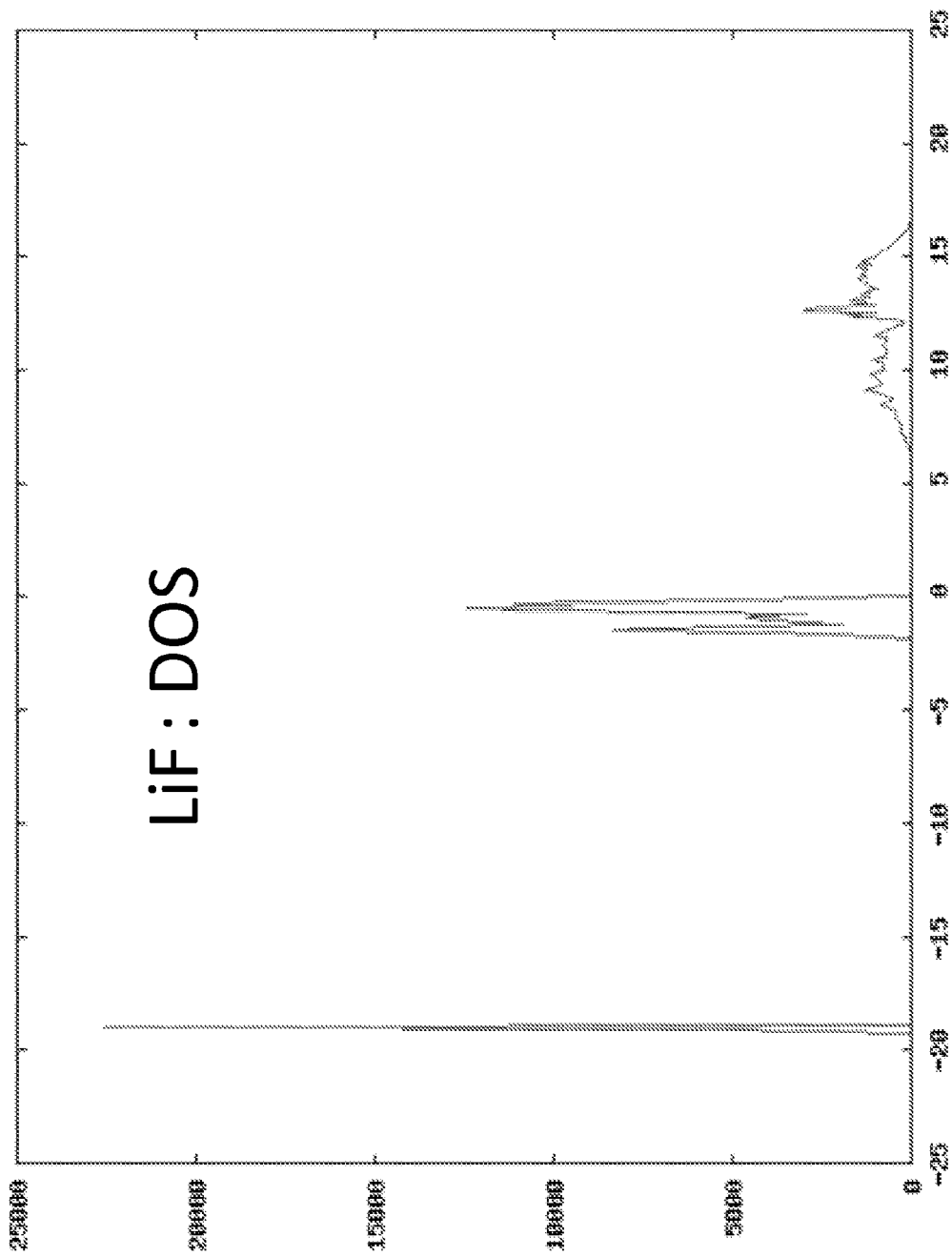
FIG. 12 shows the density of states for LiF.
Figure 13:
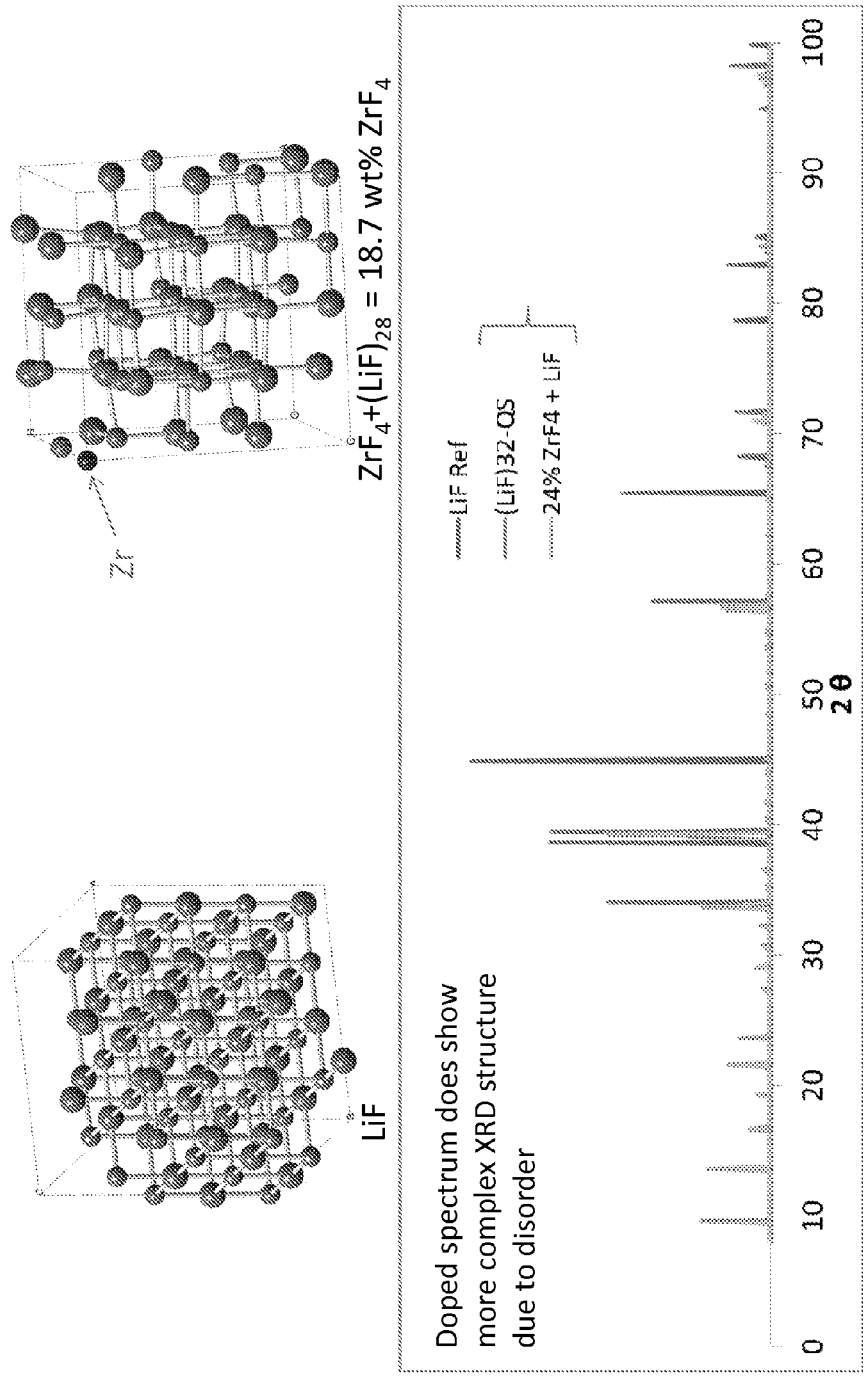
FIG. 13 shows the crystal structure for LiF overlayed with $ZrF_4$-doped LiF.
Figure 14:
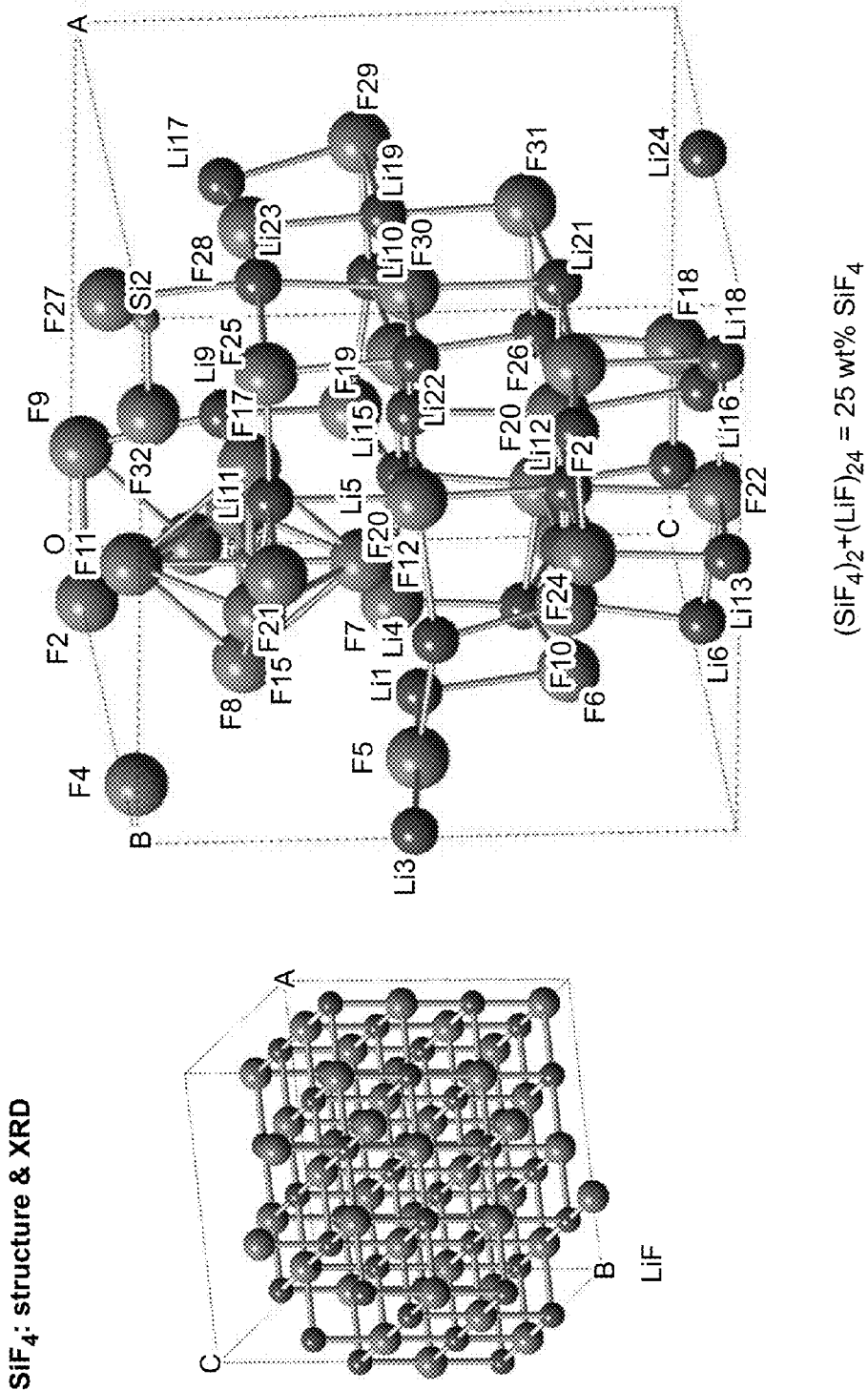
FIG. 14 shows the crystal structure for LiF overlayed with $SiF_4$-doped LiF.
Figure 14:
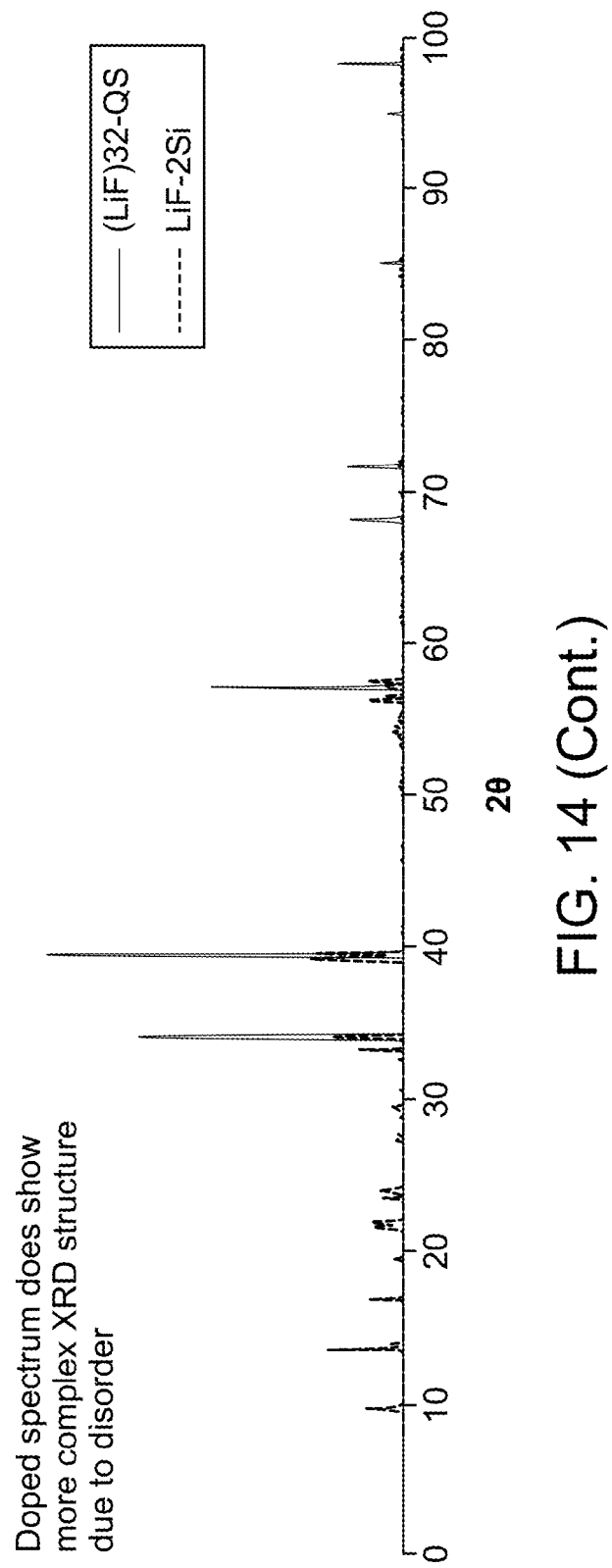
Figure 15:
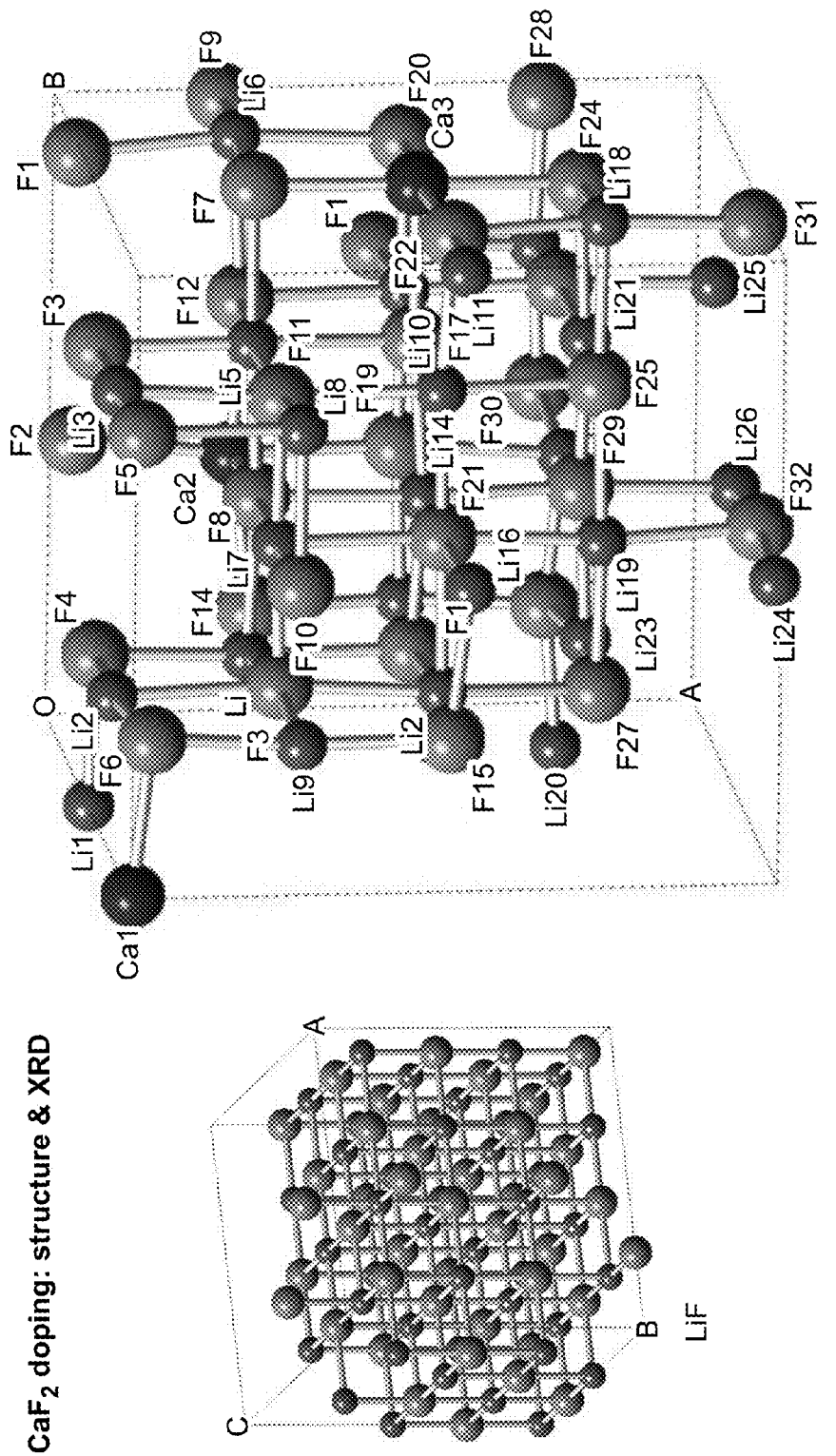
FIG. 15 shows the crystal structure for LiF overlayed with $CaF_2$-doped LiF.
Figure 15:
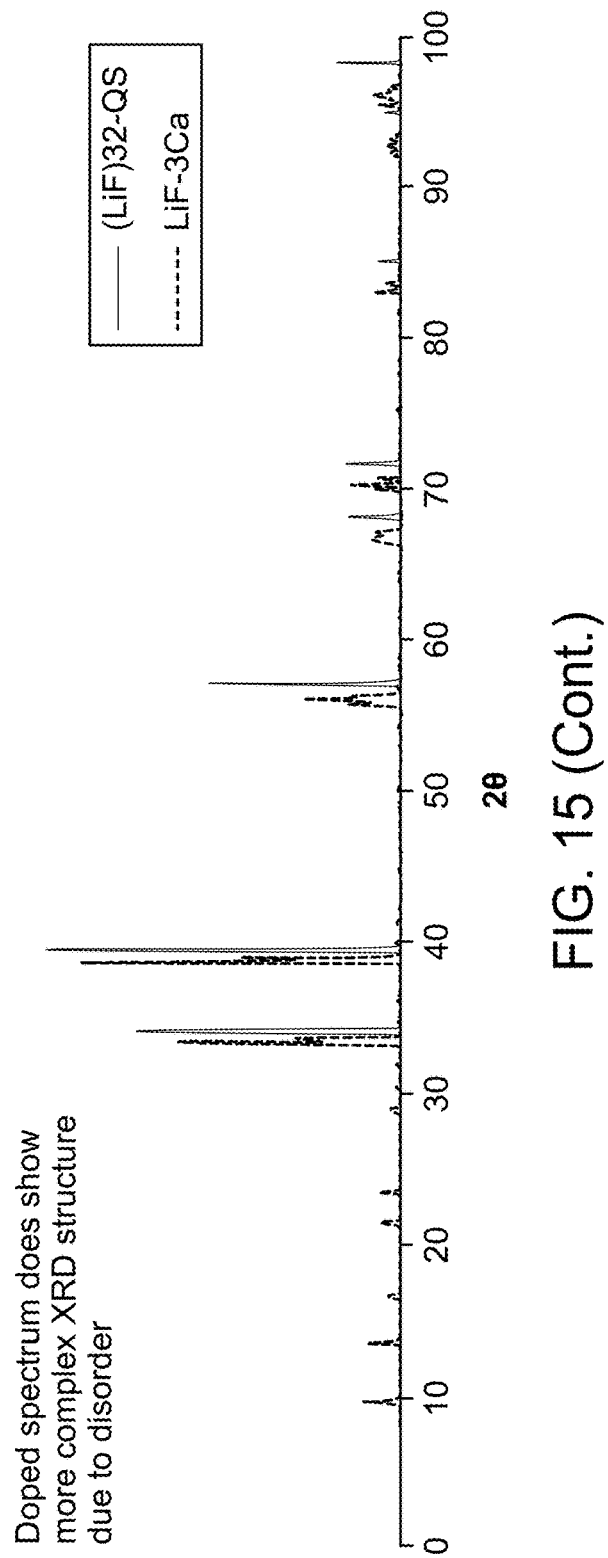
Figure 16:
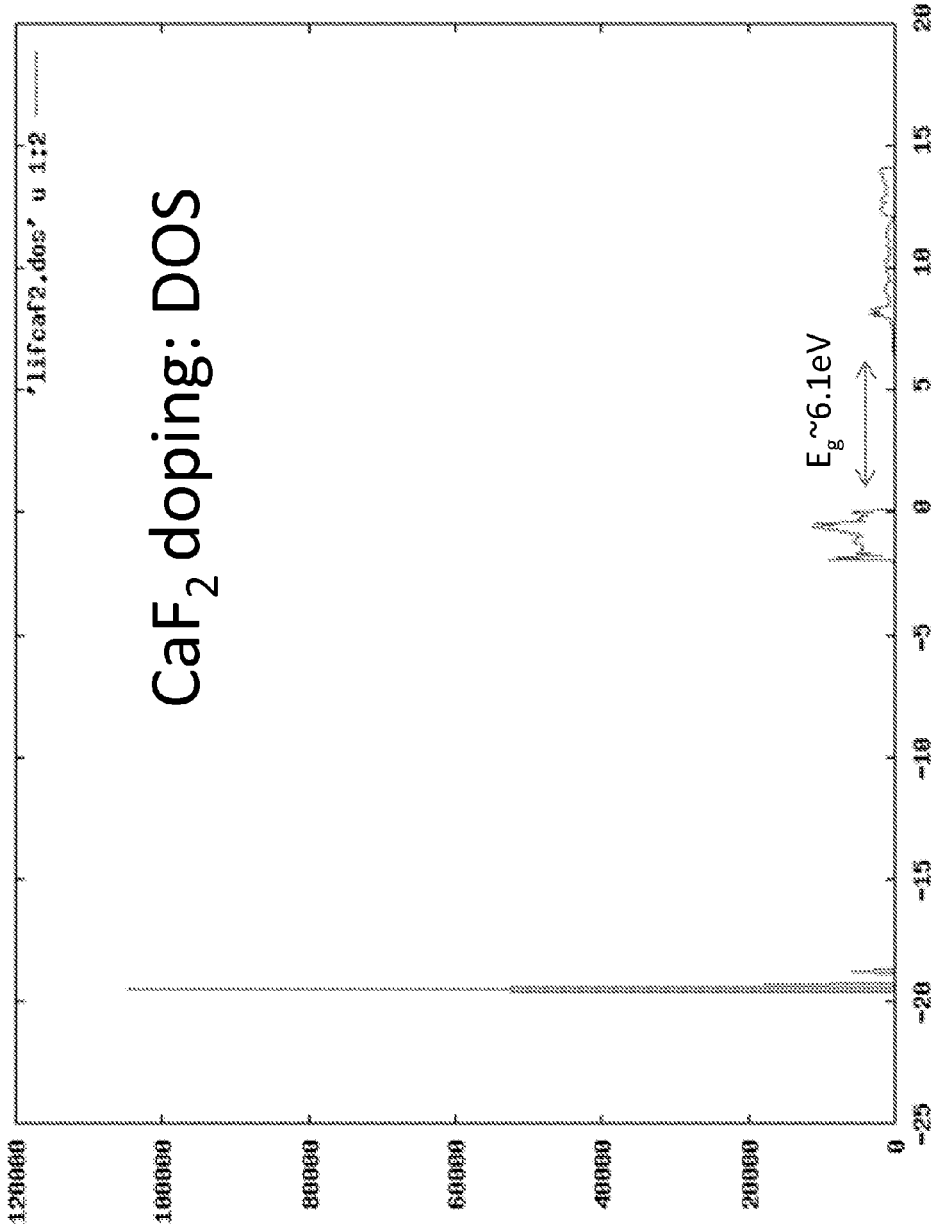
FIG. 16 shows the density of states for LiF doped with $CaF_2$.
Figure 17:
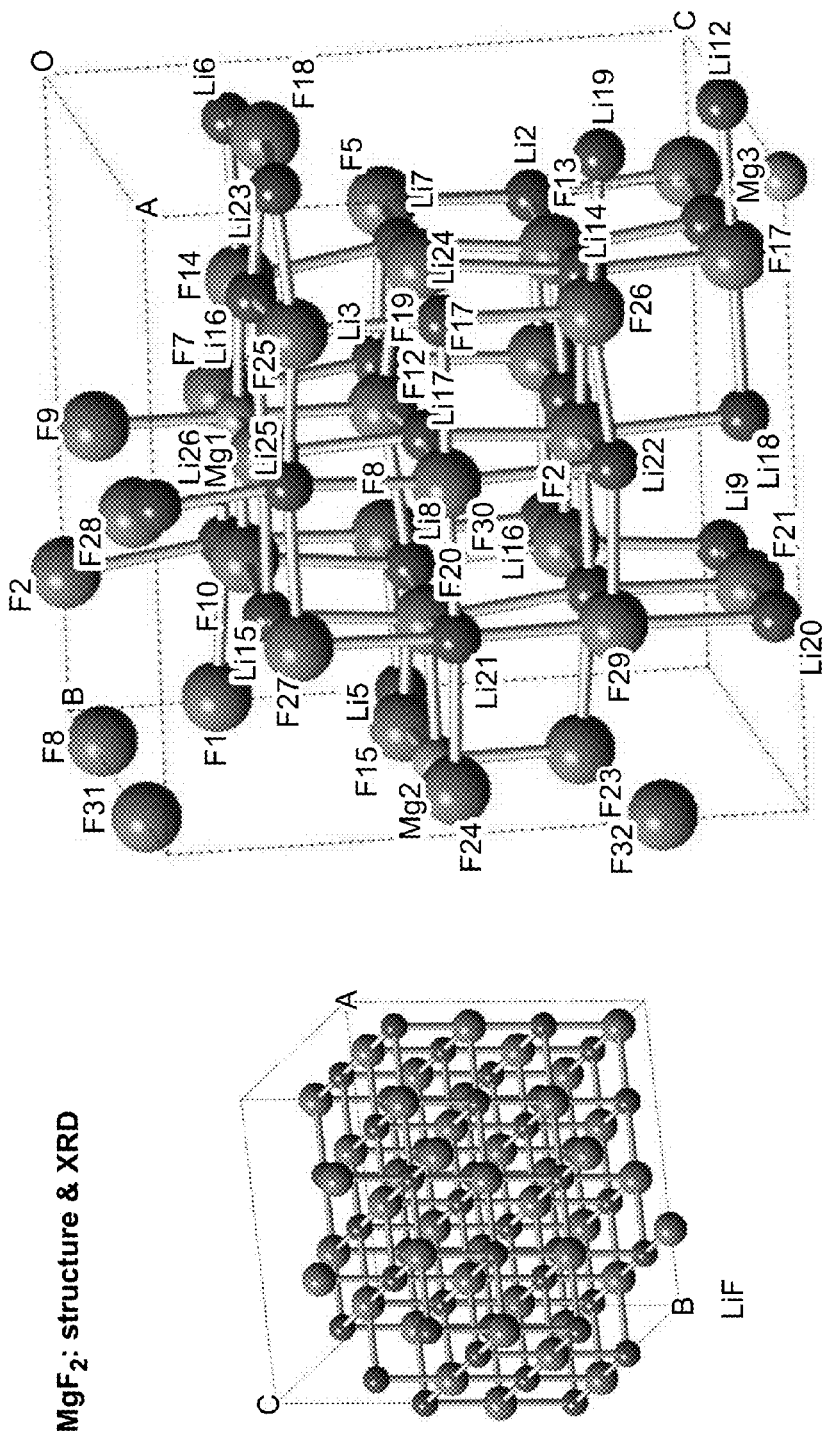
FIG. 17 shows the crystal structure for LiF overlayed with $MgF_2$-doped LiF.
Figure 18:
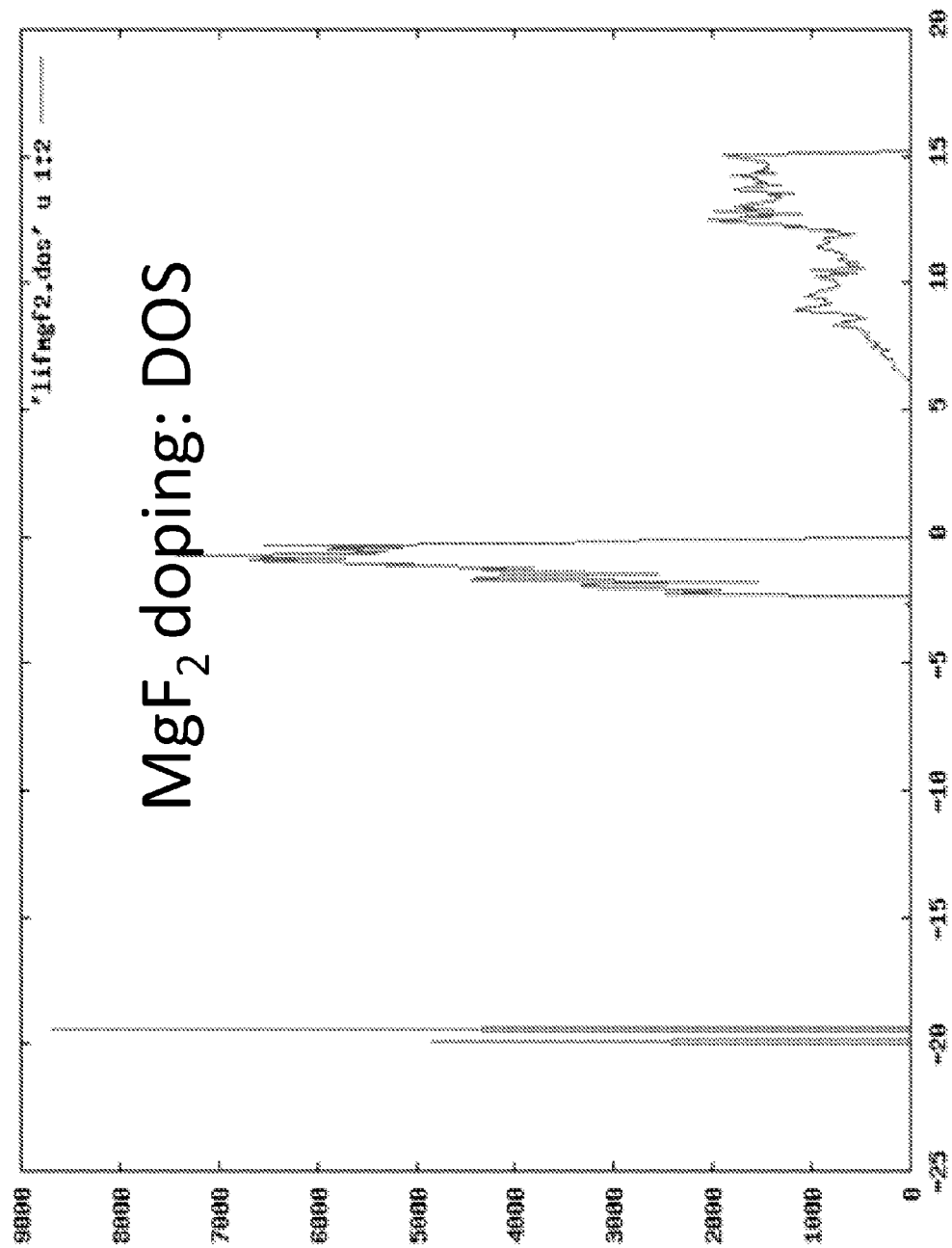
FIG. 18 shows the density of states for LiF doped with $MgF_2$.
Figure 19:
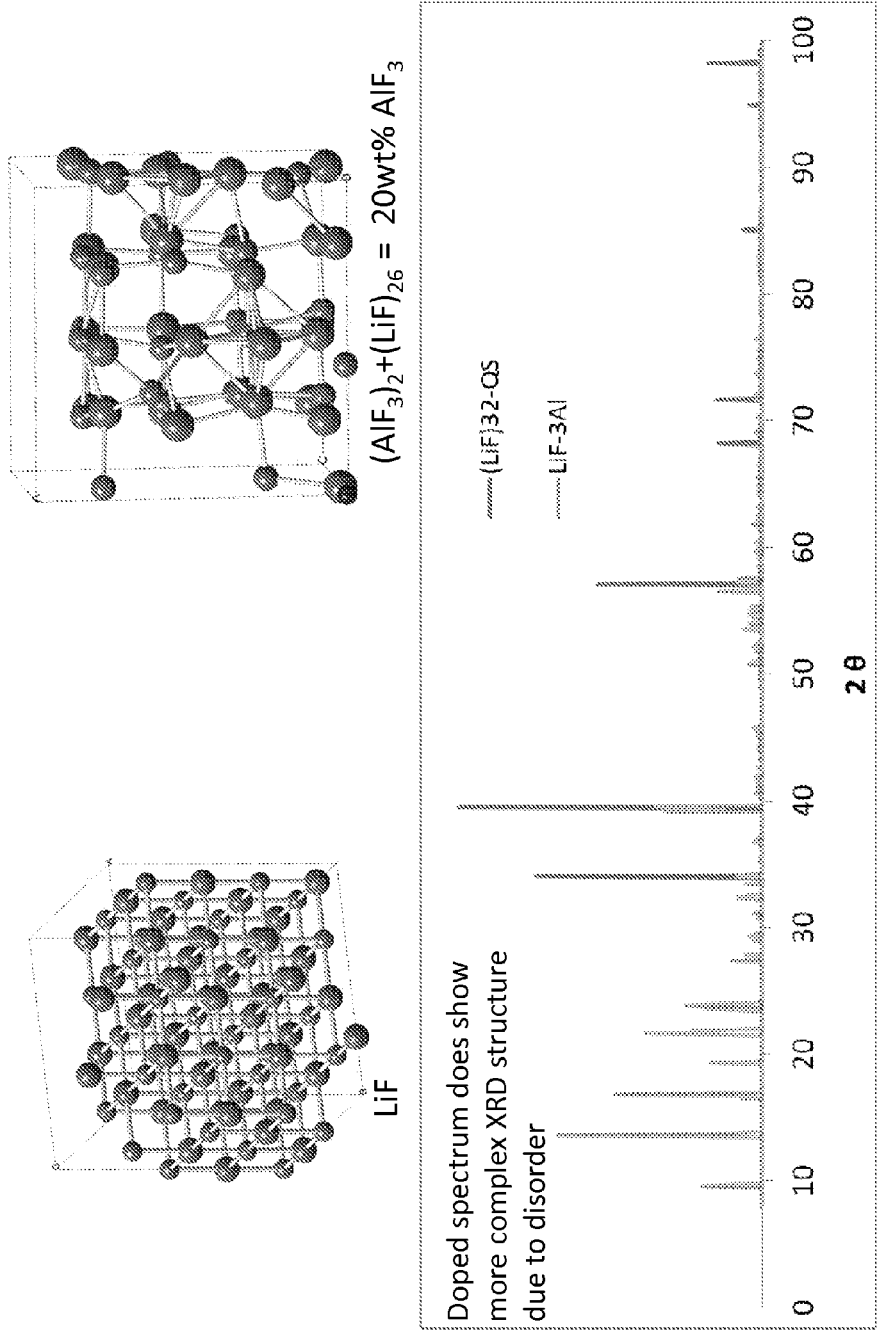
FIG. 19 shows the crystal structure for LiF overlayed with $AlF_3$-doped LiF.
Figure 20:
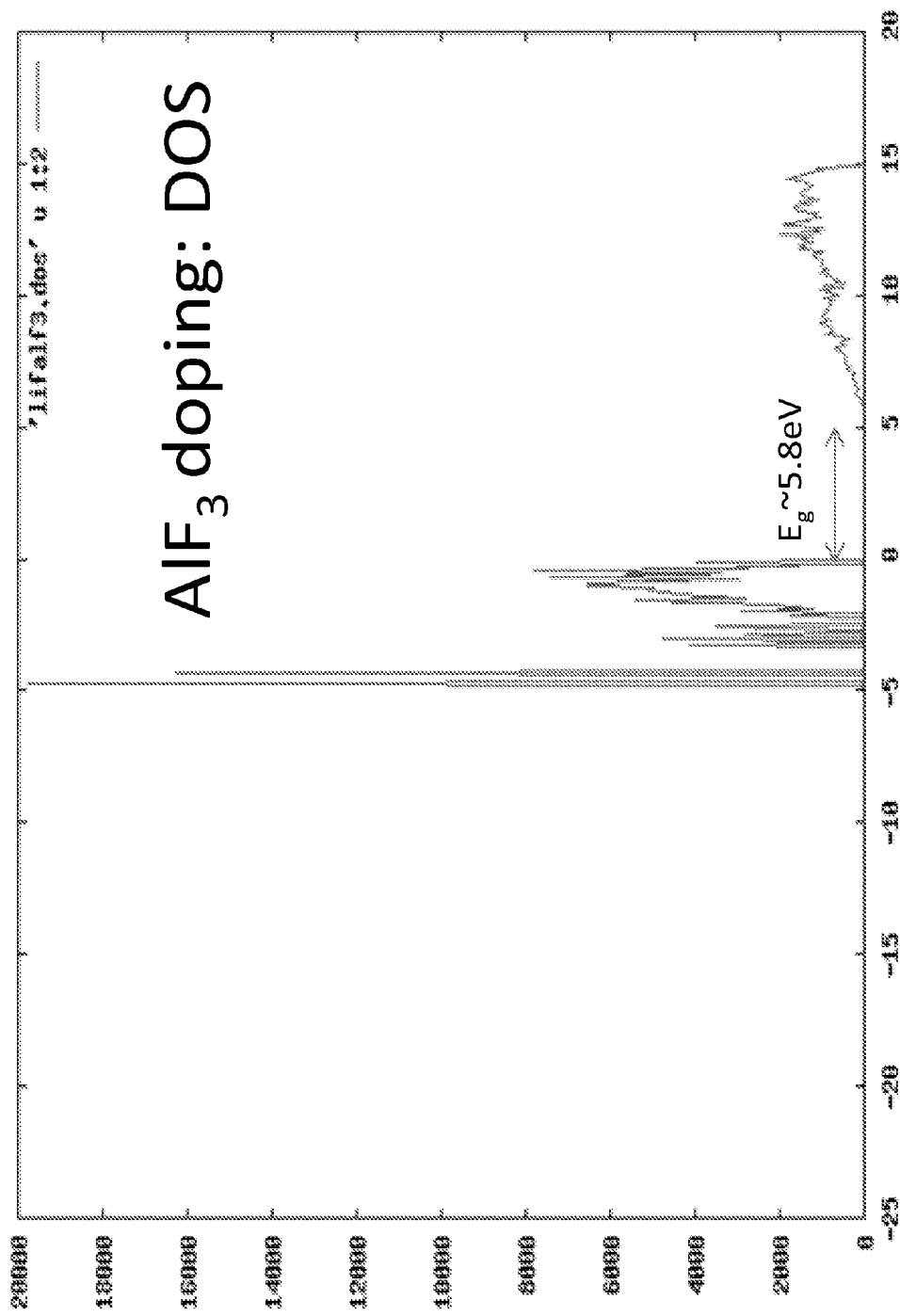
FIG. 20 shows the density of states for LiF doped with $AlF_3$.
Figure 21:
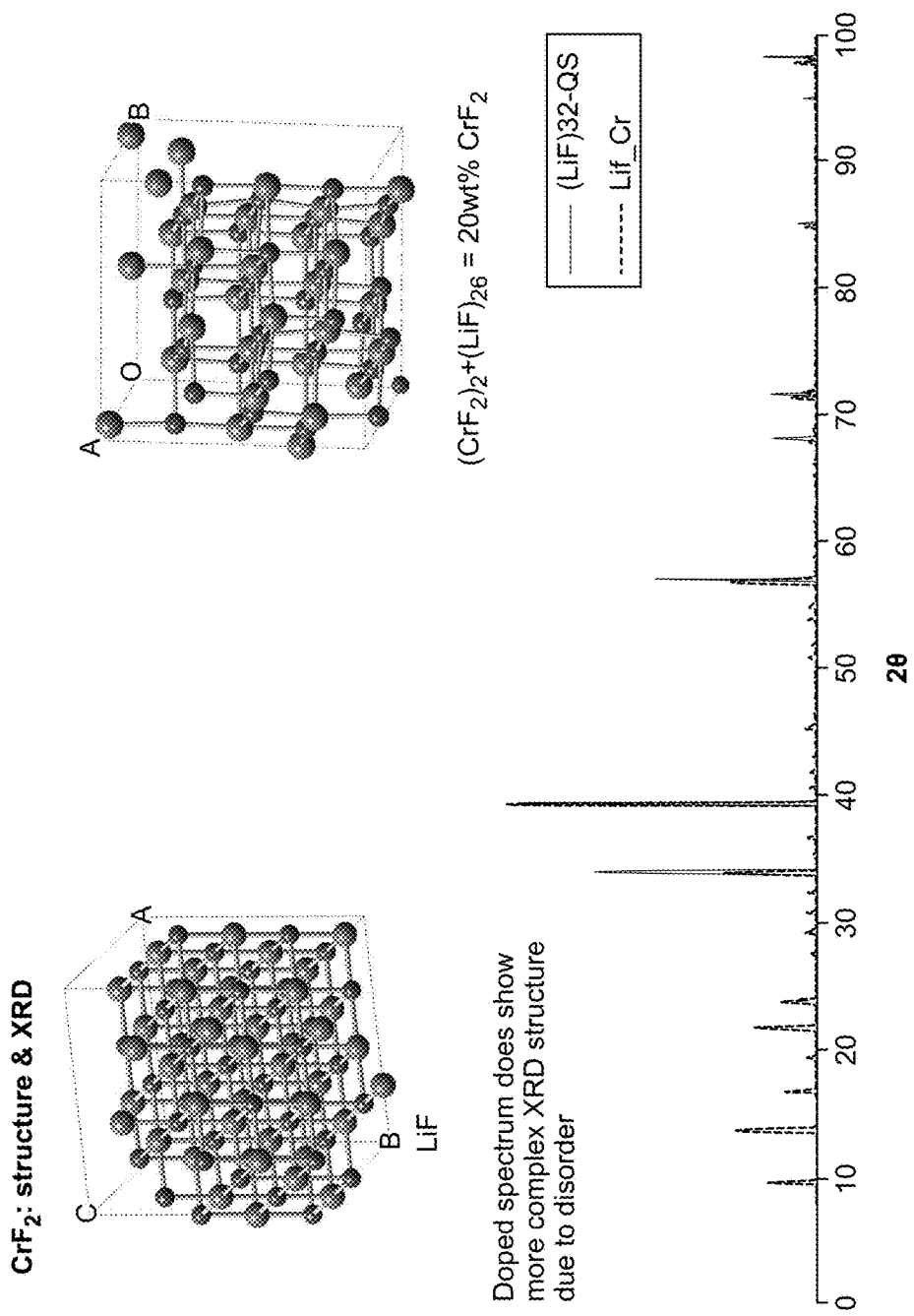
FIG. 21 shows the crystal structure for LiF overlayed with $CrF_2$-doped LiF.
Figure 22:
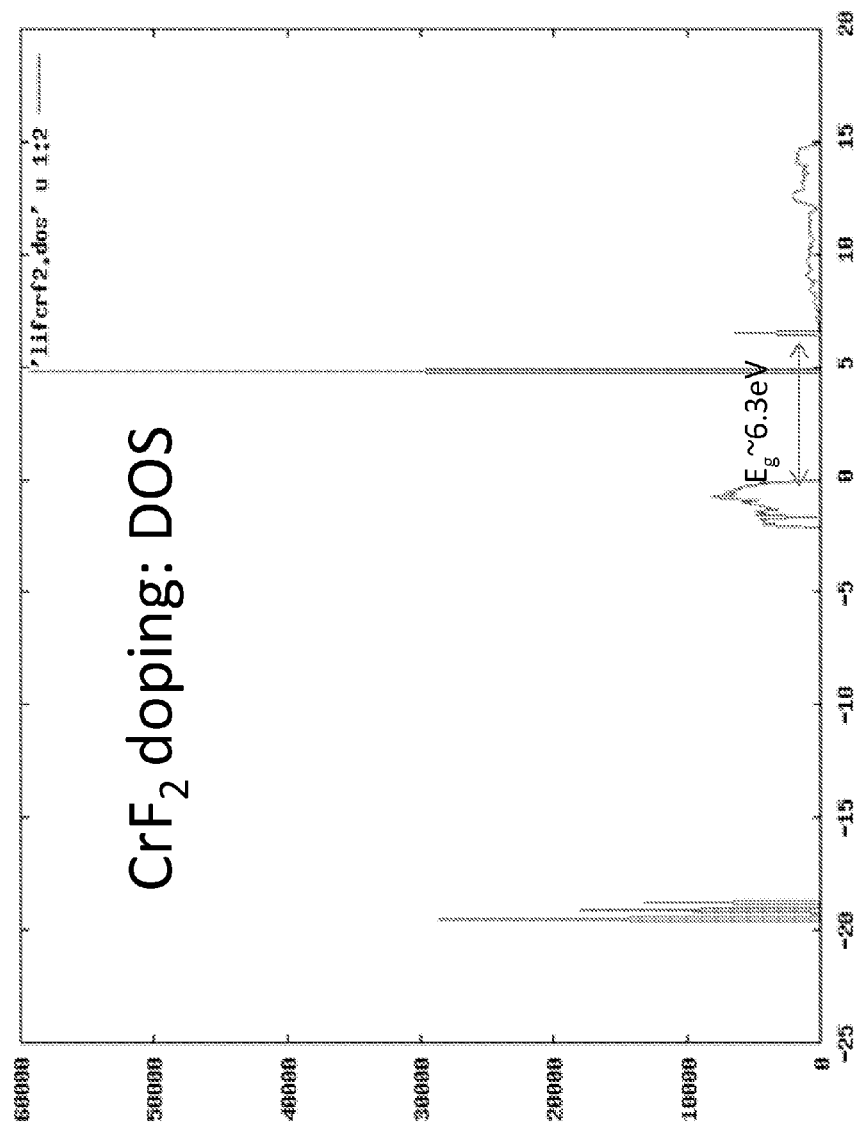
FIG. 22 shows the density of states for LiF doped with $CrF_2$.
Figure 23:
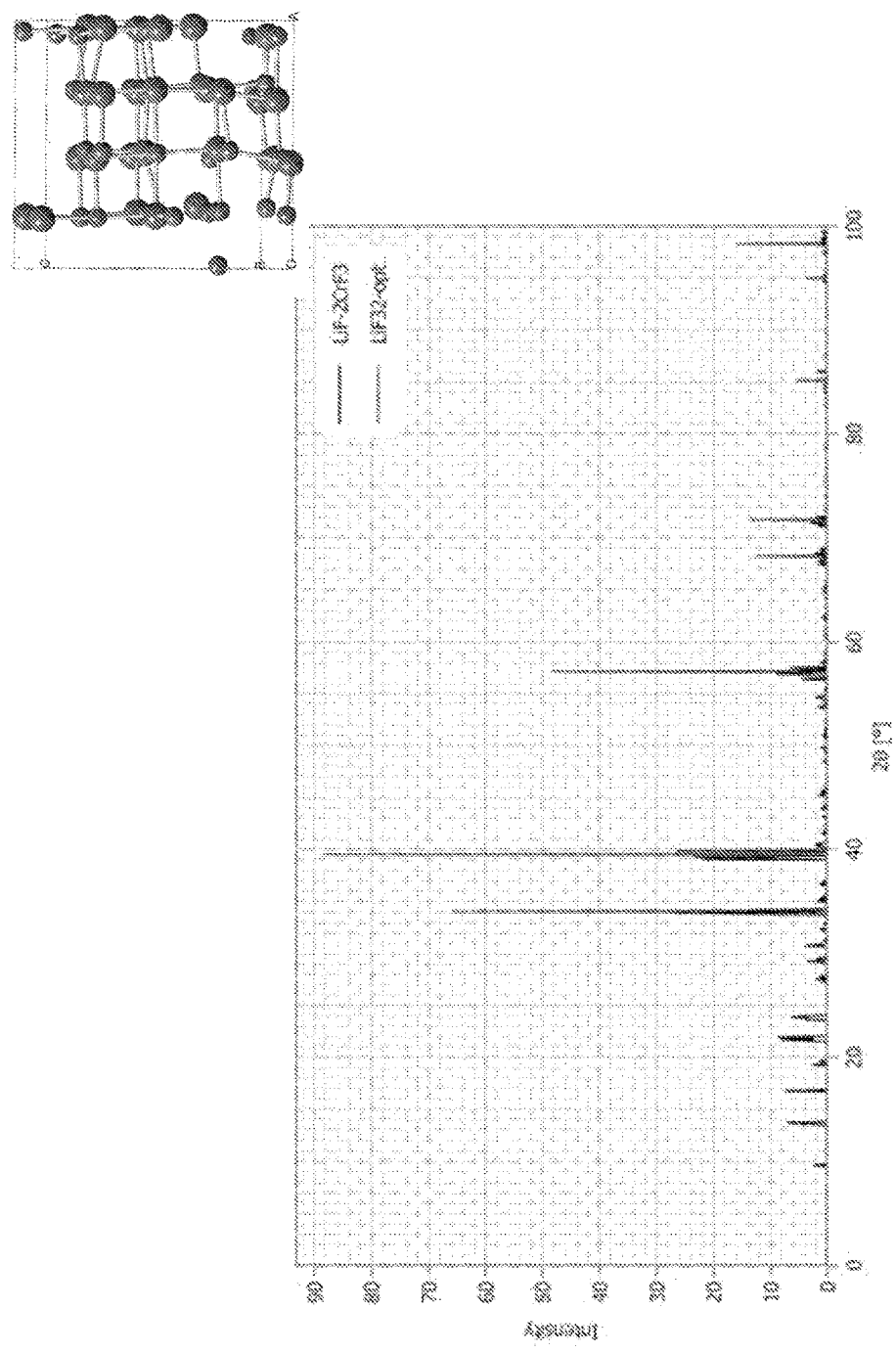
FIG. 23 shows the crystal structure for LiF overlayed with $CrF_3$-doped LiF.
Figure 24:
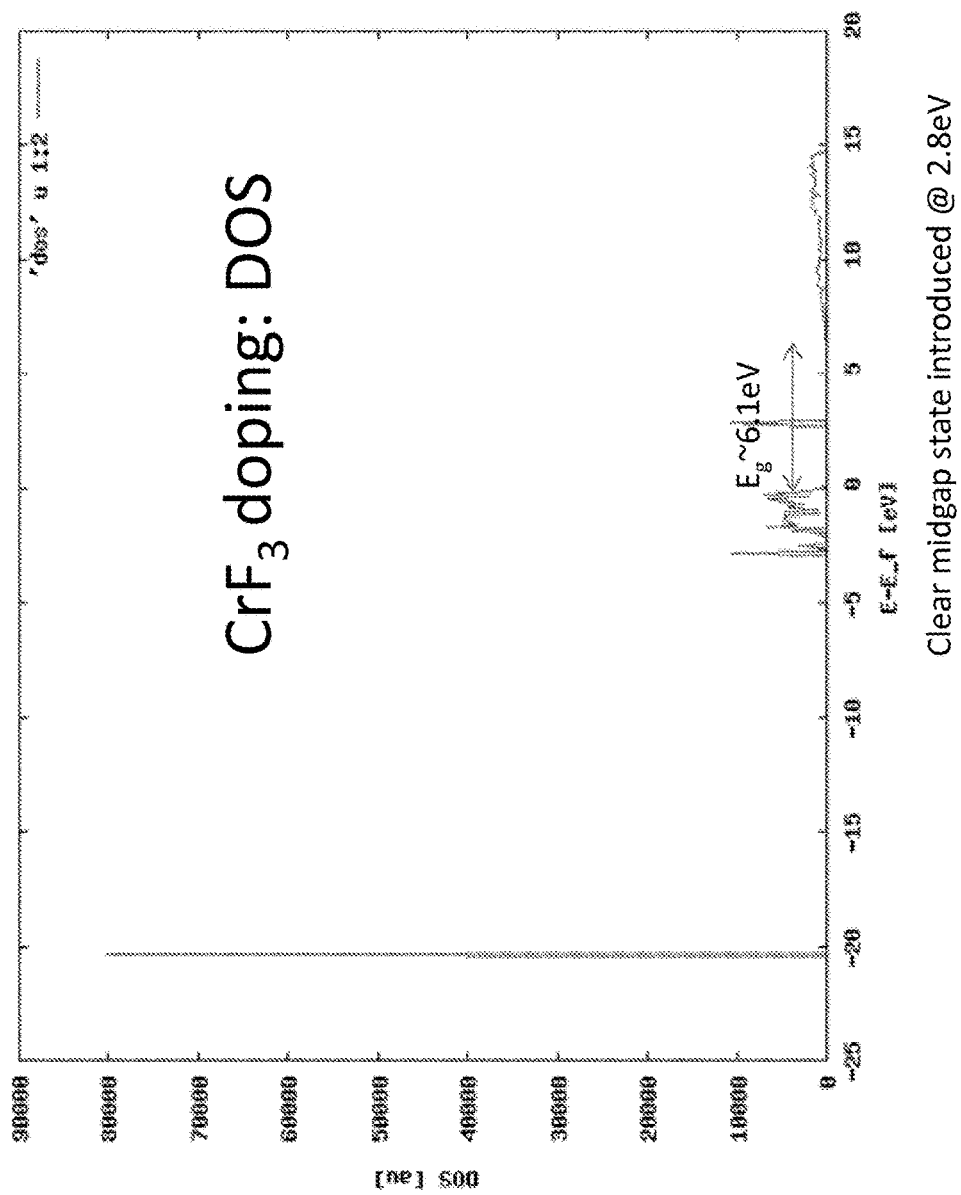
FIG. 24 shows the density of states for LiF doped with $CrF_3$.
Figure 25:
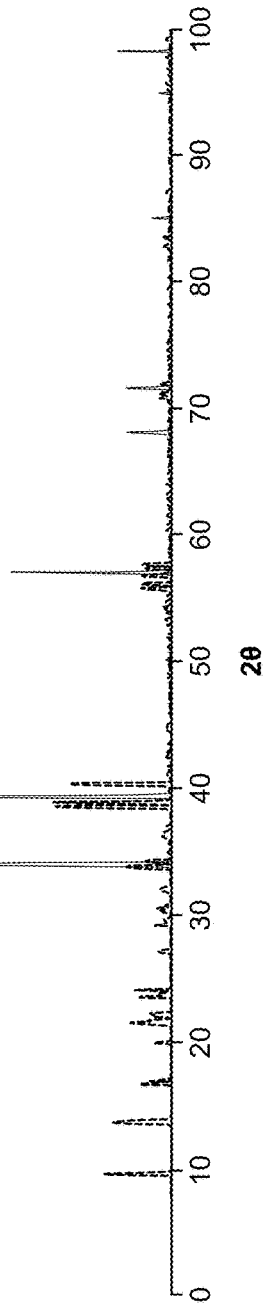
FIG. 25 shows the crystal structure for LiF overlayed with $NiF_2$-doped LiF.
Figure 25:
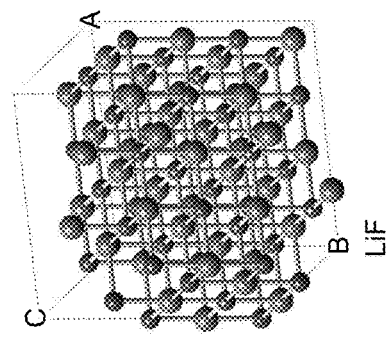
Figure 26:
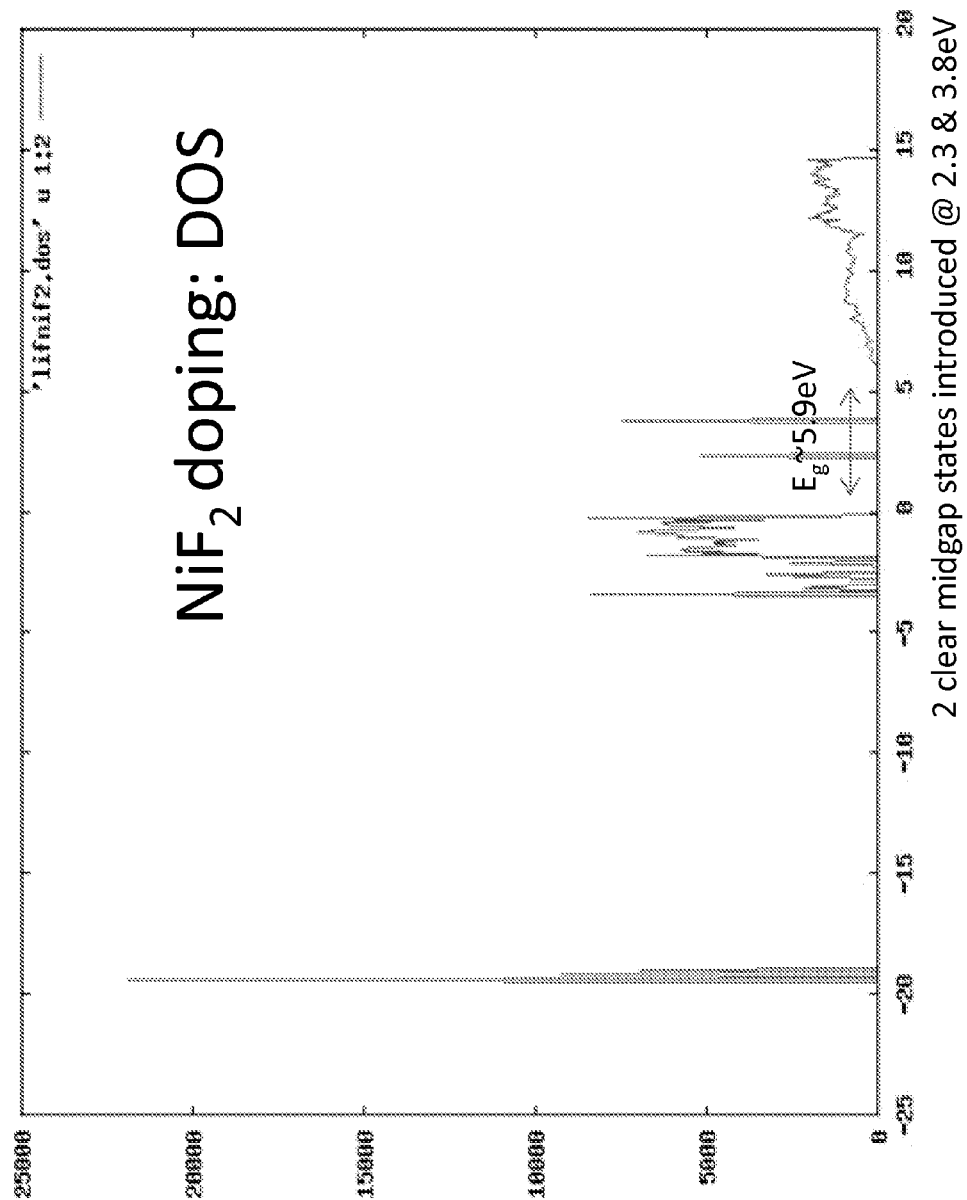
FIG. 26 shows the density of states for LiF doped with $NiF_2$.
Figure 27:
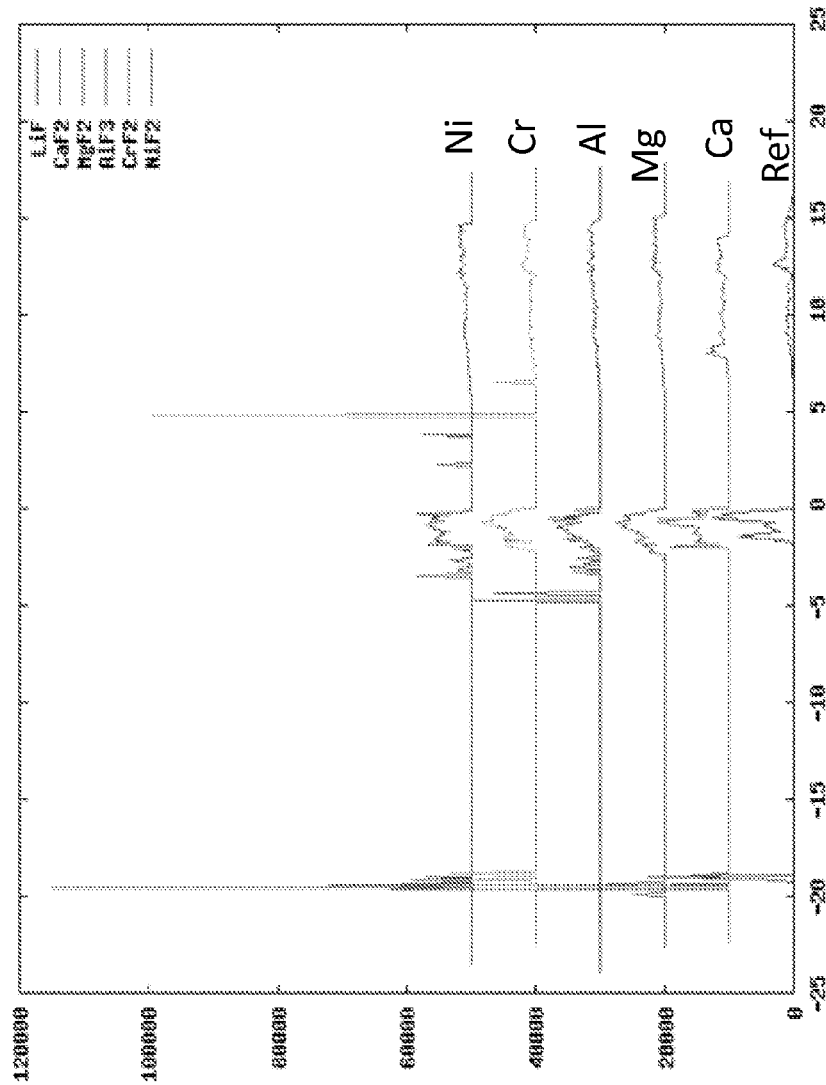
FIG. 27 shows overlaid plots of density of states for LiF and LiF doped with $CaF_2$, $MgF_2$, $AlF_3$, $CrF_2$, and $NiF_2$.
Figure 28:
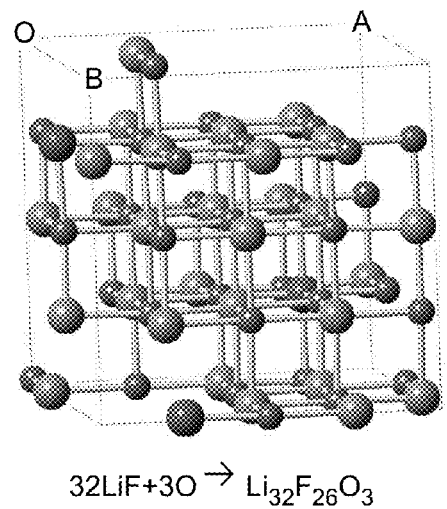
FIG. 28 shows the density of states for LiF doped with O.
Figure 28:
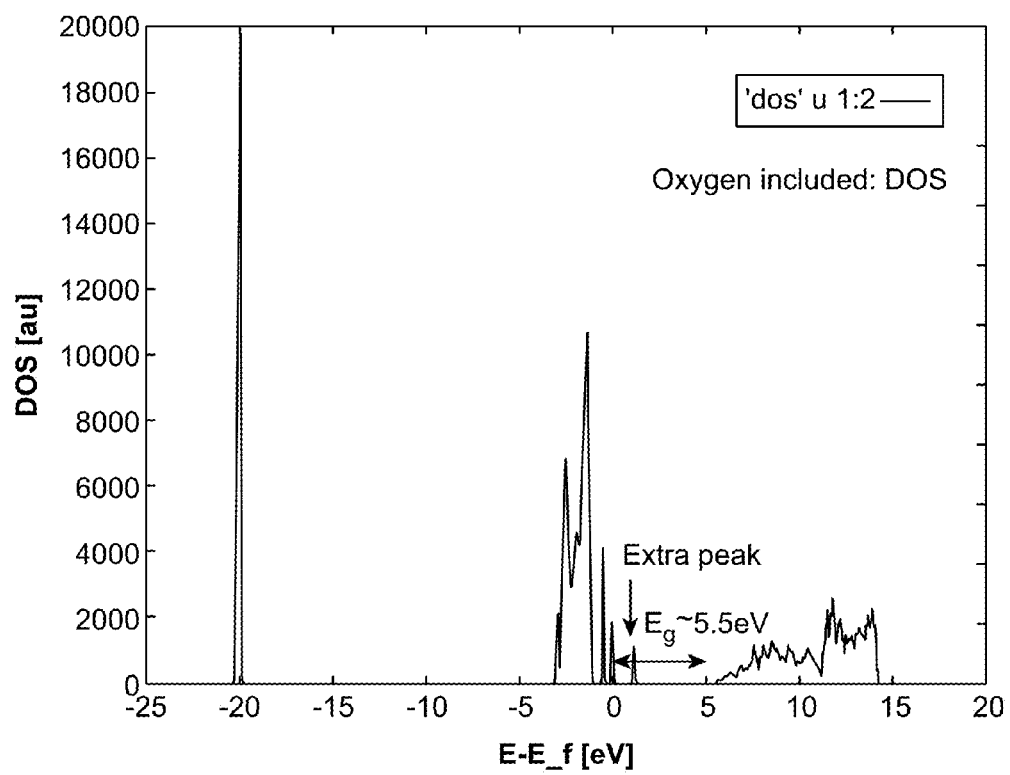

As shown in FIG. 10 a metal (as opposed to metal fluoride) dopant embodiment increases the conversion plateau voltage. For example, in some embodiments, the plateau voltage is increased by over 150 mV for the doped version as compared to the undoped version. In FIG. 10, the baseline control material includes $Li_2O$ to improve conductivity. The metal dopant is, therefore, a dopant in addition to the $Li_2O$ dopant. The data in FIG. 10 is from thin film samples.

FIGS. 9 and 10 also demonstrate increased ionic conductivity associated with the doped conversion material.

As shown in FIG. 29, Cu doping in $FeF_3$ increases the discharge voltage plateau.

V. FUNCTION AND STRUCTURE OF CONVERSION MATERIALS

The cathode material that contains an elemental metal or alloy and a lithium compound (in the discharged state) or a metal compound (in the charged state) may be provided in the form of extremely small particles or nanodomains.

The size scale of the conversion material components in a charged or discharged state may influence the relevant electrochemical properties of the materials. Conversion materials with components separated by very small distances, sometimes on the order of the atomic scale, may possess certain performance benefits as compared to conversion materials with components separated by greater distances. In some embodiments, the components are separated by a distance no greater than about 20 nm. The term "nanostructured" is sometimes used to refer to conversion materials in charged or discharged states in which the component materials are separated from another at a scale of about 20 nm or less.

In some embodiments, in the discharged state, the conversion material contains discrete domains of an elemental metal (or an alloy thereof) and a lithium compound. Various components of the conversion material may be mixed and/or otherwise exist at nanostructured scale. The individual domains may be nanodomains. Nanodomains may have an average or median characteristic dimension of about 20 nm or less, or about 10 nm or less, or about 5 nm or less. Using ferric fluoride ($FeF_3$) as an example conversion material, the nanodomains may be primarily iron (Fe) and lithium fluoride (LiF) in the discharged state. In the charged state, the nanodomains are primarily ferric fluoride ($FeF_3$). Domains may be compositionally homogenous (e.g., containing exclusively metal species) or inhomogeneous (e.g., composed of a combination of metal species, oxidizing species, and reducing cation species). In both states, the nanodomains may be crystalline or amorphous/glassy.

In some embodiments, the discrete domains of metal or alloy are present in small particles or other discrete structures. A particle domain may be a core including a charged conversion material such as ferric fluoride ($FeF_3$). In some embodiments, the discrete domains of metal or alloy are embedded in a continuous matrix of the lithium compound. In some embodiments, the particles or domains of the cathode have a very tight distribution, e.g., a standard deviation of about 50% or less. In some implementations, at least about 90% of the primary particles or domains in the electrode have a characteristic dimension of between about 1 nm and about 5 nm. In some embodiments, the particles' characteristic dimension has a $d_{50}$ value of about 20 nm or less, or about 10 nm or less, or about 5 nm or less, where $d_{50}$ is defined as the characteristic dimension at which 50% of the particles are smaller. The particles or domains may be present in these sizes at any point in the life of the cathode. In some examples, the particles or domains are present in these sizes in the cathode as fabricated. In some examples, the particles or domains are present in these sizes after the first discharge of the cathode, or after the first full charge/discharge cycle of the cathode. In certain embodiments, the average size of the particles or domains of the cathode do not vary in characteristic dimension by more than about 500%, or by about 100% over multiple cycles (e.g., 10 cycles, 50 cycles, 100 cycles, or 500 cycles).

In the charged state, the cathode conversion material may maintain the general morphological characteristics present in the discharged state. These characteristics include component separation distance (e.g., particle or crystallite size), matrix structure (e.g., glassy or amorphous), etc. In certain embodiments, a doped conversion material has a glassy or amorphous morphology, which is associated with high cationic and/or electronic conductivity. In some cases, the material will expand in the discharged state. Depending on the material, the volume change may be about 5% or greater, or about 10% or greater.

In various embodiments, the conversion material is formed or mixed such that its components are separated on a scale of about 1 nm or less, and such materials may be characterized as glassy or amorphous. A glassy material may be viewed as one that is substantially non-crystalline, substantially uniform in composition, and substantially lacking in long-range order. In some examples, a glassy conversion material is substantially homogeneous (compositionally and/or morphologically) within a volume of 1000 $nm^3$.

In one example, doped ferric fluoride ($FeF_3$) in a charged conversion material may be characterized by a glassy or amorphous structure and being substantially homogeneous with no or minimal crystalline structure. In some examples, in the discharged state, the conversion material may include a glassy compound of doped lithium, sodium, and/or magnesium. Such glassy or amorphous structures may be provided as particles, layers, etc. In various embodiments, they include one or more dopants that introduce disorder as described below. Within the particles or layers, the component metal, oxidizing, and reducing cation species are, on average, separated from one another by a distance no greater than about 20 nm. In some cases, particles having a glassy or amorphous state may be substantially unagglomerated. In other cases, at least some of the particles form agglomerates.

The extremely small constituent separation distances described herein provide a relatively short diffusion/migration path for the lithium or other electropositive ions to move from the outside of a particle or domain to the reactive metal compound sites within a particle or domain during discharge, or from a lithium compound within the particle or domain to the particle or domain surface during charge. During charge, lithium ions must leave lithium fluoride, for example, and transport to the exterior of the particle or domain where they contact the electrolyte. After leaving a particle or domain, a lithium ion may have to contact some other ion conductive matrix in the electrode before reaching the electrolyte.

Conversely, on discharge, lithium ions undergo a journey from the electrolyte of the body of the electrode, where they may travel some distance before reaching a destination particle or domain, which they enter and pass into before finding a reactive metal compound site. Only after this multistage transport does the lithium ion participate in the redox reaction to generate electrochemical energy (discharge). The reverse path is traversed during charge. Using small separation distances of active material permits the cathode to operate with improved rate performance that is not available in conventional batteries.

A further benefit derived from the extremely small compound separation distances is the comparatively shorter diffusion distance between the metal atoms and the anions. As the metal and anion atoms are larger and more massive, their transport is generally slower than that of lithium. The provided nanostructure puts metal atoms in close proximity to anions, reducing the distance they must diffuse.

As explained more fully below, certain dopant atoms and compounds increase the cationic conductivity of the conversion material. For example, a zirconium dopant increases the conductivity of lithium fluoride to lithium ions that transport in and out of the conversion material on discharge and charge.

VI. EXAMPLE ELECTRODES WITH CONVERSION MATERIALS

Figure 2A:
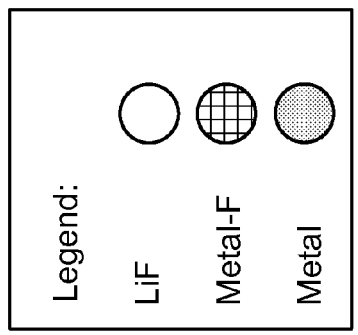
FIG. 2A depicts four examples of conversion materials having various nanodomain and particle formats.
Figure 2A:
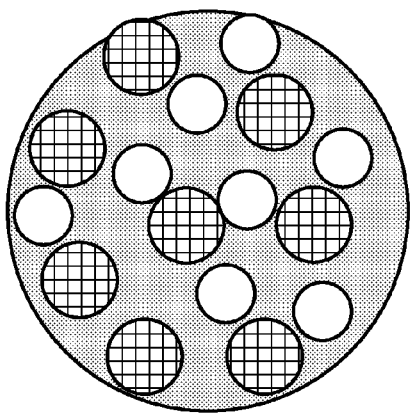
Figure 2A:
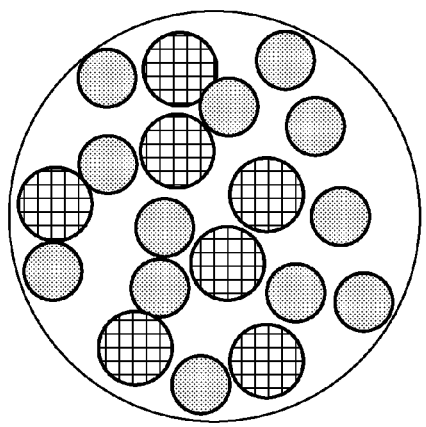
Figure 2A:
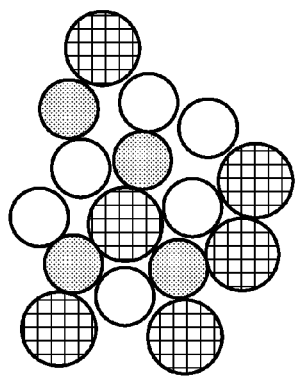
Figure 2A:
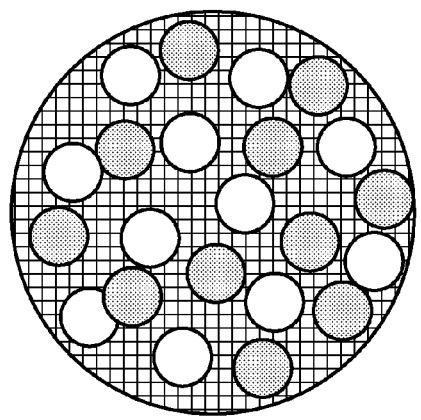

FIG. 2A depicts four examples of electrode formats with conversion materials. Many variations, alternatives, and modifications are possible. The particles or domains described above are nanostructured (e.g., separated from one another by less than about 20 nm length scale), and these particles or domains may be combined to form primary and secondary particle structures shown in Examples 1-4 in FIG. 2A.

Example 1 (top left of FIG. 2A) depicts an embodiment in which the electrode active material includes non-encapsulated nanodomains of lithium fluoride, elemental metal, and metal fluoride. Such material may exist at any state of charge, but will most typically exist at or near full discharge. Example 2 (top right) depicts an electrode format in which metal fluoride nanoparticles and lithium fluoride nanoparticles are encapsulated in an elemental matrix. In each of the encapsulation examples, the encapsulation unit may exist as distinct particles or as a continuous layer. Example 3 (bottom left) illustrates a format in which a metal fluoride matrix encapsulates lithium fluoride nanodomains and elemental metal nanodomains. Example 4 (bottom right) depicts a format in which lithium fluoride encapsulates metal fluoride particles or nanodomains and elemental metal particles or nanodomains.

Figure 2B:
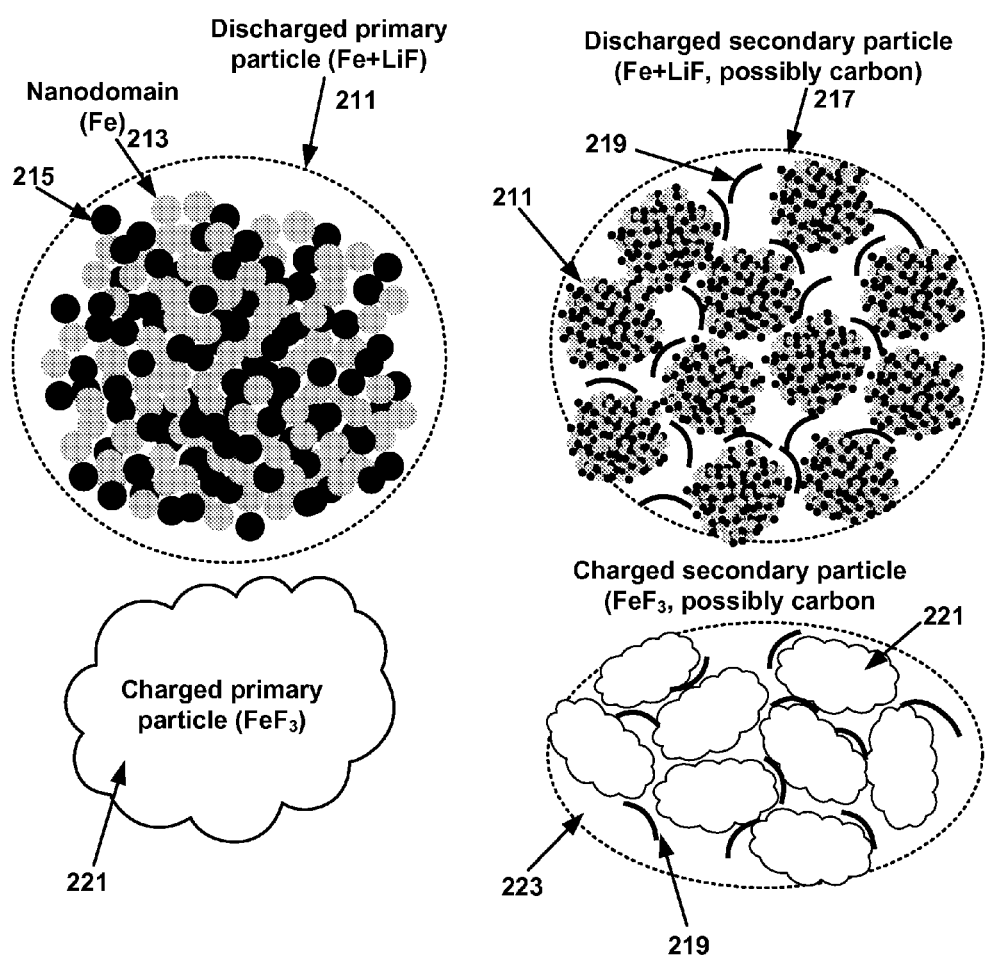
FIG. 2B depicts additional examples of particle and nanodomain structures that may be employed in ferric fluoride and related conversion materials.

FIG. 2B depicts additional examples of particle and nanodomain structures that may be employed in ferric fluoride and related conversion materials. In the example of FIG. 2B, the structure in the upper left side is a primary particle 211 that may be found in a discharged cathode. The primary particle 211 includes discrete nanodomains of iron metal 213 and lithium fluoride 215. Often, a primary particle has a characteristic cross-sectional dimension of about 100 nm or less. As mentioned, the nanodomains that make up a primary particle have cross-sectional dimensions of about 20 nm or less (e.g., about 5 nm or less). In some cases, the nanodomains are glassy or compositionally homogeneous.

The top right structure in FIG. 2B depicts a secondary particle 217 (not drawn to scale) of discharged ferric fluoride ($FeF_3$) conversion material. Secondary particles are made up of primary particles 211, such as those presented in the top left structure, and possibly particles of an ionically conductive material and/or electronically conductive material 219. Secondary particles may be agglomerates or clumps of primary particles and optionally particles of ionically/electronically conductive materials. In some implementations, secondary particles are present in a slurry used to coat a positive current collector when forming the cathode. In certain embodiments, secondary particles have a cross-sectional dimension of about 0.1 micrometers to about 5 micrometers. All dimensions presented in the discussion of FIG. 2B are median values.

The lower left and lower right structures presented in FIG. 2B represent primary particle 221 and a secondary particle 223, respectfully, of fully charged ferric fluoride ($FeF_3$) conversion material. Other conversion materials may be substitute for ferric fluoride $FeF_3$ and its discharge products in the structures presented in FIG. 2B.

VII. ELECTRODE CAPACITY

The conversion materials disclosed herein combine during discharge with multiple lithium ions per transition metal. During charge, intercalation reactions involve at most one lithium ion per transition metal (e.g., as lithium is reduced from $Li^+$ to $Li^0$, cobalt oxidizes from $Co^{3+}$ to $Co^{4+}$), whereas in conversion materials such as those with ferric fluoride ($FeF_3$), three lithium ions react per transition metal. In fact, most insertion compounds react half a lithium ion per transition metal because the electrode structure becomes unstable if more than ½ of the lithium is extracted. Thus, the transition metal electrode materials disclosed herein provide a significantly higher capacity (e.g., about 700 mAh/g or greater) than conventional electrode materials (e.g., 140 mAh/g for $LiCoO_2$). The capacity is available even at high rates and over many cycles when the electrode possesses suitably high ionic and electronic conductivity as disclosed herein.

In certain embodiments, the cathode conversion material, as fabricated, has a specific capacity of at least about 600 mAh/g of the fully charged cathode material. In some embodiments, the cathode material maintains this fully charged capacity over multiple cycles. The fully charged material is the stoichiometric metal compound, MX. For example, the cathode material may maintain a capacity of at least about 600 mAh/g when discharged at a rate of at least about 200 mA/g of fully charged cathode material.

In some implementations, the material maintains this capacity at higher discharge rates of at least about 600 mA/g of fully charged cathode material. In certain embodiments, the material maintains the capacity at discharge rates of up to about 6000 mA/g of fully charged cathode material. This discharge rate may be maintained at a constant value or may vary over discharge without dropping below, e.g., 200 mA/g.

In some embodiments, the cathode material maintains a high capacity at high rates (e.g., at least about 600 mAh/g at 200 mA/g) over multiple charge-discharge cycles. High capacity performance may be achieved when cycling over a range of temperatures, e.g., from about 0° C. to 100° C., or about 20° C. to 100° C. In some cases, the electrode material is able to maintain such a high rate capacity over about 10 cycles or more. Often it will be able to maintain this high rate capacity even longer, e.g., over about 20 cycles or more, or over about 50 cycles or more, or over about 100 cycles or more, or over about 500 cycles or more. In each cycle, the cathode material discharges the full 600 mAh/g charge. Such cycling may be conducted such that the voltage of the cathode is between 4V and 1V vs. $Li/Li^+$. In some embodiments, the charge rate may be higher than 200 mA/g, higher than 600 mA/g, or higher than 6000 mA/h, and the material maintains a capacity of about at least 600 mAh/g.

In one embodiment, the conversion material provides a capacity of greater than about 350 mAh/g of active material when cycled between 1V and 4V vs. a lithium metal anode at about 100° C. with a charge/discharge rate of 200 mA/g. In other embodiments, the electrode material provides a capacity of greater than about 500 mAh/g, or greater than about 600 mAh/g, or greater than about 700 mAh/g. In each case, the capacity value is for the active material cycled in the voltage range of 1V to 4V vs. a lithium metal anode when cycled at about 100° C. with a charge/discharge rate of 200 mA/g. In another embodiment, the electrode materials described herein provide a capacity of between about 350 mAh/g and about 750 mAh/g when cycled between 1V and 4V against a lithium metal anode at about 100° C. with a charge/discharge rate of 200 mA/g. In another embodiment, the electrode materials may have a specific capacity of greater than about 400 mAh/g when discharged between 1V and 4.5V vs. a standard lithium metal electrode (Li/Li$^+$) at a rate of 400 mA/g and a temperature of 120° C., or between 1.5V and 4V vs. Li at a rate greater than 1 C and a temperature above 50° C.

In one embodiment, a device as described herein has an energy density of at least about 50 Wh/kg or between about 50 and 1000 Wh/kg, or about 50 and 1300 Wh/kg, when measured at a temperature of 100 degrees Celsius when cycled between 1V and 4V vs. Li and at a current rate of at least about 200 mAh/g of cathode active material. In another embodiment, a device as described herein has an energy density of between about 100 and 750 Wh/kg. In another embodiment, a device as described herein has an energy density of between about 50 and 1000 Wh/kg. In another embodiment, a device as described herein has an energy density of between about 250 and 650 Wh/kg. In another embodiment, a device as described herein has an energy density of greater than about 250 Wh/kg. As used herein, energy density is the energy density at the device level; i.e., the total energy stored in the device divided by the mass of the device, where the mass of the device includes the mass of the anode, cathode, electrolyte, current collectors and packaging of the device. From a volumetric perspective, in certain embodiments, the device has an energy density of at least about 600 Wh/L under the conditions set forth above.

In one embodiment, a cathode as described herein has an electrode energy density of between about 500 and 2500 Wh/kg when measured at a temperature of 100° C. In another embodiment, a cathode as described herein has an electrode energy density of between about 800 and 1750 Wh/kg. In another embodiment, a cathode as described herein has an energy density of between about 1000 and 1600 Wh/kg. In another embodiment, a cathode as described herein has an energy density of greater than about 1000 Wh/kg. As used herein, electrode energy density is the energy density at the electrode level; i.e., the total energy stored in the device divided by the mass of the cathode in the discharged state, where the mass of the electrode includes the mass of the electrochemically active material, lithium, positive current collector, and any electrochemically inactive components in the cathode such as ion or electron conductor additives.

In some cases, cathodes fabricated from high capacity conversion materials have a high average discharge voltage greater than about 2V vs. lithium metal when discharged under above conditions (100° C. and a charge/discharge rate of 200 mA/g). In some embodiments, cathodes fabricated from such conversion materials have an average discharge voltage greater than about 2.2 V vs. lithium metal when discharged under above conditions.

Voltage hysteresis is the difference between the discharge voltage and the charge voltage, both varied as a function of state of charge. It represents the inefficiency of the battery—energy lost to heat, often due to sluggishness of either ion transport or reactions. As a result, overvoltages are required to drive the reactions, which cause the discharge voltage to be lower than the open circuit voltage and the charge voltage to be higher than the open circuit voltage. Low hysteresis means that the battery is efficient.

Figure 6:
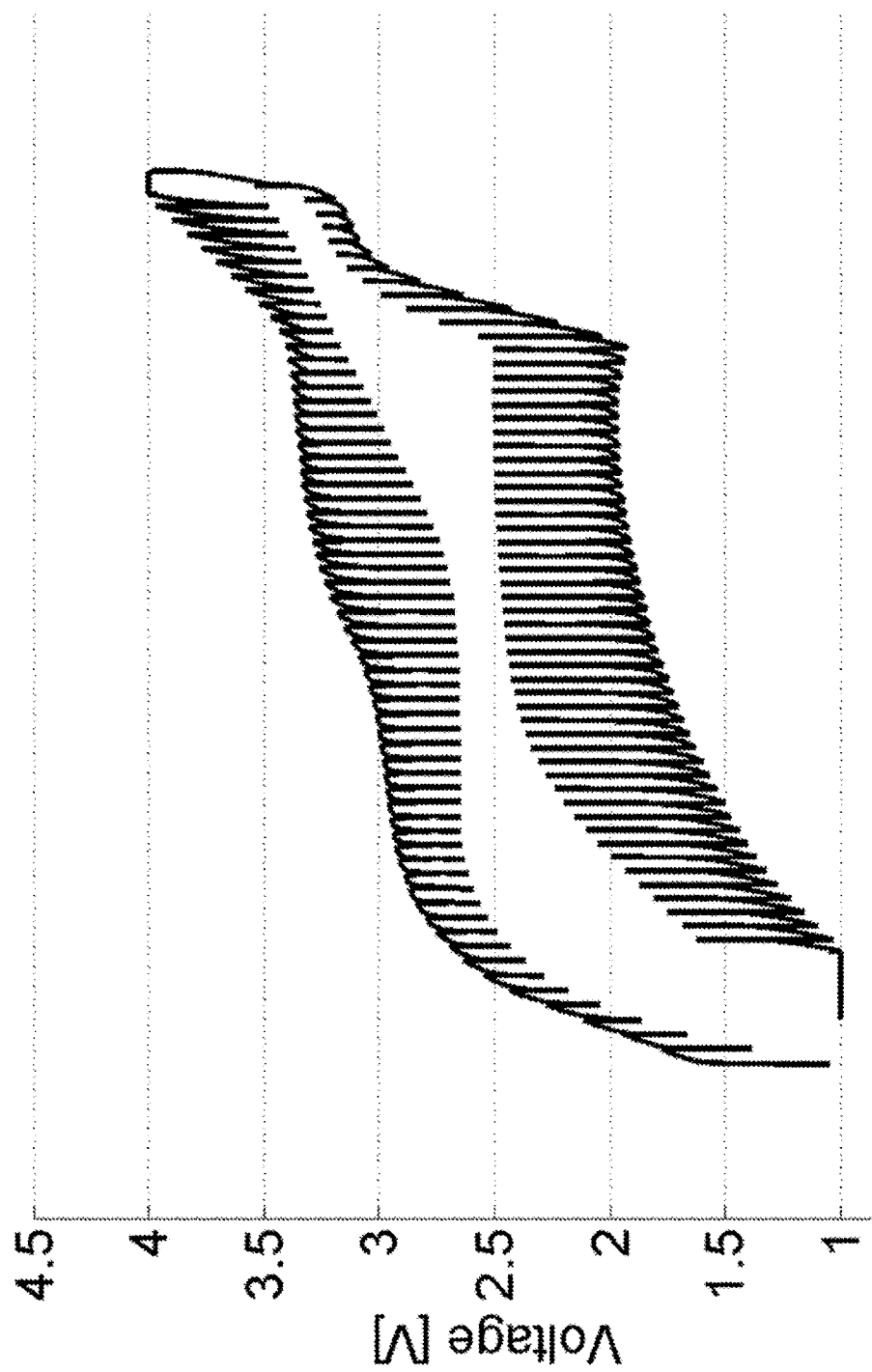
FIG. 6 is a hysteresis curve (using galvanostatic intermittent titration technique (GITT)) of a Cu-doped LiF conversion material described herein.

As shown in FIG. 6, doping of conversion materials reduces the voltage hysteresis and results in a more efficient battery.

In certain embodiments, devices employing the conversion cathode materials described herein provide an average voltage hysteresis of less than 1V in the voltage range of 1V to 4V vs. a lithium metal electrode at about 100° C. with a charge/discharge rate of 200 mA/g. In another version, such devices provide an average voltage hysteresis of less than 0.7V when cycled between 1V and 4V vs. a lithium metal electrode at about 100° C. with a charge/discharge rate of 200 mA/g. In an embodiment, the devices provide an average voltage hysteresis of less than about 1 V when cycled between 1V and 4V vs. a lithium metal electrode at about 100° C. with a charge/discharge rate of 600 mA/g. In an embodiment, the devices provide an average voltage hysteresis of less than about 1V when cycled between 1.5V and 4V vs. a lithium metal electrode at about 50° C. with a charge/discharge rate of 200 mA/g. This hysteresis level is maintained for at least 10 cycles, or at least 30 cycles, or at least 50 cycles, or at least 100 cycles.

The high performance cathode materials disclosed herein maintain their good performance (e.g., high specific capacity, high energy density, high average discharge voltage, and low hysteresis) even when discharged at high rates. Their performance may not significantly degrade when the rate of discharge increases from 10 C to 100 C.

VIII. ANODE

The anode may generally be made of any material that is compatible with the other materials of the device and which may store lithium atoms or ions when the device is in the charged state and may provide lithium ions for incorporation into the cathode when the device is in the discharged state. In one embodiment, the anode active material is lithium metal. In another embodiment, the anode is lithium silicide, Li—Sn, or other high capacity, low voltage material that alloys with lithium. In an embodiment, the anode is lithium intercalated into a carbon component, such as graphite. In various embodiments, the anode active material is a material capable of inserting lithium ions at a higher reversibility capacity than carbon, such as tin, magnesium, germanium, silicon, oxides of these materials, and the like.

In some embodiments, the anode is a porous material that allows lithium plating into the pores, thereby relieving the swelling stress. Swelling stress may occur if the anode, such as lithium, plates on the electrolyte, thereby causing swelling. In some embodiments, the pores are carbon nanotubes, carbon buckyballs, carbon fibers, activated carbon, graphite, porous silicon, aerogels, zeolites, or xerogels.

In one embodiment, the anode is formed in situ during the first charge cycle of the battery. In a case where the device is fabricated in the discharged state with a lithiated cathode, the first charge cycle extracts lithium from the cathode and deposits lithium on the anode side. In the case where the anode is a lithium metal anode, the anode is thereby formed in situ by plating on the anode current collector. In this case, the anode current collector may be a metal that does not alloy with or react with lithium. A non-limiting list of examples for anode current collector material includes TaN, TiN, Cu, Fe, stainless steel, steel, W, Ni, Mo, or alloys thereof. In one embodiment, there is an excess of lithium in the device as fabricated on the cathode. In another embodiment, there is an excess of lithium in the device as fabricated on the anode side, possibly in the anode current collector. An excess of lithium may be desirable to prolong the cycle life to the battery, as some lithium will inevitably be lost due to side reactions, alloying with current collectors or in reactions with air and/or water that leak into the device. In one embodiment, there is an encapsulation that substantially prevents ingress of air and water into the active materials. The encapsulation may be LiPON, an oxide, nitride, oxynitride, resin, epoxy, polymer, parylene, metal such as Ti or Al, or multilayer combinations thereof.

IX. CURRENT COLLECTORS

The devices described herein include optional positive and/or negative electrode current collectors. The current collectors generally may be made of any material capable of delivering electrons to the anode or the cathode from the external circuit or delivering electrons to the external circuit from the anode and cathode. In one embodiment, the current collectors are made of a highly electronically conductive material such as a metal. In one embodiment, the device does not include a cathode current collector and electrons are transferred to and from the cathode directly to the external circuit. In one embodiment, the device does not include an anode current collector and electrons are transferred to and from the anode directly to the external circuit. In one embodiment, the device does not include either a cathode current collector or an anode current collector.

In one embodiment the negative electrode current collector is copper. In one embodiment, the negative current collector is a copper alloy. In one embodiment, the negative current collector is copper alloyed with a metal selected from nickel, zinc and aluminum or copper coated on a metal or polymer foil. In one embodiment, the current collector is copper and also includes a layer of a non-copper metal disposed between the copper and the cathode or anode material. In one embodiment, the positive current collector is copper and also includes a layer of nickel, zinc or aluminum disposed between the copper and the anode material.

In one embodiment, the positive current collector is aluminum. In one embodiment, the positive current collector is aluminum or an aluminum alloy. In one embodiment, the positive current collector is aluminum and also includes a layer of a non-aluminum metal disposed between the aluminum and the cathode or anode material. In one embodiment, the current collector is steel or stainless steel. In one embodiment, the current collector is steel or stainless steel and also includes a layer of a non-steel metal disposed between the steel and the cathode or anode material. The cathode current collector and negative electrode current collector may be different materials chosen among those enumerated above or any other suitable material.

X. CHEMICAL REACTION AND PROPERTIES OF CONVERSION MATERIALS WITH AND WITHOUT DOPANTS

In the charged state, the conversion material contains a compound of a metal. In some embodiments, the electrochemical charge-discharge reaction at the cathode may be represented, without stoichiometry considerations, by the following reaction:

$$M + LiX \leftrightarrow MX + Li^+ + e^- \quad (1)$$

where M is the metal species and X is the oxidizing species, e.g., an anion or electron-rich species of an element such as a halide, oxygen, sulfur, phosphorus, nitrogen, selenium, or a combination of such elements. In a specific example, the oxidizing species is a combination of a halogen ion and a chalcogen ion (e.g., fluoride and sulfide). In certain variations of the above chemical reaction, lithium is replaced with sodium ($Na^+$), potassium ($K^+$), magnesium ($Mg^+$), or another electropositive metal ion. Certain disclosed embodiments use a redox reaction of lithium ions with a metal fluoride as a source of energy in cathode materials.

The metal compound MX present in the charged cathode material may react with lithium ions according to a discharge path described above. Typically, the discharge reaction is associated with a relatively large Gibbs free energy when considering the full cell reaction $Li + MX \rightarrow LiX + M$. The Gibbs free energy corresponding to the cell voltage of the reaction is given by $$\Delta G_{rxn} = -E * n * F \quad (2)$$

where E is the voltage, n is the number of electrons that react, and F is the Faraday constant. In certain embodiments, the Gibbs free energy of the reaction is at least about 500 kJ/mol or at least about 750 kJ/mol, or at least about 1 MJ/mol. This provides a very high available energy for a battery and compares favorably with that of a standard lithium insertion (or lithium intercalation, depending on the electrode matrix) cathode material, such as lithium cobalt oxide ($LiCoO_2$), lithium manganese oxide ($LiMnO_2$), lithium titanate ($Li_2TiO_3$), and the like used in conventional lithium ion batteries.

In certain implementations, the voltage of a fully charged cathode as described in the disclosed embodiments is at least about 2.0V compared to a lithium metal electrode, or at least about 3.0V compared to a lithium metal electrode, or at least about 4.0V compared to a lithium metal electrode, or at least about 4.5V compared to a lithium metal electrode.

In some embodiments, the "conversion reaction" may be written as $$aM + bLi_cX \leftrightarrow M_aX_b + (b*c)Li^+ + (b*c)e^- \leftrightarrow M_aX_b + (b*c)Li \quad (3)$$

The left side of Reaction 3 represents the cathode active materials in the discharged state, where the cathode active component comprises a metal component M, and a lithium compound component $Li_nX$. In this reaction, c is the formal oxidation state of anion X.

The right side of Reaction 3 represents the system in the charged state, where cathode active materials have been converted into the metal compound component $M_aX_b$ and the Li ions leave the cathode through the electrolyte, and electrons are provided to the external circuit.

X is generally any anionic species forming stable compounds $Li_nX$ and $M_aX_b$, with lithium and metal M respectively. Examples of suitable oxidizing species anions X in the conversion materials corresponding to Reaction 1 include oxygen (O), sulfur (S), nitrogen (N), phosphorous (P), fluorine (F), selenium (Se), chlorine (Cl), iodine (I), and combinations thereof.

Examples of suitable metal species M include transition metals, aluminum, and bismuth. In some cases, the metal is selected from the first row of transition metals. Specific examples of transition metals that may be used include bismuth (Bi), aluminum (Al), vanadium (V), chromium (Cr), copper (Cu), iron (Fe), cobalt (Co), manganese (Mn), nickel (Ni), ruthenium (Ru), titanium (Ti), silver (Ag), molybdenum (Mo), and tungsten (W). In one embodiment, the metal component is selected from iron (Fe), copper (Cu), manganese (Mn), and cobalt (Co). In a certain embodiment, the metal component is iron. In one embodiment, the metal component is copper. In one version, the metal component is cobalt.

Alloys of such metals may also be used. Examples of such alloys include iron alloyed with cobalt and iron alloyed with manganese. In one version, the metal component includes a mixture or alloy of a first metal and a second metal. In one version of mixed metal component, the metal component includes separate nanodomains of the first metal and the second metal. In another version, the metal component includes nanodomains of a mixture or alloy of the first and second metals. In one version, the first metal is Fe and the second metal is Cu.

Generally the lithium compound component is any lithium compound that upon charging of the device yields (i) lithium ions that migrate to the anode, and (ii) an anions that react with the metal component to provide a metal compound component. In the charged state, therefore, the cathode material includes a metal compound component. The anion in the lithium compound may generally be any anion that forms the lithium compound in the discharged state and the metal compound in the charged state. In one version the lithium compound is a lithium halide, lithium oxide, lithium sulphide, lithium nitride, lithium phosphide, lithium sulfurhalide, lithium hydride, or mixtures thereof. In one version the lithium compound is a lithium halide. In one version the lithium compound is lithium fluoride.

Specific examples of metal compounds $M_aX_b$ that may be used include, without limitation, the compounds listed in Table 1.

$NiP_2$; $Ni_3P$; $NiF_2$; PbO; $RuO_2$; $Sb_2O_3$; $SnF_2$; $SnO_2$; $SrO_2$; $TiS_2$; $TiF_3$; $V_2O_3$; $V_2O_5$; $VF_3$; $WS_2$; $ZnF_2$; and combinations thereof. As an example, a suitable cathode material is, in the charged state, ferric fluoride ($FeF_3$) in very small particles, which may be the size of a quantum dot (e.g., about 5 nm in the smallest cross-section) or in a glassy or amorphous state, as described further below. In one version the metal compound component is $FeF_x$, where x is between 1 and 3. In one version the metal compound component is $CuF_x$, where x is between 1 and 3. In one version the metal compound component is $CoF_x$, where x is between 1 and 3.

The conversion material may be discharged with a cation that undergoes an exothermic reaction with the conversion material. The cation is often low-cost and lightweight (relative small atomic mass). Lithium is not the only example. Other examples include magnesium (Mg) and sodium (Na).

In certain embodiments, the three elements are intimately intermixed on an atomic scale. The relative amounts of the lithium compound component and the metal component can vary widely, but should be appropriate for a battery cell. For example, the components may be provided in relative amounts that do not introduce substantial unused material that will not contribute to electrochemical energy conversion or enhance conductivity. In some embodiments where iron is used as the metal component, the mole ratio of iron to lithium in the cathode active material is about 2 to 8, or about 3 to 8. In some embodiments employing valence 2 metals such as copper, the mole ratio of metal to lithium in the cathode active material is about 1 to 5. In various implementations, the conversion material is characterized by an iron (Fe) to fluorine (F) to lithium (Li) ratio of from about 1:1.5:1.5 to 1:4.5:4.5. As an example for ferric fluoride ($FeF_3$) conversion material and Li cation, the conversion material when created, or when in the discharged state, may be an amorphous mixture of lithium (Li), iron (Fe), and fluorine (F) in the ratio of approximately 3:1:3 ($Li_3FeF_3$).

TABLE 1

Example Metal Compounds for Conversion Materials

| | X=O | X=S | X=N | X=P | X=F |
|---|---|---|---|---|---|
| Bi | | | | | $BiF_3$ |
| Ti | | | | | $TiF_3$ |
| V | | | | | $VF_3$ |
| Cr | $Cr_2O_3$ | CrS | CrN | | $CrF_3$ |
| Mn | $MnO_2$, $Mn_2O_5$, MnO | MnS | | $MnP_4$ | |
| Fe | $Fe_2O_3$, FeO | $FeS_2$, FeS | $Fe_3N$ | FeP | $FeF_3$, $FeF_2$ |
| Co | $Co_3O_4$, CoO | $CoS_2$, $Co_{0.92}S$, $Co_9S_8$ | CoN, $Co_3N$ | $CoP_3$ | $CoF_2$, $CoF_3$ |
| Ni | NiO | $NiS_2$, NiS, $Ni_3S_2$ | $Ni_3N$ | $NiP_3$, $NiP_2$, $Ni_3P$ | $NiF_2$ |
| Co | CuO, $Cu_2O$ | CuS, $Cu_2S$ | | $CuP_2$, $Cu_3P$ | $CuF_2$ |
| Mo | $MoO_3$, $MoO_2$ | $MoS_2$ | | | |
| W | | $WS_2$ | | | |
| Ru | $RuO_2$ | | | | |

Examples of suitable charged state cathode materials include sulfides, oxides, halides, phosphides, nitrides, chalcogenides, oxysulfides, oxyfluorides, sulfur-fluorides, and sulfur-oxyfluorides. In various embodiments, the charged conversion material includes one or more of the following: AgF; $AlF_3$; $BiF_3$; $B_2O_3$; $Co_3O_4$; CoO; $CoS_2$; $Co_{0.92}S$; $Co_3S_4$; $Co_9S_8$; CoN; $Co_3N$; $CoP_3$; $CoF_2$; $CoF_3$; $Cr_2O_3$; $Cr_3O_4$; CrS; CrN; $CrF_3$; CuO; $Cu_2O$; CuS; $Cu_2S$; $CuP_2$; $Cu_3P$; $CuF_2$; $Fe_2O_3$; FeO; FeOF; $FeS_2$; FeS; $Fe_2S_2F_3$; $Fe_3N$; FeP; $FeF_2$, $FeF_3$; $Ga_2O_3$; $GeO_2$; $MnO_2$; $Mn_2O_3$; $Mn_2O_5$; MnO; MnS; $MnS_2$; $MnP_4$; $MnF_2$, $MnF_3$, $MnF_4$; $MoO_3$; $MoO_2$; $MoS_2$; $Nb_2O_5$; NiO; $NiS_2$; NiS; $Ni_3S_2$; $Ni_3N$; $NiP_3$;

In some embodiments, at some point in the state of charge of the electrode, the cathode includes an active component that includes a lithium metal compound component. Generally, the lithium metal compound component is any compound that includes lithium, a non-lithium metal, and an anion. Upon charging the device, the lithium metal compound component yields lithium ions that migrate to the anode and a metal compound.

In some embodiments, the reaction may be written as $$Li_dM_eX_f \leftrightarrow dLi^+ + de^- + M_eX_f \leftrightarrow dLi + M_eX_f \qquad (4)$$

The left side of Reaction 4 represents the cathode active materials in the discharged state, where the cathode active component includes a lithium metal component $Li_dM_eX_f$ and the right side of Reaction 4 represents the system in the charged state, where the cathode active materials have been converted into the metal compound component $M_eX_f$, and the Li ions are provided for diffusion through the electrolyte to the anode and the electrons are provided to the external circuit. In Reaction 4, all of the lithium in the lithium metal compound is converted to lithium ions. In another embodiment, less than all of the lithium in the lithium metal component is converted to lithium ions. One version of such a reaction is given by Reaction 5:

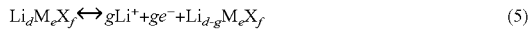  (5)

where g<d. Depending on the thermodynamic and kinetic stability of the $Li_{d-g}M_eX_f$ compound, such compound may exist as $Li_{d-g}M_eX_f$ or may be a mixture of one or more of a lithium compound, a metal compound, and a lithium metal compound.

In one version, the lithium metal compound component is a lithium metal oxide, a lithium metal sulfide, a lithium metal nitride, a lithium metal phosphide, a lithium metal halide or a lithium metal hydride, or mixtures thereof. In one embodiment, the lithium metal compound component is a lithium metal halide. In one embodiment, the lithium metal compound component is a lithium metal fluoride. In one embodiment, the lithium metal compound component is a lithium iron fluoride. In one embodiment, the lithium metal compound component is a lithium copper fluoride. In one version the lithium metal compound component is a lithium cobalt fluoride.

a. Insertion and Extrusion Reactions

In a certain embodiment, the conversion reaction may include an insertion reaction and an extrusion reaction. In one example, ferric fluoride and lithium may be used in the insertion and extrusion reactions. In this embodiment, the insertion reaction may be written as

  (6)

The insertion reaction involves combining lithium ions and electrons with ferric fluoride to form lithium iron fluoride ($LiFeF_3$).

In this embodiment, the extrusion reaction may be written as

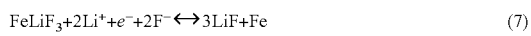  (7)

This example of an extrusion reaction involves separating reacting $FeLiF_3$ with lithium ions, electrons, and fluoride ions to form lithium iron fluoride.

b. Mechanisms of Transport: Particles

Figures 3A, 3B, 3C, 3D:
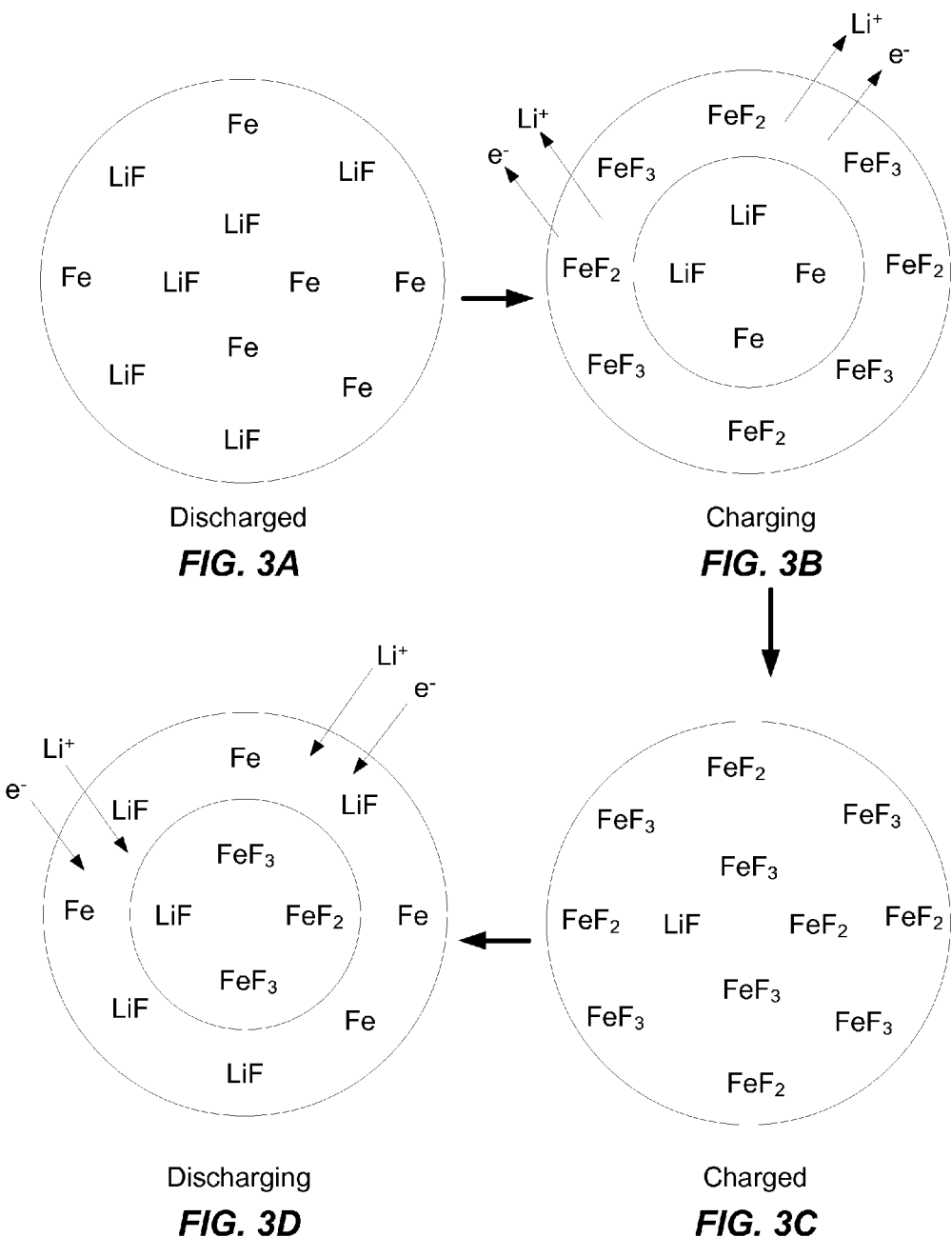
FIGS. 3A-3D are schematic drawings of mechanisms of transport.

FIG. 3A is a schematic illustration of an example of a particle for conversion materials as described above. The discharged particle in FIG. 3A is shown as completely discharged for illustration purposes only and includes only lithium fluoride (LiF) and iron (Fe). This particle represents a particle in the cathode conversion material of a battery, such as the one described with respect to FIG. 1A.

In FIG. 3B, the particle undergoes charging such that lithium ions and electrons leave the particle. Lithium ions ($Li^+$) and electrons ($e^-$) must be transported through other lithium fluoride in the particle to leave the particle. Being closer to the edge of the particles, lithium ions and electrons near the surface of the particle may more easily leave the particle, whereas lithium ions and electrons near the center of the particle must travel further to leave the particle. Unfortunately, lithium fluoride and other transport materials may have low lithium ion and/or electronic conductivities, which hinders the charge rate of the conversion materials and potentially prevents some lithium ions and electrons near the center of the particle from leaving the particle.

As more lithium ions and electrons are transported out of the particle, more ferric fluoride ($FeF_3$) and ferrous fluoride ($FeF_2$) are formed near the surface of the particle, and lithium ions and electrons from the center of the particle must be transported through the ferric fluoride and ferrous fluoride, as well as lithium fluoride.

In FIG. 3C, a fully charged particle is depicted. Because of transport limitations in the particle matrix, some of the lithium fluoride near the center of the particle may not be converted such that some lithium fluoride remains as shown.

In FIG. 3D, a particle pathway through discharging is depicted. During discharge, lithium ions and electrons are transported into the particle. Ferric fluoride and ferrous fluoride react with the incoming lithium ions and electrons near the surface of the particle first, thereby forming elemental iron and lithium fluoride near the surface. Thus, subsequent incoming lithium ions and electrons must be transported through lithium fluoride and/or iron in order to reach the ferrous fluoride and ferric fluoride near the center of the particle. The transport is thus hindered by low conductivity of lithium fluoride to lithium ions and electrons.

During discharging, transport of lithium ions and electrons through ferrous fluoride or ferric fluoride may also be of concern as these ions and electrons navigate through the matrix near the center of the particle. Other mechanisms of transport that may be of concern include the transport of iron metal through lithium fluoride during charge and discharge.

c. Mechanisms of Transport: Thin Film

FIG. 4A is a schematic illustration of a thin film conversion material in a cathode. The thin film cathode conversion material in FIG. 4A is shown as completely discharged for illustration purposes only, and includes only lithium fluoride (LiF) and iron (Fe). The line separating the top from the bottom, which are referred to as "top layer" and "bottom layer" for purposes of this specification, is for illustration purposes only and no physical barrier is between these two layers. These two layers represent the thin film layer of cathode conversion material in a thin film structure of a battery, such as the one described with respect to FIG. 1B.

In FIG. 4B, the thin film conversion material undergoes charging such that lithium ions ($Li^+$) and electrons ($e^-$) leave the cathode. Lithium ions and electrons must be transported through lithium fluoride in the thin film to be transported out of and into the electrolyte and circuit. Note here that lithium ions near the top layer may more easily be transported out of the layer, whereas transport of lithium ions in the bottom layer requires conduction through the cathode material. This hinders the charge rate of the conversion material and potentially prevents some lithium ions in the bottom layer from transporting out of the cathode.

As more lithium ions and electrons are transported out of the thin film cathode, more ferric fluoride ($FeF_3$) and ferrous fluoride ($FeF_2$) are formed in the top layer of the conversion material, and lithium ions in the bottom layer must be transported through both the ferric fluoride and ferrous fluoride in the top layer to leave the particle.

In FIG. 4C, a fully charged thin film cathode conversion material is depicted for purposes of illustration only. Transport may be hindered by low conductivity of the matrix in the thin film, thereby preventing some of the lithium fluoride in the bottom layer from being converted, and there may be some lithium fluoride remaining as shown. There may also be some lithium ions remaining embedded or stuck in the top layer (not shown).

In FIG. 4D, a thin film cathode conversion material pathway through discharging is depicted. During discharge, lithium ions are transported into the cathode. As illustrated, ferric fluoride and ferrous fluoride in the top layer react with the incoming lithium ions and electrons first, thereby forming elemental iron and lithium fluoride in the top layer. Thus, subsequent incoming lithium ions must be transported through lithium fluoride and/or iron in order to reach the ferrous fluoride and ferric fluoride in the bottom layer. This transport is hindered due to slow transport of the lithium ions.

During discharging, transport of lithium ions through ferrous fluoride and ferric fluoride may be of concern as these ions and electrons navigate through the matrix of the thin film. Transport of electrons through lithium fluoride and iron during charge and ferric fluoride and ferrous fluoride during discharge may also be of concern as electrons travel through the matrix of the thin film. Other mechanisms of transport that may be of concern include the transport of iron metal through lithium fluoride during charge and discharge.

Due to these rate-limiting mechanisms of transport, existing conversion materials may not be sufficiently efficient enough for practical use due to lowered rate capability and high over-potentials.

d. Properties of Doped Conversion Materials

Disclosed herein are doped conversion materials that improve transport properties of lithium ions and/or electrons and thereby increase rate capability of conversion materials. The improvement is often manifest as a reduction in the mass transfer over-potential accompanying charge and discharge of the conversion material. The morphology of one or more transport materials in a cathode may be engineered to improve the conduction of at least lithium ions. In some cases, the fabrication may also have a side benefit of improving electron conductivity in one or more of the transport materials, which may or may not be the same material as the one undergoing an improvement in ionic conductivity.

Appropriately doping the transport material with a dopant, defined as an atom, compound, or molecule incorporated within one more cathode conversion material, can change transport properties dramatically and improve the rate capability of the material. Such improved transport properties facilitate practical use of these high energy storage materials.

In some embodiments, the dopant is a "glass former" that generates or maintains a glassy state of the transport material(s). This may improve the lithium ion conductivity and thereby improve charge and discharge rates. In some cases, the doping material is or contains a polyvalent cation, i.e., a cation having a valence or oxidation state 2+ or greater. Such dopants can influence the band gap of the transport material in a way that increases the material's electronic conductivity, which is particularly beneficial in conversion materials with low electronic conductivity, such as materials where metal atoms are bonded to an anion (e.g., ferric fluoride ($FeF_3$)). Such conversion materials with dopants may provide various benefits such as increased cycle lifetime and increased efficiency.

e. Mechanisms for Increasing Conductivity

Reducing the crystallinity of lithium fluoride may increase its lithium ion conductivity. Therefore, various embodiments involve producing and/or maintaining a substantially glassy or amorphous lithium fluoride. Certain metal-containing additives or dopants may be used to promote the glassy or amorphous state of lithium fluoride. Generally, incorporating dopants within a transport material displaces atoms in the crystalline matrix, thereby forming defects in the structure. Defects are frequently interstices or open spaces in the transport material proximate locations where a dopant is inserted. In some cases, the dopants introduce small pores, of size on the order of lithium ions or other transport species, in the transport material. In a structure where there are few defects, the matrix is crystalline and ionic (and/or electronic) mobility is relatively low, and thus the material has a low conductivity.

As shown in FIGS. 13, 14, 15, 17, 19, 21, 23, 25, doping conversion materials, such as LiF, results in more complex XRD structures which is indicative of added disorder. This added disorder is related to improved transport properties as noted herein.

The disordered structures created by doping can range from single defect structures to amorphous, or completely disordered, structures. Single defect structures are structures where low levels of doping occur, and as a consequence such materials have lower conductivity as compared to similar structures with more defects and higher levels of doping. Dopants facilitate the disruption and disordering of crystalline domains, thereby causing crystalline domains to become smaller and smaller to the size of nanocrystalline domains. In certain embodiments, incorporation of a glass former creates a disordered or defect-rich matrix such that interstitial sites and/or grain boundaries increase in concentration and thereby increase the conductivity of the lithium fluoride or other transport material present in the conversion materials. In some embodiments, doped conversion materials with nanocrystalline structures or defect-rich structures may not grow and recede in size substantially during charging and discharging of the conversion material. In doped conversion materials with significant defect concentrations, domains may change material density on the order between about 20% and about 30% as compared to highly crystalline materials.

A structure with high levels of doping, where crystalline domains have become so small as to be essentially non-existent, is referred to as glassy or amorphous material. A glassy material may be viewed as one that is substantially non-crystalline, substantially uniform in composition and substantially lacking in long-range order. Such glassy or amorphous structures may be provided as particles, layers, etc. Amorphous or glassy conversion materials may include a metal, one or more oxidizing species, and a reducing cation mixed at a scale of less than 1 nm, or a conversion material formed such that its constituents are separated on a scale of about 1 nm or less. Glassy conversion material may be substantially homogeneous compositionally and/or morphologically within a volume of 1000 $nm^3$. The glassy conversion material is substantially free from clumps of a single species the metal or oxidizing species with a volume of greater than 125 $nm^3$.

Regions of discrete doped conversion materials in an amorphous or glassy structure may grow and recede with charge and discharge. Such regions may include domains or nanodomains of conversion material; e.g., domains a metal such as iron and domains of a lithium halide, such as lithium fluoride.

In certain implementations, the conductivity of conversion materials is enhanced by doping with a glass former that disrupts the crystalline order in a LiF and $FeF_2$/$FeF_3$ mixture and maintains local disorder in the matrix throughout all states of charge. This maintains high ionic conductivity in the conversion material during charge and discharge. Depending on the selection of a dopant atom and a chosen operating voltage range, the dopant may be provided as a metal or metal compound that is converted during operation to produce the metal dopant that increases conductivity. In some cases, the ionic conductivity enhancing dopant (or an additional metal dopant) increases the electronic conductivity of the conversion material (e.g., $FeF_3$ or $LiFeF_3$). In some embodiments, the doped conversion material may have an ionic conductivity of between about 1e-8 S/cm and about 1e-5 S/cm. For example, the ionic conductivity of conversion materials doped with zirconium may be about 1e-6 S/cm. In some embodiments, the doped lithium fluoride may have a lithium ion conductivity of greater than about 1e-6 S/cm over at least about 100 to 500 charge-discharge cycles.

The electronic conductivity of the metal compound (e.g., ferric fluoride), and possibly other transport materials such as lithium fluoride, may be improved by including a dopant, which doubles as a promoter of amorphous or glassy material (and hence ionic conductivity). In certain embodiments, the dopant includes a metal or metal cation having a valence greater than the highest valence of the metal in the metal compound of the conversion material. For example, if the metal compound is ferric fluoride, the metal or metal cation in the dopant may have a valence of greater than 3. The presence of such dopant may decrease the band gap of the conversion material, thereby increasing the fraction of available electrons in the conduction band at a given temperature. In some embodiments, the doped conversion material may have an electronic conductivity of between about 1e-8 S/cm and about 1e-3 S/cm. For example, the electronic conductivity of conversion materials doped with zirconium may be about 1e-6 S/cm.

As shown in FIGS. 16, 18, 20, 22, 24, and 26, the presence of dopants can decrease the band gap of the conversion material, thereby increasing the fraction of available electrons in the conduction band at a given temperature.

The cathode layer in a thin-film format or structure including doped conversion materials may be between about 30 to about 100 microns thick, or between about 40 and about 60 microns thick. The cathode particles including doped conversion materials between about 50 nm and about 600 nm in diameter, between about 100 nm and about 500 nm in diameter, or about 300 nm in diameter.

One advantage of doping conversion materials is that the increased advanced rate capability enables the use of the conversion materials for practical application. The optimization of mass transport in the conversion materials also increases cycle life. Reduced mass transfer overpotential provides higher charging efficiency, thereby prolonging the use of the conversion material in energy storage or battery systems.

XI. METHODS

Various classes of methods of forming doped conversion materials may be used. Doped conversion materials may be prepared in a charged or in a discharged state, or an unlithiated or lithiated state, respectively.

Conversion materials formed in an unlithiated state may be synthesized by combining a dopant with a metal halide, such as ferric fluoride or ferrous fluoride. In one example, unlithiated conversion materials may be formed by combining ferric fluoride and ferrous fluoride with zirconium metal.

Conversion materials formed in a lithiated state may be synthesized by combining a dopant with a lithium halide and a metal, such as lithium fluoride and metallic iron. In one example, lithiated conversion materials may be formed by combining lithium fluoride and iron with zirconium metal.

XII. METHODS OF CHARGING A CATHODE HAVING A DOPED CONVERSION MATERIAL

In some examples, set forth herein is a method of charging a cathode having a doped conversion material, described herein, in which the method includes applying a voltage to the cathode to convert a metal fluoride dopant therein to a metal to increase the electronic conductivity of the doped conversion material. In some examples, both the conversion material and the dopant metal fluoride have low electronic conductivities. By converting a metal fluoride that has a low electronic conductivity into a metal, which has a high electronic conductivity, the conversion material that has the metal doped therein will benefit from an increase in the electronic conductivity of the doped conversion material.

In some of the charging methods set forth herein the metal fluoride dopant is $FeF_3$, $CuF_2$, or $NiF_2$. In some of these charging methods the metal fluoride dopant is $FeF_3$. In other of these charging methods the metal fluoride dopant is $CuF_2$. In still other of these charging methods the metal fluoride dopant is $NiF_2$.

In some of the charging methods set forth herein, the applied voltage is 2-2.4V. In some of the charging methods set forth herein the applied voltage is 2.7-3.4V. In some of the charging methods set forth herein the applied voltage is 2.4-3.0V. In some of the charging methods set forth herein the applied voltage is 3.0V. In some of the charging methods set forth herein the applied voltage is 1.0V. In some of the charging methods set forth herein the applied voltage is 1.5V.

In some of the charging methods set forth herein, the applied voltage is cycled at different voltages to prepare dopants are controlled states of oxidation. For example, the voltage may be at 2V for one or more charge cycles. Subsequently, the voltage may be at 3V for the next one or more charge cycles. In some of these examples, the applied voltage is applied in a constant current mode.

XIII. METHODS OF MAKING AN ENERGY STORAGE DEVICE

In some examples, set forth herein is a method of fabricating an energy storage device including preparing an electrochemically active material by melting or evaporating one or more precursors of a conversion chemistry material and a dopant source. In some examples, the methods include atomizing the melted precursors and the dopant source into particles. In some other examples, the methods includes cooling the particles to form an amorphous conversion chemistry material. In some of these examples, the methods includes fabricating a cathode comprising the electrochemically active material in electrical communication with a current collector. In some examples, the methods further include combining the cathode with an anode and an electrolyte to form the energy storage device.

In some methods set forth, the one or more precursors of a conversion chemistry material and a dopant source include a metal component and a lithium component intermixed with the metal component.

In some methods set forth, the cooling is performed by contacting the particles and the dopant source on a spinning or rotating cooling surface.

In some methods set forth, the dopant source is a metal, metal oxide, or metal fluoride. In some methods set forth, the dopant source is a metal. In some methods set forth, the dopant source is a metal oxide. In some methods set forth, the dopant source is a metal fluoride.

In some methods set forth, the particles are cooled at a rate of about 100 degrees Kelvin per second. In certain methods, the particles are cooled at a rate of about 50 degrees Kelvin per second. In some methods, the particles are cooled at a rate of about 20 degrees Kelvin per second.

In some examples, set forth herein are methods for fabricating an energy storage device by (a) preparing an electrochemically active material by melting one or more precursors of the electrochemically active material and a dopant source, atomizing the melted precursors and the dopant source into particles, and cooling the particles and the dopant source to form an amorphous conversion material; (b) fabricating a cathode including the electrochemically active material in electrical communication with a current collector, a metal component, a lithium component compound intermixed with the metal component, and the dopant source; and (c) combining the cathode with an anode and an electrolyte to form the energy storage device. In some examples, the cooling is performed by contacting the particles and the dopant source on a spinning or rotating cooling surface. In some embodiments, the dopant source is a metal, metal oxide, or metal fluoride. In some embodiments, the particles and the dopant source are cooled at a rate of at least about 50 degrees Kelvin per second.

XIV. METHODS OF MAKING A DOPED CONVERSION MATERIAL

In some examples, set forth herein is a method of forming a doped conversion material including providing a first precursor material, the first precursor material comprising a metal material. In some examples, the method also includes providing a second precursor material, the second precursor material comprising a reducing cation material and the first precursor material and second precursor material being characterized by a tendency of phase separation. In some examples, the method also includes providing a dopant source. In some examples, the method also includes melting or evaporating the first precursor material, the second precursor material, and the dopant source. In some examples, the method also includes injecting the first precursor material, the second precursor material, and the dopant source into a cooling environment, wherein the first precursor material, the second precursor material, and the dopant source form a mixed material that is cooled to generate formed particles. In some examples, the method also includes collecting the formed particles.

In some methods set forth, the dopant source comprises a metal, a metal fluoride, or a metal oxide.

In some methods set forth, the first precursor material, the second precursor material, and the dopant source are cooled at a rate of at least about 100 degrees Kelvin per second. In some examples, the dopant sources are cooled at a rate of at least about 50 degrees Kelvin per second. In some examples, the dopant sources are cooled at a rate of at least about 25 degrees Kelvin per second.

In some examples, set forth herein are methods for forming a conversion material by (a) providing a first precursor material, which may include a metal material; (b) providing a second precursor material, which may include a reducing cation material and wherein the first precursor material and second precursor material are characterized by a tendency to phase separate; (c) providing a dopant source; (d) melting the first precursor material, the second precursor material, and the dopant source to liquid state; (e) evaporating the dopant source; (f) injecting the first precursor material, the second precursor material, and the dopant source into a cooling environment, such that the first precursor material, the second precursor material, and the dopant source form a mixed material that is cooled to generate formed particles; and (g) collecting the formed particles. In some examples, the injecting step includes opening an aperture or nozzle that allows for vapors of the precursors to enter the cooling environment, which may be under a reduced atmosphere or vacuum. In some examples, a filtering step is included after the melting and/or the evaporating steps in order to separate the evaporated vapors and melted liquids from the liquid or solid state precursors thereof.

Conversion materials may also be formed in a partially lithiated state by combining a dopant with a cation halide and metal halide. For example, partially lithiated conversion materials may be formed by combining ferric fluoride, ferrous fluoride, and lithium fluoride with zirconium metal.

In some embodiments, doped conversion materials may be fabricated by first forming the conversion material in a charged or discharged state, performing a first conversion, and then doping the conversion material with the dopant using a method described herein. For example, a conversion material containing LiF and Fe as fabricated may undergo a first conversion reaction, and then zirconium fluoride may be added as a dopant to form an amorphous doped conversion material using a method described herein.

The doped conversion materials described herein can be fabricated by many different processes. Processes that are exclusively material synthesis include sol gel synthesis, one pot synthesis, bottom-up synthesis, melt spinning Processes that are exclusively particle size reduction include wet milling, dry milling, planetary milling, high energy milling, jet milling. Processes that are exclusively coating include slot-die, spin coating, dip coating, doctor blade, metering rod, slot casting, screen printing, inkjet printing, aerosol jet, knife-over roll, comma coating, reverse comma coating, tape casting, slip casting, gravure coating, microgravure coating. All other listed processes are some hybrid of synthesis/deposition.

Suitable deposition processes include evaporation, vapor phase deposition, CBD, and slurry coating. Suitable processes for particle formation/downsizing include dry milling, wet milling, high energy milling, or bottom-up chemical synthesis.

The following is a list of examples of suitable fabrication methods:

Vacuum processes, including sputtering, evaporation, reactive evaporation, vapor phase deposition, chemical vapor deposition (CVD), plasma-enhanced CVD (PECVD), metal organic CVD (MOCVD), atomic layer deposition (ALD), plasma-enhanced ALD (PEALD), molecular beam epitaxy (MBE), ion-beam-assisted deposition (IBAD), and pulsed laser deposition (PLD).

Wet synthesis, including chemical bath deposition (CBD), electroplating, spraying and in situ formation, Langmuir, Langmuir-Blodgett, layer-by-layer, electrostatic spray deposition, ultrasonic spray deposition, aerosol spray pyrolysis, sol gel synthesis, one pot synthesis, and other bottom-up methods.

Dry synthesis, including pressing, hot pressing, cold pressing, isostatic pressing, sintering, spark plasma sintering, flame pyrolysis, combustion synthesis, plasma synthesis, atomization, and spin-melting.

Top-down methods, such as jet milling, wet/dry milling, planetary milling, and high energy milling.

Coating methods, such as slot-die, spin coating, dip coating, doctor blade, metering rod, slot casting, screen printing, inkjet printing, aerosol jet, knife-over roll, comma coating, reverse comma coating, tape casting, slip casting, gravure coating, and microgravure coating.

a. Dopants and Dopant Sources

Dopants may be introduced into the conversion material from various dopant sources. Classes of materials that may be used as dopants include metal fluorides, metals, metal oxides or metal hydroxides, phosphates, and nitride network formers. In some embodiments, a metal may be added as a dopant in the conversion material and fluorides may form with existing fluoride ions in the matrix, thereby forming metal fluorides. As an example, metallic zirconium may be used as a dopant source by mixing with lithium fluoride and iron, and when the zirconium incorporates in the lithium fluoride matrix, its positive charge is compensated by fluoride ions provided from the lithium fluoride.

As used herein, nitride network formers include, but are not limited to, $Li_3N$ and oxynitrides such as LIPON.

Some dopants may be suitable as lithium-ion conductivity enhancers such as zirconium (Zr), aluminum (Al), niobium (Nb), hafnium (Hf), chromium (Cr), and lithium (Li). Some dopants may be suitable to promote electronic conductivity in transport materials such as ferric fluoride. Metal fluorides and metal oxides may also be used as dopant sources to promote electronic conductivity. Examples of such fluorides and oxides include $ZrF_x$, $AlF_x$, $NbF_x$, $HfF_x$, $CrF_x$, $TiF_x$, $VF_x$, MgFx, CaFx, SiFx, $YF_x$.$TiO_2$, $SiO_2$, Li, O, and $Li_2O$.

In some examples, the dopants are selected from $Li_2O$, $ZrF_2$, $NiF_2$, $CrF_3$, $CrF_2$, $AlF_3$. In some examples, the dopants are chromium fluoride and zirconium fluoride mixtures, such as Zr:Cr 9:1 atomic percent mixtures, or Zr:Cr 6:1 atomic percent mixtures.

The concentration of dopants in the conversion materials may vary and may be measured by the atomic ratio, which is the ratio of the dopant atoms to atoms of the metal anion in the conversion material, e.g. Fe or Cu. Example dopant atomic ratios range from 0% to about 20%, or about 5% to about 10%.

b. Spin-Melting

Spin-melting may involve combining compounds to be combined in a chamber, heating the chamber, and once an alloy or other combined structure is formed, spraying the material onto a cooled roller to quench the material and retain an amorphous phase. In some embodiments, spin-melting includes combining lithium fluoride, iron, and zirconium fluoride in a chamber, heating the chamber, and cooling the chamber quickly to keep all materials in an amorphous phase.

c. Evaporation

In various embodiments, doped cathode conversion materials may be formed using evaporation processes. For example, starting materials including $FeF_3$/$FeF_2$ and a dopant, such as zirconium, may be evaporated onto the cathode electrical contact layer. In a specific embodiment, a flash evaporation process is performed to allow the materials to evaporate quickly and form substantially uniform and doped conversion material.

In many evaporation techniques, a precursor material is heated to a temperature at which it has a significant vapor pressure, and then the material is allowed to deposit on a substrate to a nanoscale thickness. Such techniques include thermal evaporation, e-beam evaporation, vapor phase deposition, close-space sublimation, and others. Depending on the method, precursor material(s) may or may not have a tendency to have phase separation. In their respective vapor states, the precursor materials may be mixed in a chamber to form a mixed material within the chamber. Cooling may take place naturally or by contact with a cold surface or a cold gas. The mixed material may then be collected.

To deposit an iron fluoride compound with a dopant as described herein, co-evaporation of materials containing iron, fluorine, and the dopant, such as zirconium, may be performed so that the principal components of the material mix in the gas phase before they are deposited on the substrate to thereby form domains or particles. In another embodiment, sources of each of the individual components of the composition are separately evaporated and deposited onto the substrate such that the components form distinct layers. By maintaining these layers at sufficiently thin dimensions and appropriate mass ratios, the desired compound may be formed. Each layer may be quite thin, typically on the order of a nanometer or smaller. Mass ratios are chosen to produce an active compound or mixture having atomic ratios or stoichiometries described herein.

One example of a class of suitable evaporation techniques is vapor transport deposition, or flash evaporation. In these techniques, continuous deposition of the film material occurs by saturating a carrier gas with a vapor from a subliming source. The saturated mixture may be directed over a substrate at a relatively low temperature, resulting in a supersaturation condition and subsequent film growth. In one implementation, a reactor employs a separate power source for sources of fluorine, iron, and a dopant. A helium source may blow heated helium into the powders, which are sublimated and transported into a reactor where, in the vapor phase, the components mix before being deposited on a cold substrate. In an appropriately designed apparatus, each of the powders is provided via a separate tube, and during transport through the tube, the powder is vaporized by the hot helium or other carrier gas. A non-limiting list of evaporation sources may include LiF, $FeF_3$, $FeF_2$, $LiFeF_3$, Fe, Li, and dopant sources (such as dopant metals, oxides, and fluorides listed herein). The evaporated source material may be exposed to a reactive process in an ambient gas or plasma produced by a fluorine-containing material, such as $F_2$, $CF_4$, $SF_6$, $NF_3$, and others. Appropriate precursors for a $FeLi_aF_b$ compound with a dopant may include iron nanoparticles, dopant nanoparticles such as zirconium, iron (II) fluoride, iron (III) fluoride, stainless steel, lithium metal, lithium fluoride, or vapor phase precursors, such as $F_2$, $CF_4$, $SF_6$, and $NF_3$.

In some Examples, the materials set forth herein can be prepared using flash evaporation techniques, such as, but not limited to, those set forth in International Application No. PCT/US2014/041203, entitled FLASH EVAPORATION OF SOLID STATE BATTERY COMPONENT and filed Jun. 6, 2014, which is incorporated herein by reference in its entirety.

One method referred to herein as "single evaporation" may involve using a single crucible to vaporize the conversion material and dopants, followed by redepositing the vapor on a surface to form the particles by flash evaporation. For example, a crucible including $FeF_3$ and 5% $MoO_2$ may be vaporized at 500° C. and redeposited on a surface to form doped particles. Another method referred to herein as "co-evaporation" may involve flash evaporation using two crucibles, one used to vaporize the conversion material and one used to vaporize the dopant, whereby both components are redeposited together on a surface to form the doped particles. For example, one crucible including $FeF_3$ and another crucible including 5% $MoO_2$ may each be vaporized at 500° C. and redeposited together on a surface to form the doped particles. In another example, one crucible including $FeF_3$ and another crucible including 5% $MoO_2$ may each be vaporized at different vaporization temperatures (e.g., 500° C. and 550° C.) and redeposited together on a surface to form the doped particles. Particles may be milled in air or in an inert solvent to form smaller scaled particles about 50 nm in size. Oxygen content may be measured in the post-milled particles in some embodiments. In some embodiments, particles are fabricated using between about 1 and about 10 atomic % dopant or mixture of dopants.

d. Quenched Atomization

Evaporation methods may involve rapidly cooling two or more evaporated sources of materials to be combined to quench quickly for a duration insufficient to crystallize the materials, thereby forming an amorphous or glassy doped conversion material. In a specific embodiment, doped conversion material is formed by atomically mixing precursor materials in their liquid state. More specifically, a method for forming a doped conversion material may include providing a first precursor material that includes a metal-containing material. For example, the metal-containing material includes iron and/or other metal materials, such as $FeF_2$/$FeF_3$. A second precursor material is also provided. The second precursor material may include a dopant, such as zirconium. The first precursor material and the second precursor material are characterized by a tendency of phase separation. Phase separating materials have a positive enthalpy of mixing. In their stable states, phase separating materials segregate to form distinct regions primarily composed of each individual material.

In an atomization process, the precursor materials are melted into their respective liquid states and injected into a cooled chamber that quenches the materials into an unstable or meta-stable state. For example, a first precursor material and a second precursor material may have different melting temperature, and thus can be melted separately or together at a temperature above the melting point. Depending on the specific implementation, the mixing and injection of the precursor materials can be performed in different sequences. In a specific embodiment, the precursor materials are placed together as late as possible in the process prior to injection. While placed together in their liquid state, the precursor materials are then injected to a cooling chamber through a single nozzle. For example, the nozzle forces the precursor materials into small-sized particles or nanodomains, which allows mixing at an atomic level to occur, and the material is quenched rapidly to "freeze in" the mixed state.

Alternatively, the precursor materials can be injected separately by two or more nozzles into the cooling chamber, and mixing may take place solely within the cooling chamber. In some embodiments, a cooling surface can be used as an alternative to a cooling chamber. Since the precursor materials have a tendency to have phase separation, the formed doped particles or nanodomains need to be cooled rapidly to stay in the mixed state. In various embodiments, the formed doped particles or nanodomains are cooled a rate of least about 100 degrees Kelvin per second. In a specific embodiment, the rate of cooling is close to 10,000 degrees Kelvin per second. For example, the formed doped particles or nanodomains are cooled to a room temperature and are sufficiently stable in the mixed state. Cooling may be performed in various ways. In an implementation, cooling is performed by an injected cold inert gas into the cooling chamber. In another implementation, cooling is performed by a cold surface such as a cold copper drum or anvil. The formed doped particles or nanodomains are then collected. For example, additional processes are performed to use the formed doped particles or nanodomains as conversion material in a battery cell.

e. Other Suitable Methods

In certain embodiments, the doped conversion material is produced using sputtering, PVD, ALD, or CBD. In one method described herein, the devices are fabricated by sputtering using an Endura 5500 by Applied Materials of San Jose Calif. In one version, the devices are fabricated by sequential deposition of the anode current collector, anode (optional), electrolyte, cathode (with doped conversion material), and cathode current collector on a substrate. In one version, there is no separate substrate and the anode, electrolyte, cathode, and cathode current collector are deposited directly on the anode current collector. In one version, there is no separate substrate and the cathode, electrolyte, anode, and anode current collector are deposited directly on the cathode current collector.

In certain embodiments, a doped conversion material for a cathode is prepared using a process in which one or more precursors or reactants are contacted in solid phase, also referred to as "solid phase synthesis." Examples include hot pressing, cold pressing, isostatic pressing, sintering, calcining, spark plasma sintering, flame pyrolysis, combustion synthesis, plasma synthesis, atomization, and melt spinning Some solid phase syntheses involve grinding and mixing of bulk precursor materials. The bulk materials are ground to very small dimensions and then combined or otherwise mixed and reacted as necessary to form the desired composition. Milling may be performed via jet milling, cryomilling, planetary milling (Netzsch, Fritsch), high energy milling (Spex), and other milling techniques. In some embodiments, the ground and mixed particles are calcined. An examples of solid phase synthesis processes for producing iron fluoride conversion materials are set forth in Nonprovisional patent application Ser. No. 13/922,214, filed 19 Jun. 2013, also International PCT Patent Application No. PCT/US14/41204, also U.S. Nonprovisional patent application Ser. No. 14/146,728, filed Jan. 3, 2014, and U.S. Nonprovisional patent application Ser. No. 14/221,957, filed Mar. 21, 2014 of which are incorporated herein by reference in its entirety.

f. Cell Construction

The above disclosure describes various elements of a battery including current collectors, anodes, cathodes, and electrolytes. Conventional format battery designs may be employed. These include both cylindrical and prismatic configurations such as those employed in consumer electronics, electric vehicles, medical devices, uninterruptable power supplies, etc. The size and footprint of these batteries may be similar to those of conventional format batteries such as A, AA, AAA, C, 18650, etc.

Figure 5:
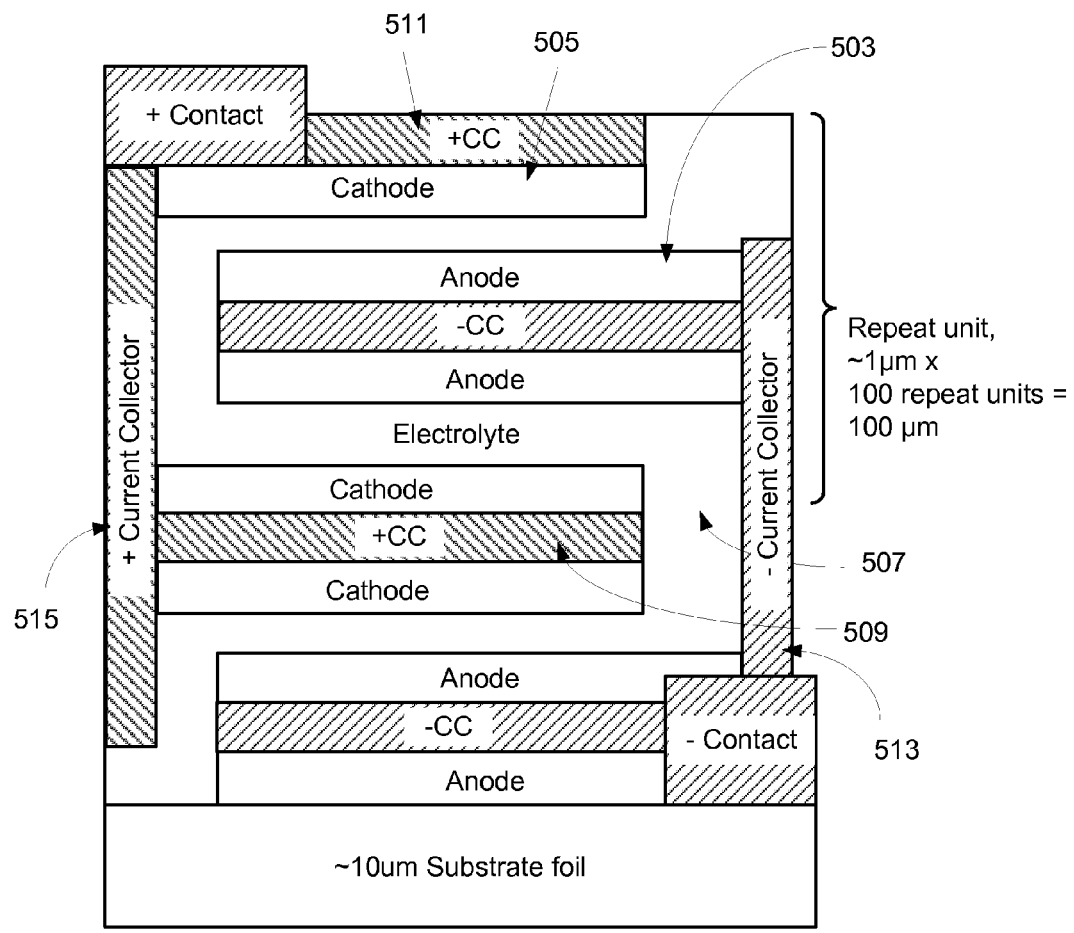
FIG. 5 is an example of a small multi-stack battery.

FIG. 5 presents an example of a small multi-stack battery configuration. While the depicted device shows only two anodes 503 and two cathodes 505, the concept is readily extendable to designs having more, and often many anodes and cathodes; for instance 100 layers of anode/electrolyte/cathode, each layer on the order of a 100 nm thick. The anodes 503, cathodes 505, and electrolyte 507 may have compositions, properties, and/or morphologies disclosed above.

The disclosure herein also contemplates thicker layers which are arranged according to other battery designs known in the relevant art.

Note that there is a current collector disposed between two layers of active material in each electrode. These current collectors (509 and 511) are horizontally oriented in the depicted embodiment. These individual electrode current collectors are electrically connected to a bus or vertical current collector (513 and 515) as depicted in the figure. Solid electrolyte not only separate adjacent anodes and cathodes but also separates the electrodes from the vertical current collectors of the opposite polarity.

In various embodiments, the device is provide with a battery maintenance or battery controller apparatus such as a battery charger and associated circuitry for controlling discharge and/or charge parameters such as cut off voltages, cut off capacities, current, temperature, and the like.

XV. EXPERIMENTAL

In the below examples, doped and undoped conversion materials were components of an electrochemical test cell. The cell included a negative current collector, negative electrode (anode), electrolyte, positive electrode (cathode layer including the conversion material particles), and positive current collector. All cells for the below experiments contain lithium ions, which shuttle between the anode and the cathode during charge and discharge.

a. Example 1

An experiment was conducted to measure the extent of the ionic and electronic transport limitation versus the state of charge of the material. For this experiment, a lithiated Fe/LiF system with an amorphous LiF matrix doped with lithium oxide was used. A galvanic titration technique was performed by cycles of applying and periodically stopping a current (relaxation) to evaluate the overpotential and equilibrium potential of the material. The results are plotted in FIG. 6. In each cycle, a current is applied at a C rate, which ranges from C/10 to 10 C, for example 1C, which brings the system out of equilibrium and a voltage drop occurs over the resistor and creates an overvoltage as shown by the peaks and the outer curve in FIG. 6. Subsequently, the current is stopped and the voltage decreases slightly exponentially due to ion diffusion and the equilibrium potential is evaluated and is represented by the inner curve in FIG. 6. It is noted here that the inner curve is an approximate equilibrium potential.

As FIG. 6 shows, the overpotential in the discharge and charge conversion plateaus due to ionic transport may be reduced, and the overpotential due to electronic/ionic impedence in the material may also be reduced. Ionic transport is particularly limited during the conversion states of charge when $Li^+$ ions are no longer intercalated but are incorporated in extruded LiF on discharge, or extracted to form $FeF_2$/$FeF_3$ on charge. Electronic transport is particularly limited on charge when there is less metallic iron present and transport must occur through high band gap insulating phases of $FeF_2$ and $FeF_3$.

As compared to other hysteresis curves, FIG. 6 indicates that the magnitude of the hysteresis curves observed in other investigations of LiF and Fe matrix conversion materials is not an "intrinsic" or "inherent" chemical property of the conversion material itself because the inner curve of FIG. 6 shows a much lower equilibrium potential than curves observed in prior research.

FIG. 6 is an experiment where the material is doped with lithium oxide as a result of the fabrication process.

The techniques and doped conversion materials described herein have shown that high capacity, low hysteresis, and low overpotential can be achieved at even at high rates. Rather, the inner curve shown in FIG. 6 represents a version closer to a fundamental hysteresis curve while the outer curve represents the hysteresis curve for the overpotential.

b. Example 2

Figure 7:
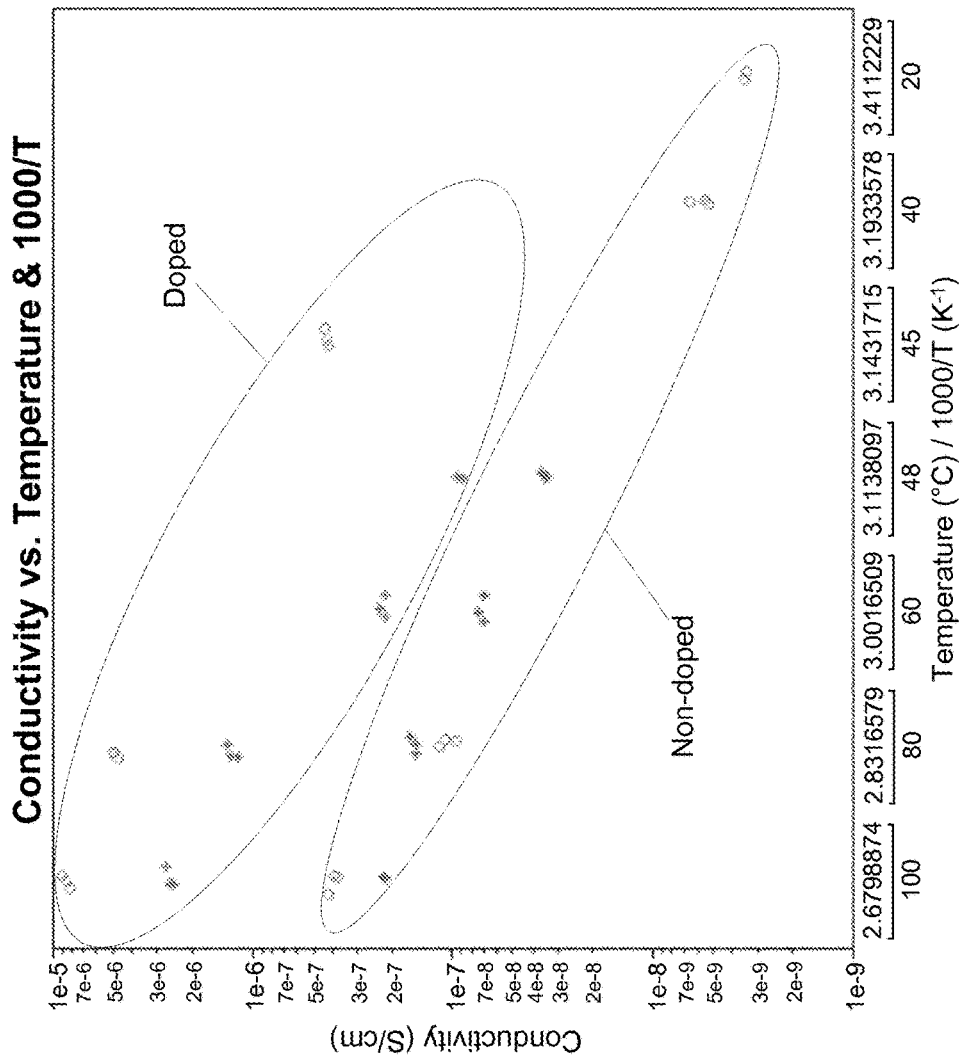
FIG. 7 is a plot of lithium ion conductivity in accordance with experimental results of disclosed embodiments.

An experiment was conducted to measure the conductivity of lithium ions in a doped LiF matrix versus a non-doped amorphous LiF matrix. The doped LiF matrix was doped with lithium oxide glass formers. The results are shown in FIG. 7. In this experiment zirconium fluoride was included as the glass former dopant. As mentioned, the above example in FIG. 6 used lithium oxide glass formers. This data shows that the effect shown in FIG. 7 is similar for a variety of glass formers including lithium oxide. Conductivity in S/cm was plotted versus temperature in Celsius and temperature represented by 1000 divided by the temperature in Kelvin. The top row of values in the x-axis shows the temperature in $1000 \times K^{-1}$ and the bottom row of values in the x-axis shows the temperature in ° C. The doped conversion materials exhibited higher conductivity than the non-doped conversion materials at all temperatures. Crystalline LiF conductivity is even lower, at about 1e-10 S/cm or lower).

c. Example 3

Figure 8:
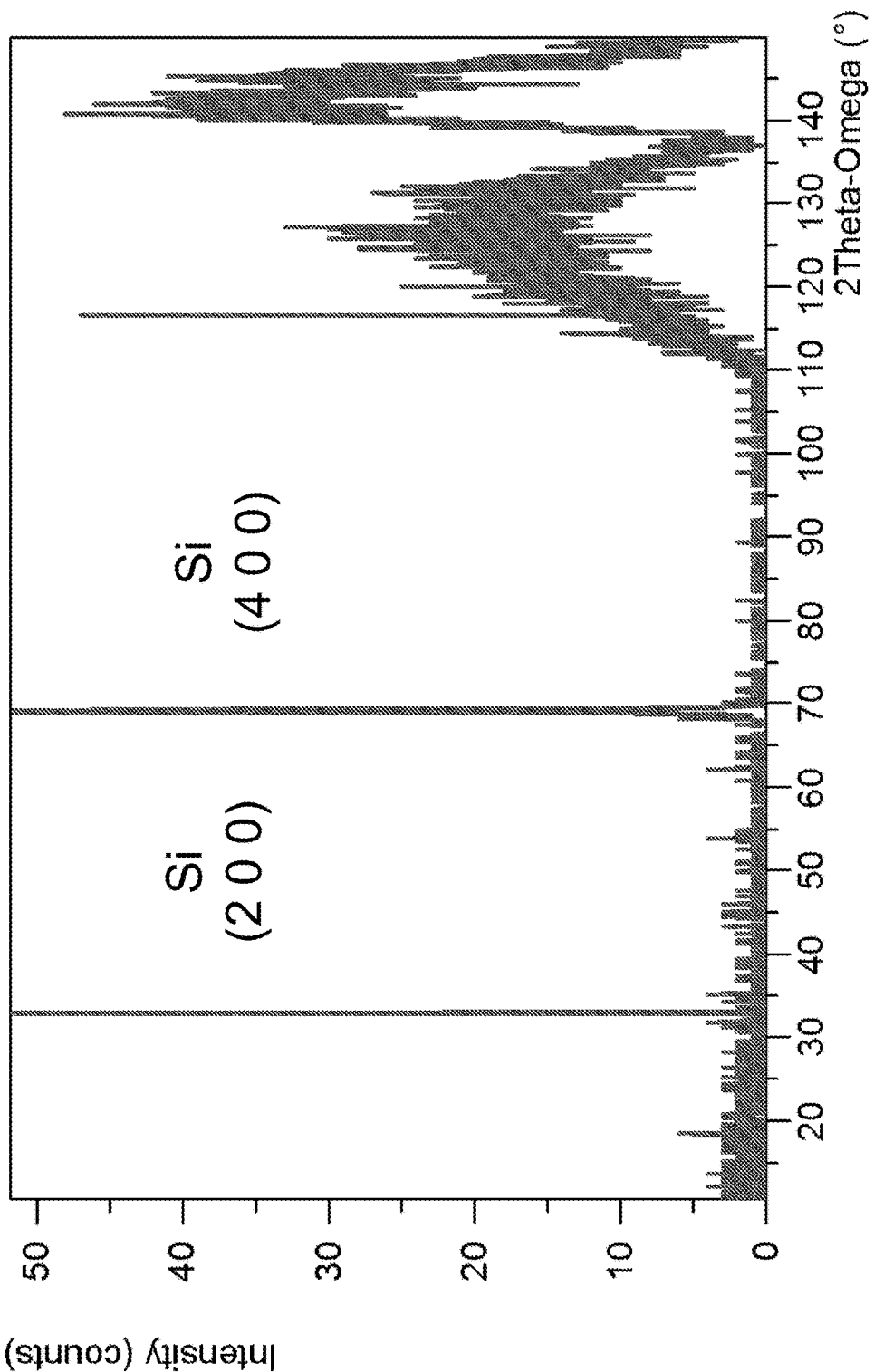
FIG. 8 depicts experimental results of x-ray diffraction of conversion materials according to disclosed embodiments.

An experiment was conducted to evaluate doped LiF conversion material in a charged state. FIG. 8 shows the x-ray diffraction (XRD) results of the doped LiF conversion material in the charged state. FIG. 8 shows the x-ray diffraction (XRD) results of the doped LiF conversion material in the discharged state. In this example, the dopant is $Li_2O$. The lack of crystalline peaks (other than the internal Silicon standard) suggests a highly nanocrystalline or amorphous LiF matrix as a result A 100 nm film was evaluated and both the XRD symmetrical scan and Glancing angle XRD scan)($\alpha=0.5°$) showed the same peaks. Where a non-doped conversion material undergoes a mechanism of transport such as the one described above with respect to FIGS. 3A-3D and 4A-4D, peaks in the 20° to 80° 2-theta-omega range are expected. This is due to some crystalline LiF remaining in the cathode conversion material due to the slow transport mechanism. However, as shown in FIG. 8, only two peaks in the 20° to 80° range were observed, and both peaks corresponded to the silicon internal standard present in the sample substrate on which the thin film cathode conversion material was deposited. No peaks for LiF were observed, indicating that substantially all of the crystalline LiF was converted efficiently to an amorphous or nanocrystalline state in the doped conversion material.

d. Example 4

Figure 30:
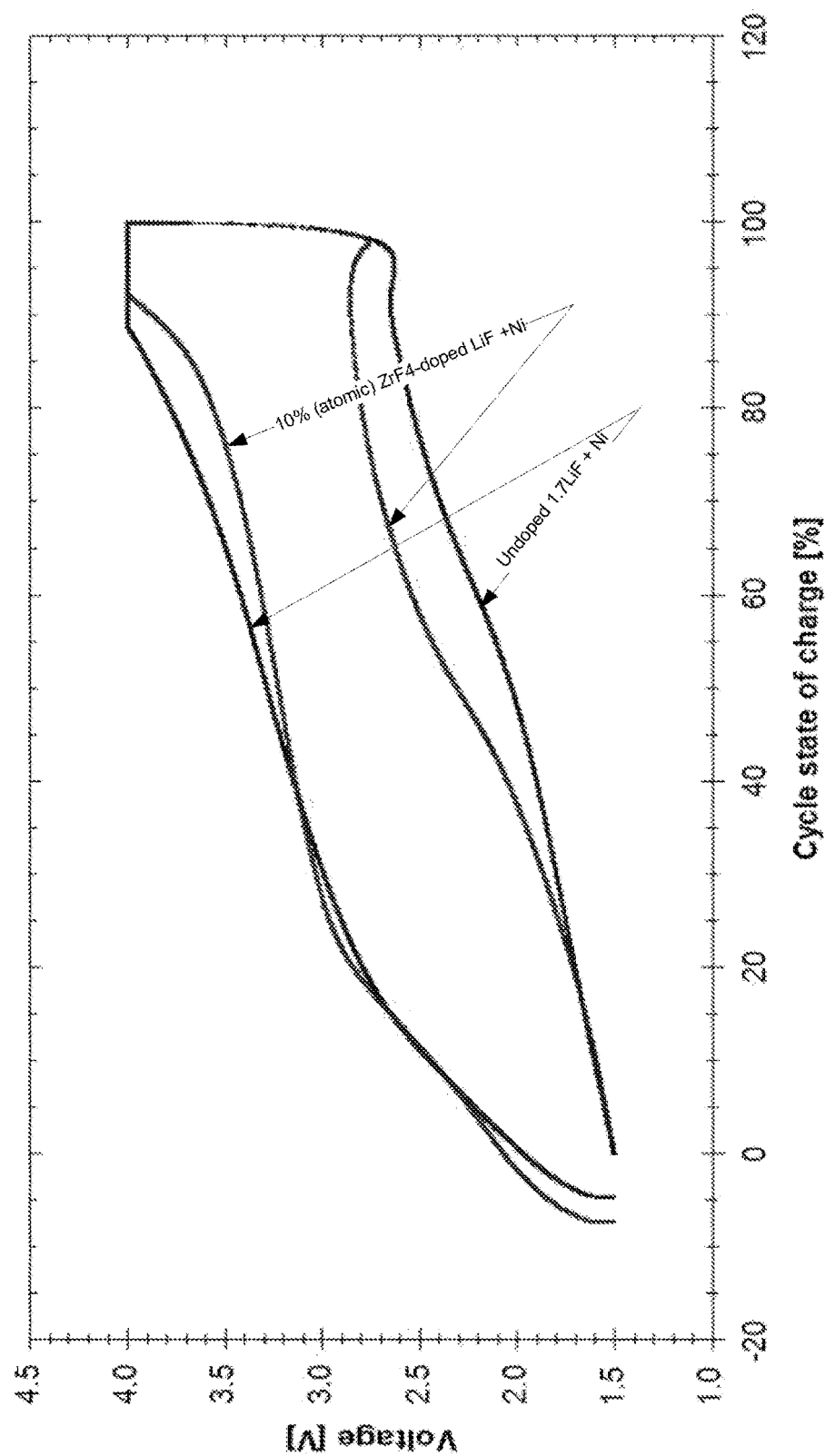
FIG. 30 shows experimental results for $ZrF_4$-doped $NiF_2$ materials. The plot shows Voltage (V) as a function of the cycle state of charge (%).
Figure 31:
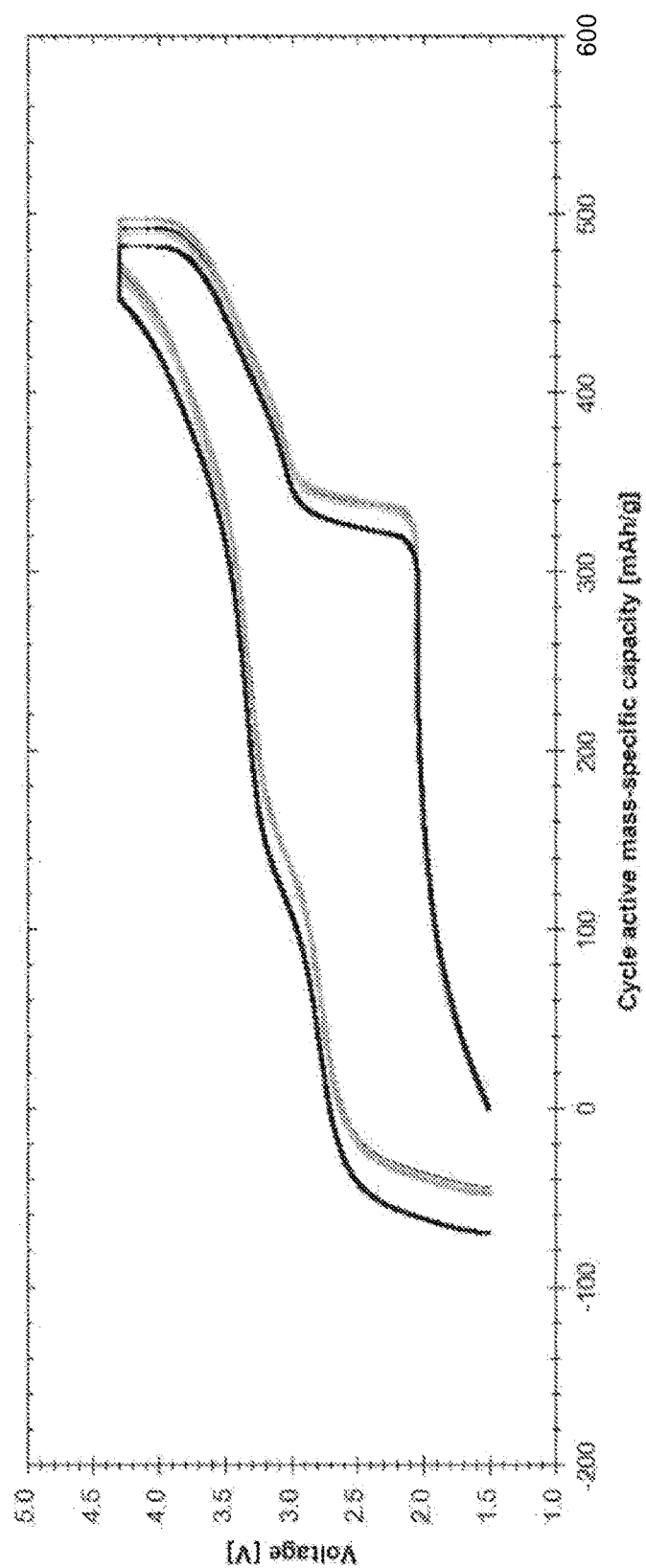
FIG. 31 shows Voltage v. Cycle active mass-specific capacity for undoped particles of $LiFeF_3$ and 1% atomic Cu doped particles of $LiFeF_3$.

FIG. 30 shows the results of doping LiF with $ZrF_4$ wherein the conversion material is $NiF_2$. In some examples, doping LiF substantially decreases the impedance of the LiF.

In some Examples, the materials set forth herein can be prepared using flash evaporation techniques, such as, but not limited to, those set forth in International Application No. PCT/US2014/041203, entitled FLASH EVAPORATION OF SOLID STATE BATTERY COMPONENT and filed Jun. 6, 2014, which is incorporated herein by reference in its entirety. In one Example, $FeF_3$ was mixed with 5 weight % of $CuF_2$. This blend was evaporated in one source. In a second source, LiF was evaporated. The $FeF_3$ contains less than 0.5 atomic % O and less than 0.1 atomic % C. In the Flash Evaporation synthesis of this material, the following parameters were employed: 300 sccm carrier gas flowing into each gun; 600 mtorr process pressure; 1300° C. evaporation temperature on the LiF side, 1200° C. on the $FeF_3$/$CuF_2$ side. The deposition drum was rotating at a 100 rpm drum speed. The powder harvesting yield was 70%. Approximately 100 g/hour production rate was observed.

Figure 32:
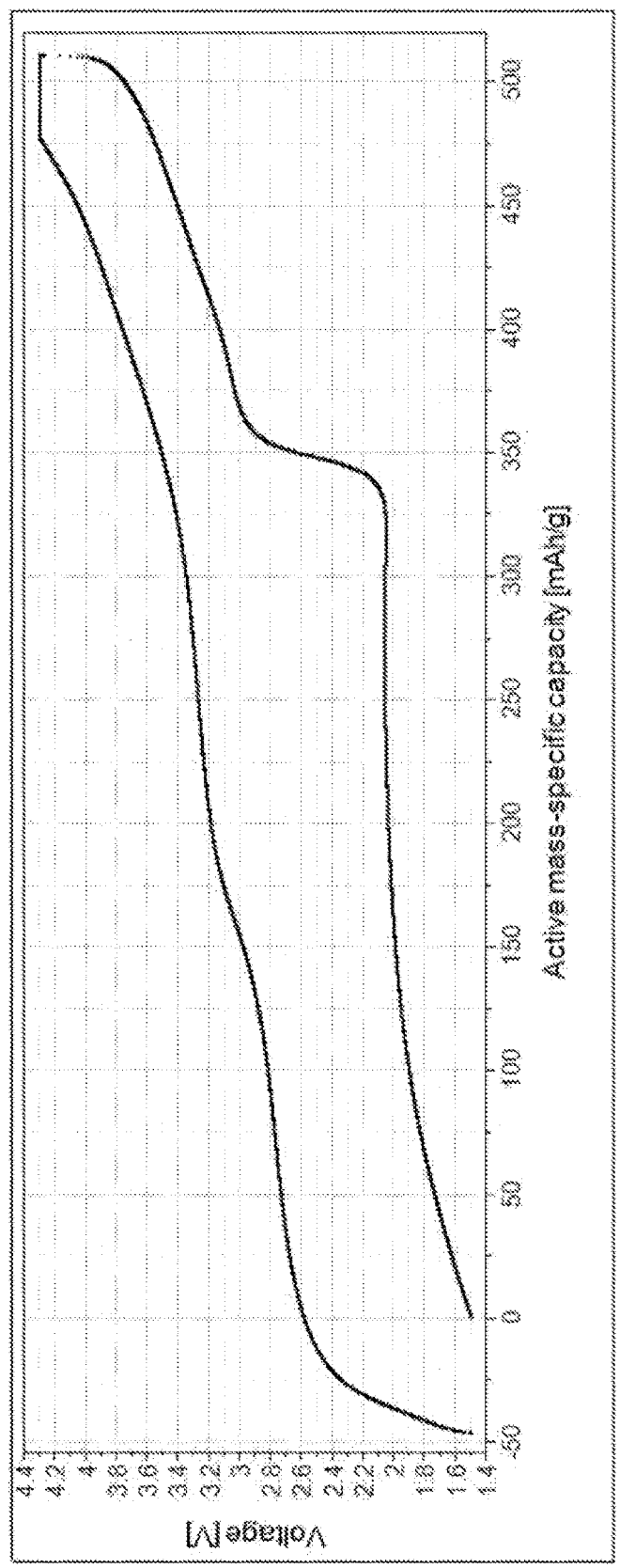
FIG. 32 shows Voltage v. Active mass-specific capacity [mAh/g] for $CuF_2$-doped $FeF_3$—LiF prepared according to the Example below.

The precursor mass rates were adjusted to target a specific Li/Fe ratio, which was about 0.3, in the finished product. The product was comprised of about 0.1 atomic % Cu in the finished powder. The electronic properties of the product are shown in FIG. 32. As evident from FIG. 32, this material was observed to have a capacity of about 510 mAh/g and an Energy density greater than 1210 Wh/kg.

e. Example 5

Figure 33A:
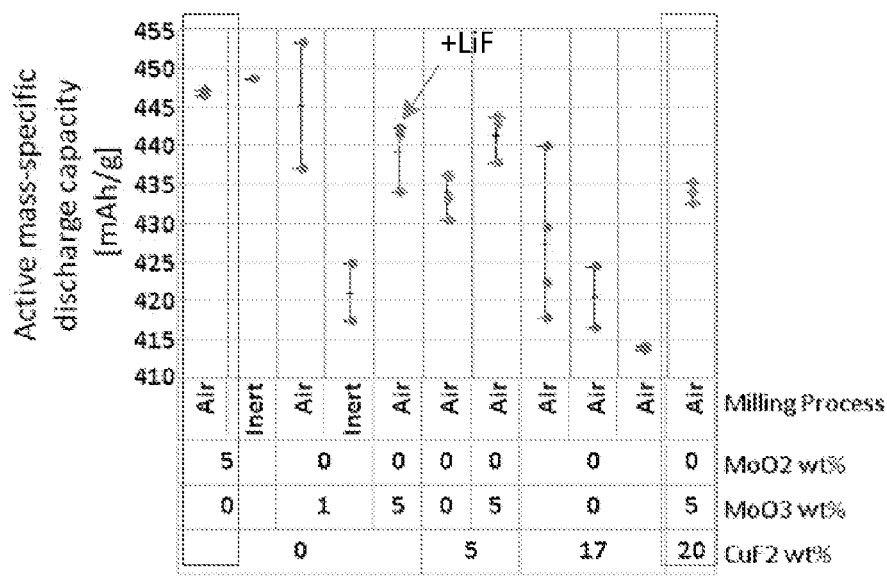
FIG. 33A shows experimental results for active mass-specific discharge capacity for $FeF_3$ particles doped with $MoO_2$, $MoO_3$, $CuF_2$, and combinations thereof.
Figure 33B:
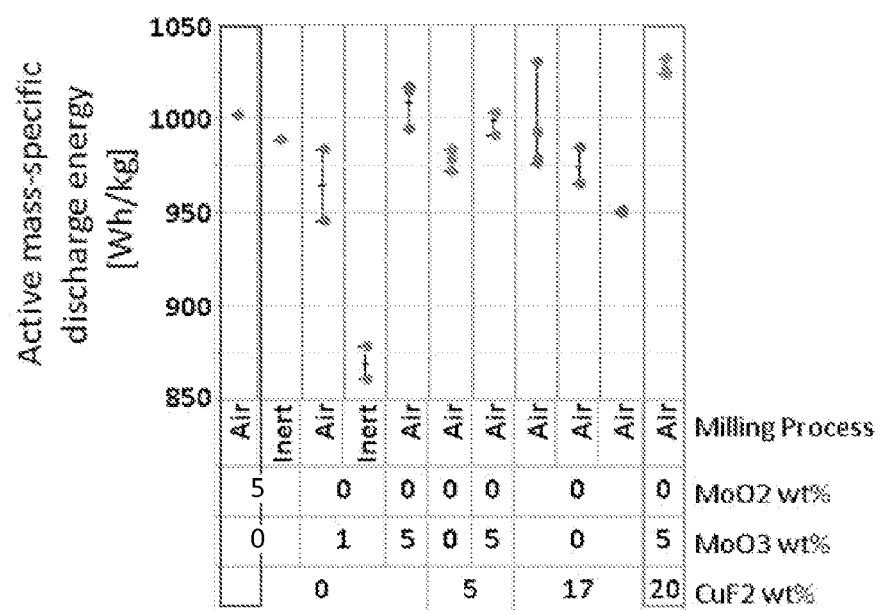
FIG. 33B shows experimental results for active mass-specific discharge energy for $FeF_3$ particles doped with $MoO_2$, $MoO_3$, $CuF_2$, and combinations thereof.

FIGS. 33A and 33B show discharge results for a ferric fluoride conversion material doped with $MoO_2$, $MoO_3$, $CuF_2$, or combinations thereof. For this example, and all following examples, the positive electrode (cathode) contained $FeF_3$ (doped or undoped) with about 5% carbon ($C_{60}$) as an electronic conductor, the negative electrode (anode) contained graphite (for intercalating lithium), and the electrolyte was a liquid including EC:DC (ethylene carbonate: diethyl carbonate) with 1M $LiPF_6$. FIG. 33A shows the active mass-specific discharge capacity and FIG. 33B shows the active mass-specific discharge energy. The materials were cycled between 1.5V and 4.3V at 50° C. for 1 cycle. In FIG. 33A, the first column shows capacity plotted for 5 wt % $MoO_2$-doped particles milled in air. The second column shows capacity plotted for 5 wt % $MoO_2$-doped conversion material particles milled in an inert solvent. The third column shows capacity plotted for 1 wt % $MoO_3$-doped particles milled in air. The fourth column shows capacity plotted for 1 wt % $MoO_3$-doped particles milled in an inert solvent. The fifth column shows capacity plotted for 5 wt % $MoO_3$-doped particles milled in air. The sixth column shows capacity plotted for 5 wt % $CuF_2$-doped particles milled in air. The seventh column shows capacity plotted for particles doped with a mixture of 5 wt % $MoO_3$ and 5 wt % $CuF_2$ and milled in air. The eighth, ninth, and tenth columns show capacity plotted for 17 wt % $CuF_2$-doped particles milled in air. In the last column, capacity is plotted for particles doped with 5 wt % $MoO_3$ and 20 wt % $CuF_2$ mixture milled in air Atomic oxygen content was determined by x-ray fluorescence to be between about 1-10 at % for each sample. The doped particles depicted in the first column including 5 wt % $MoO_2$ had the most capacity at a C-rate of C/3. FIG. 33B shows active mass-specific discharge energy for the 11 runs of the same fabricated doped particles as in FIG. 33A. Here, the last column exhibited the most energy for the material co-doped with 20 wt % $CuF_2$ and 5 wt % $MoO_3$.

f. Example 6

Figure 34:
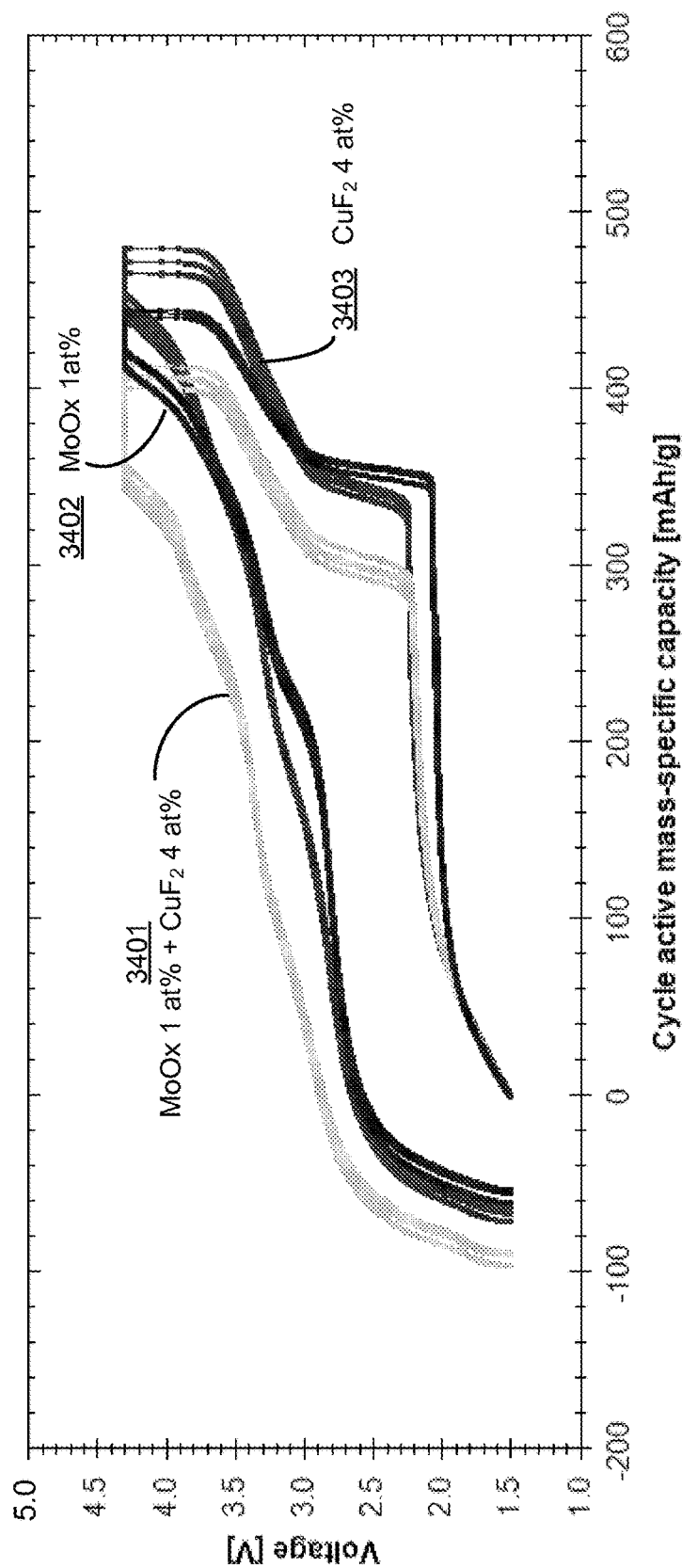
FIG. 34 shows Voltage v. Cycle active mass-specific capacity for $FeF_3$ particles doped with $MoO_x$ and $CuF_2$, $MoO_x$, and $CuF_2$.

FIG. 34 shows voltage v. cycle active mass-specific capacity for three examples of $FeF_3$ conversion material doped with the following dopant concentrations: 1 at % $MoO_x$ and 4 at % $CuF_2$, (curve 3401) 1 at % $MoO_x$ (curve 3402), and 4 at % $CuF_2$ (curve 3403). For each composition, the upper part of the curve represents voltage during charge and the lower part of the curve represents voltage during discharge. Specific capacity is greater for curves that reach farther to the right of the figure at the maximum voltage. As depicted here, the $CuF_2$-doped material 3403 exhibited greater specific capacity than the $MoO_x$-doped material 3402. A higher discharge voltage is desired to allow more voltage to be sustained over time. Here, the curve for the mixture-doped particles 3401 exhibited a higher discharge voltage than either 3402 or 3403. A large hysteresis (e.g., depicted by the space between the charge and discharge portions of the curves) suggests parasitic reactions likely to shorten the life of the conversion material. A high charge required to reach full capacity for the $MoO_x$/$CuF_2$-doped particles 3401 suggests that it requires more energy to charge the conversion material due to high charge impedance. As shown in FIG. 34, mixtures of $MoO_x$ and $CuF_2$ 3401 showed high conversion voltage but lower capacity and high charge impedance.

g. Example 7

Figure 35A:
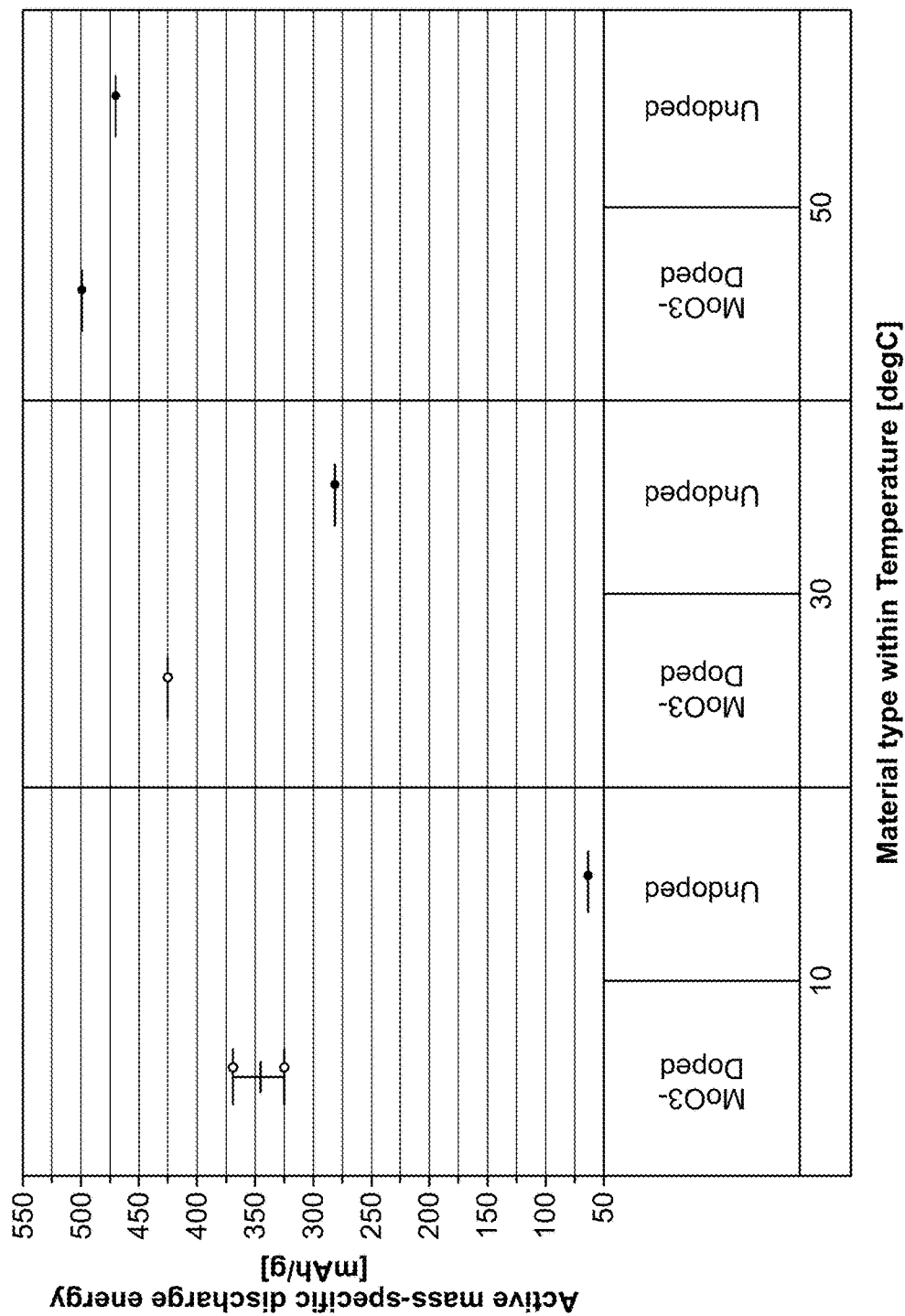
FIG. 35A shows experimental results for active mass-specific discharge capacity for $FeF_3$ particles doped with $MoO_3$, and undoped particles at different temperatures.
Figure 35B:
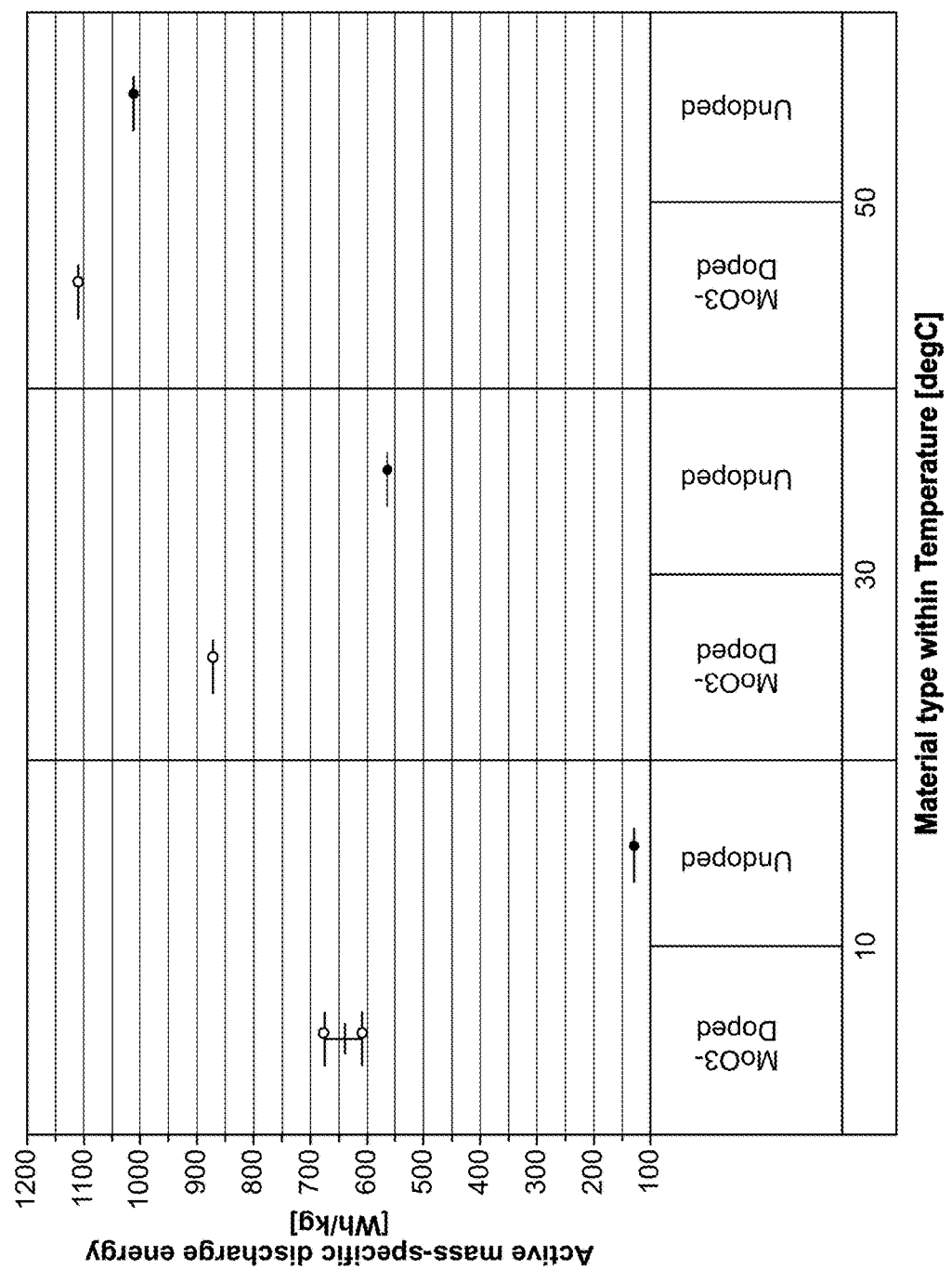
FIG. 35B shows experimental results for active mass-specific discharge energy for $FeF_3$ particles doped with $MoO_3$, and undoped particles at different temperatures.

FIG. 35A shows active mass-specific discharge capacity for ferric fluoride conversion material. FIG. 35B shows active mass-specific discharge energy for the cathode. Results are shown for 10° C., 30° C., and 50° C. These experiments were conducted to differentiate between temperature dependence of charge to discharge rate. As shown in FIG. 35B, at 10° C. for a symmetric C/3 charge and discharge, the doped material reached 650 Wh/kg. At 50° C. for symmetric charge and discharge at C/3, $MoO_3$-doped particles achieved 1120 Wh/kg. The results also show that the doped cathode material had significantly greater specific discharge capacity and specific discharge energy than the corresponding undoped material.

h. Example 8

Figure 36A:
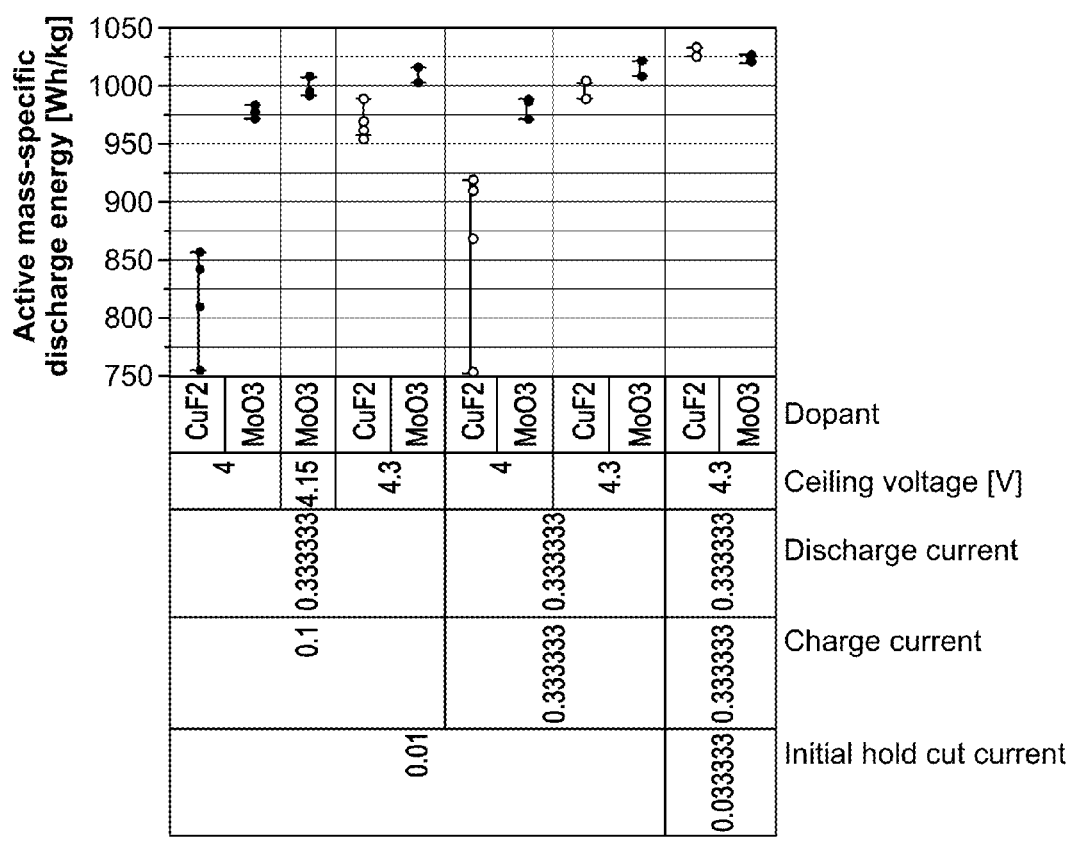
FIG. 36A shows experimental results for active mass-specific discharge capacity for $FeF_3$ particles doped with $MoO_3$, and particles doped with $CuF_2$ at different ceiling voltages.
Figure 36B:
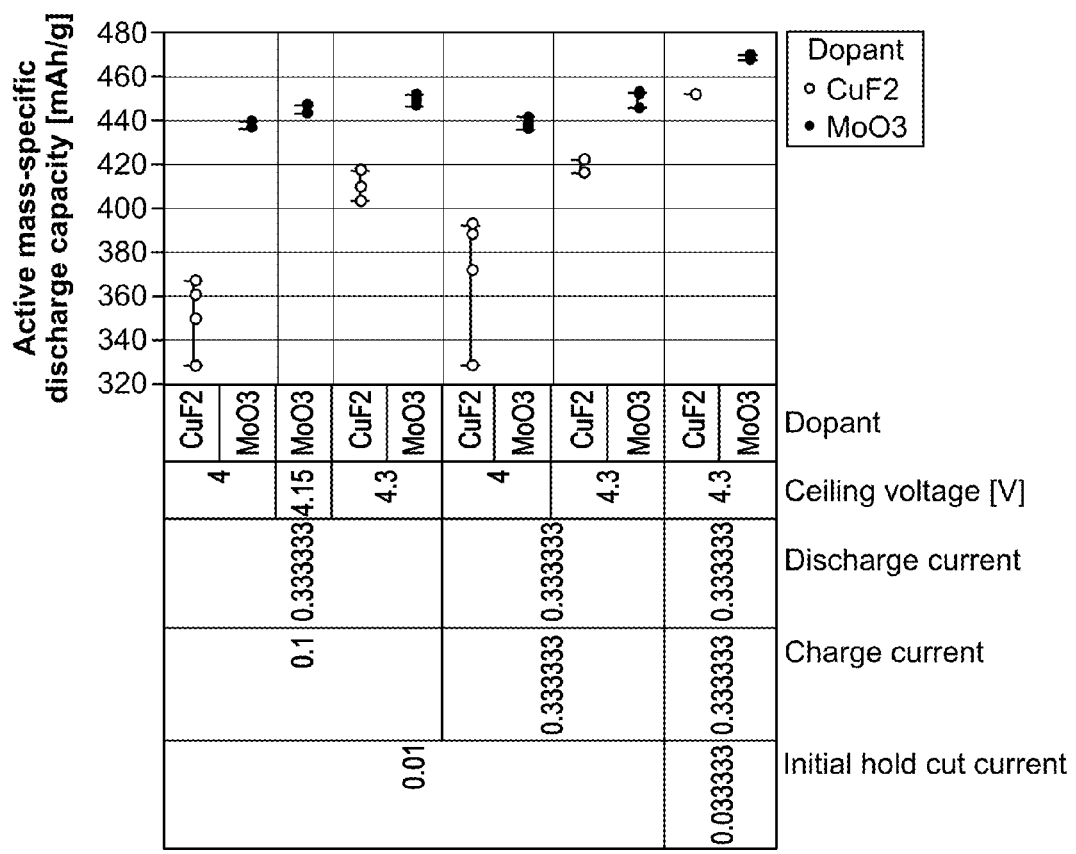
FIG. 36B shows experimental results for active mass-specific discharge energy for $FeF_3$ particles doped with $MoO_3$, and particles doped with $CuF_2$ at different ceiling voltages.

FIG. 36A shows active mass-specific discharge energy and FIG. 36B shows active mass specific discharge capacity for 5 atomic % $CuF_2$-doped $FeF_3$ conversion material versus 5 atomic % $MoO_3$-doped $FeF_3$ conversion material. As shown, energy sensitivity to ceiling voltage is significantly lower for $MoO_3$-doped materials than for $CuF_2$-doped materials. The ceiling voltage is the cutoff voltage applied during charging. Due to the reduced charge impedance of $MoO_3$-doped materials, a lower charging voltage (4V in this example) may be used. Energy density of $MoO_3$-containing cathodes can be increased by decreasing defluorination of the fluorine containing conversion material. It is believed that oxygen in the dopant may remove or displace fluorine atoms in ferric fluoride, for example. Ferrous fluoride has a lower intercalation capacity than ferric fluoride. $CuF_2$ doping may be used to reduce such defluorination and to increase conversion voltage.

i. Example 9

An experiment was conducted comparing three doped conversion materials, which was ferric fluoride in each case. The first was a $MoO_x$-doped conversion material fabricated by single evaporation. The second was a $CuF_x$-doped conversion material fabricated by single evaporation. The third was a $CuF_x$-doped conversion material fabricated by co-evaporation of $CuF_2$ and $FeF_3$. These three materials were repeatedly charged and discharged and the curves are plotted in FIG. 37A. The experiment was conducted at a C-rate for charge of C/10 and a C-rate for discharge of C/3. It was conducted at a charge voltage cutoff of 4 V.

Figure 37A:
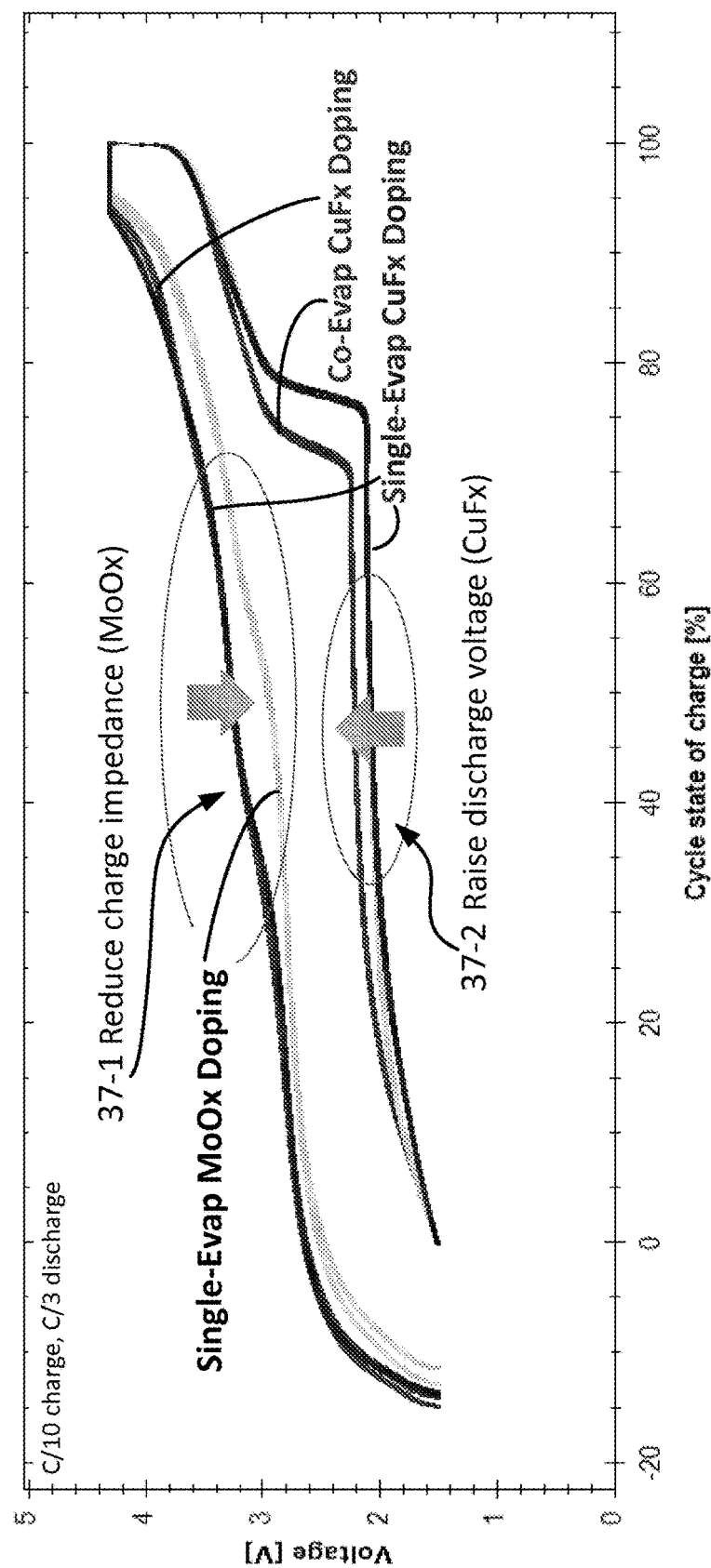
FIG. 37A shows Voltage v. Cycle state of charge for $FeF_3$ particles doped with $MoO_x$, $FeF_3$ particles doped with $CuF_x$ formed by co-evaporation, and $FeF_3$ particles doped with $CuF_x$ formed by single evaporation.

As shown in 37-1, $MoO_x$-doped material exhibited reduced charge impedance compared to the $CuF_x$-doped materials. A reduced charge impedance indicates that less voltage is required to charge the material. The co-evaporated $CuF_x$-doped material exhibited higher discharge voltage (37-2) than the $MoO_x$-doped material, as well as the single-evaporated $CuF_x$-doped material. A higher conversion voltage on discharge also results in a higher energy density. FIG. 37A suggests that a combination of dopants in the conversion materials as described herein that may be desired. A combination of materials may be used such that charge impedance is reduced, and discharge voltage is increased.

Figure 37B:
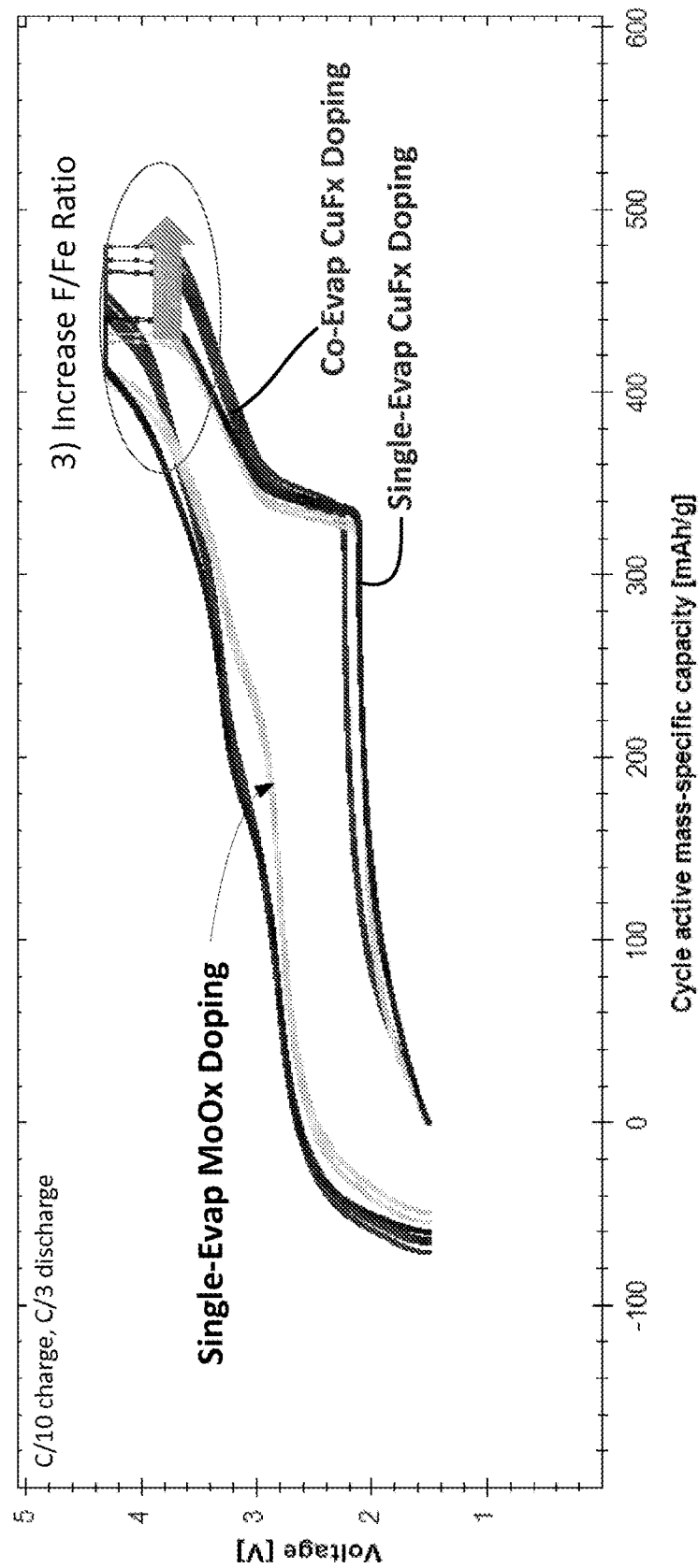
FIG. 37B shows Voltage v. Cycle active mass-specific capacity for $FeF_3$ particles doped with $MoO_x$, $FeF_3$ particles doped with $CuF_x$ formed by co-evaporation, and $FeF_3$ particles doped with $CuF_x$ formed by single evaporation.

FIG. 37B shows voltage versus cycle active mass-specific capacity for the three materials used in FIG. 37A. A curve that extends further to the right of the plot indicates that the material has increased capacity. Here, a third characteristic is shown: the fluorine to iron ratio. For example, fluorine may be added back to the conversion material to reduce defluorination during processing to increase intercalation since fluorine is used to intercalate during cycling of the material. As mentioned, it is believed that $MoO_x$ in $MoO_x$-doped materials may consume fluorine over time, thereby defluorinating the conversion material and reducing the capacity. As shown in FIG. 37B, the $MoO_x$-doped materials curve reverses direction for discharge at about 400 mAh/g, as opposed to the $CuF_x$-doped material curves, which are not discharged until capacity is reached between 425 mAh/g and 475 mAh/g. Therefore, include $CuF_x$ or other fluorine source to a molybdenum-doped conversion material may provide higher capacity materials.

j. Example 10

Figure 38A:
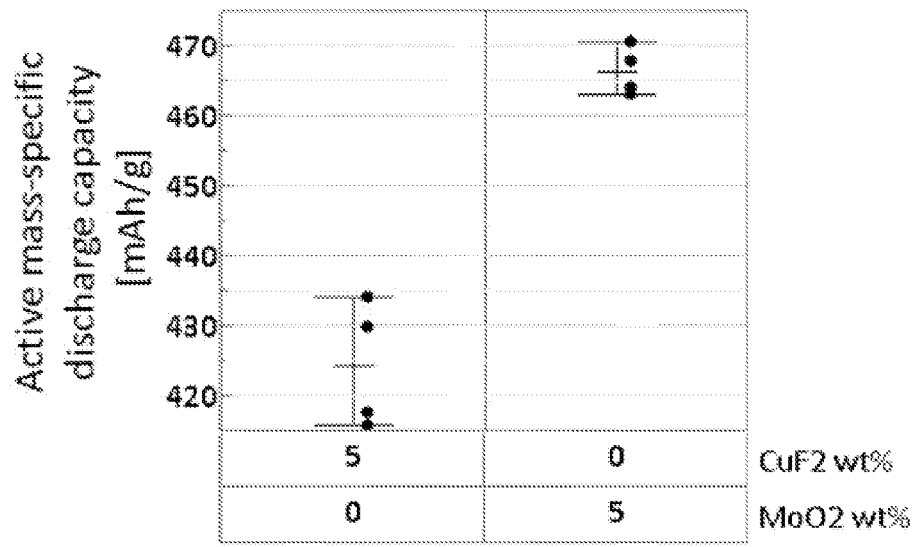
FIG. 38A shows experimental results for active mass-specific discharge capacity for $FeF_3$ particles doped with $MoO_3$, $FeF_3$ particles doped with $MoO_2$, and $FeF_3$ particles doped with $CuF_2$.
Figure 38B:
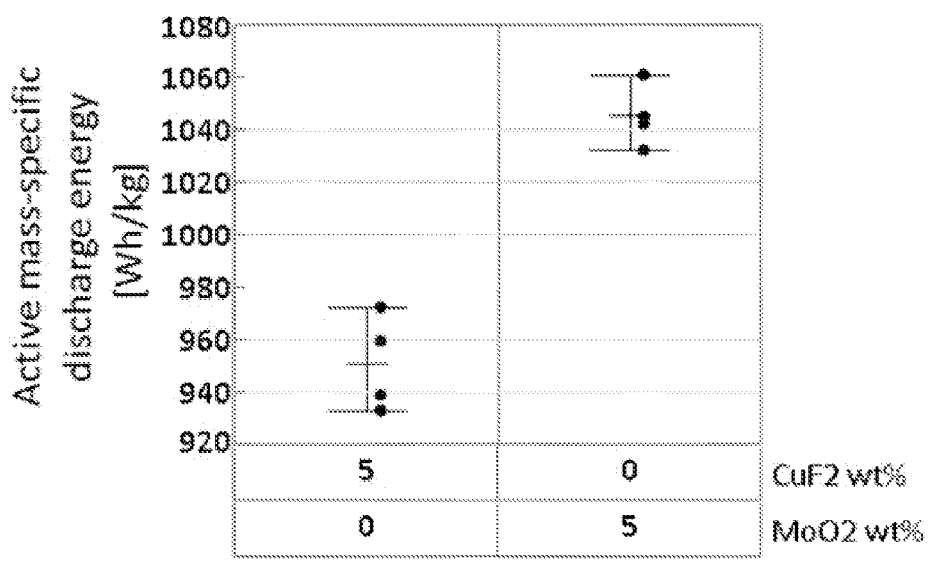
FIG. 38B shows experimental results for active mass-specific discharge energy for $FeF_3$ particles doped with $MoO_3$, $FeF_3$ particles doped with $MoO_2$, and $FeF_3$ particles doped with $CuF_2$.

FIG. 38A shows active mass-specific discharge capacity for materials doped with $CuF_2$, and $MoO_3$. For example, the positive electrode (cathode) contained $FeF_3$ doped with either $CuF_2$ or $MoO_3$ as indicated in FIG. 38A coated as a cathode slurry onto carbon-coated aluminum foil, the negative electrode (anode) contained lithium metal, and the electrolyte was glass fibers with a liquid containing 1:1 EC:DC (ethylene carbonate:diethyl carbonate) with 1M $LiPF_6$. The materials were cycled between 1.5V and 4.3V at 50° C. for an initial discharge cycle, a subsequent charge cycle, and a final discharge cycle. Measurements shown in FIG. 38A are from the final discharge cycle. The first column in FIG. 38A shows capacity plotted for 5 wt % $CuF_3$-doped particles. The second column shows capacity plotted for 5 wt % $MoO_2$-doped particles. FIG. 38B shows active mass-specific discharge energy for materials doped with $CuF_2$, and $MoO_3$, the same doped particles as in FIG. 38A.

k. Example 11

Figure 39:
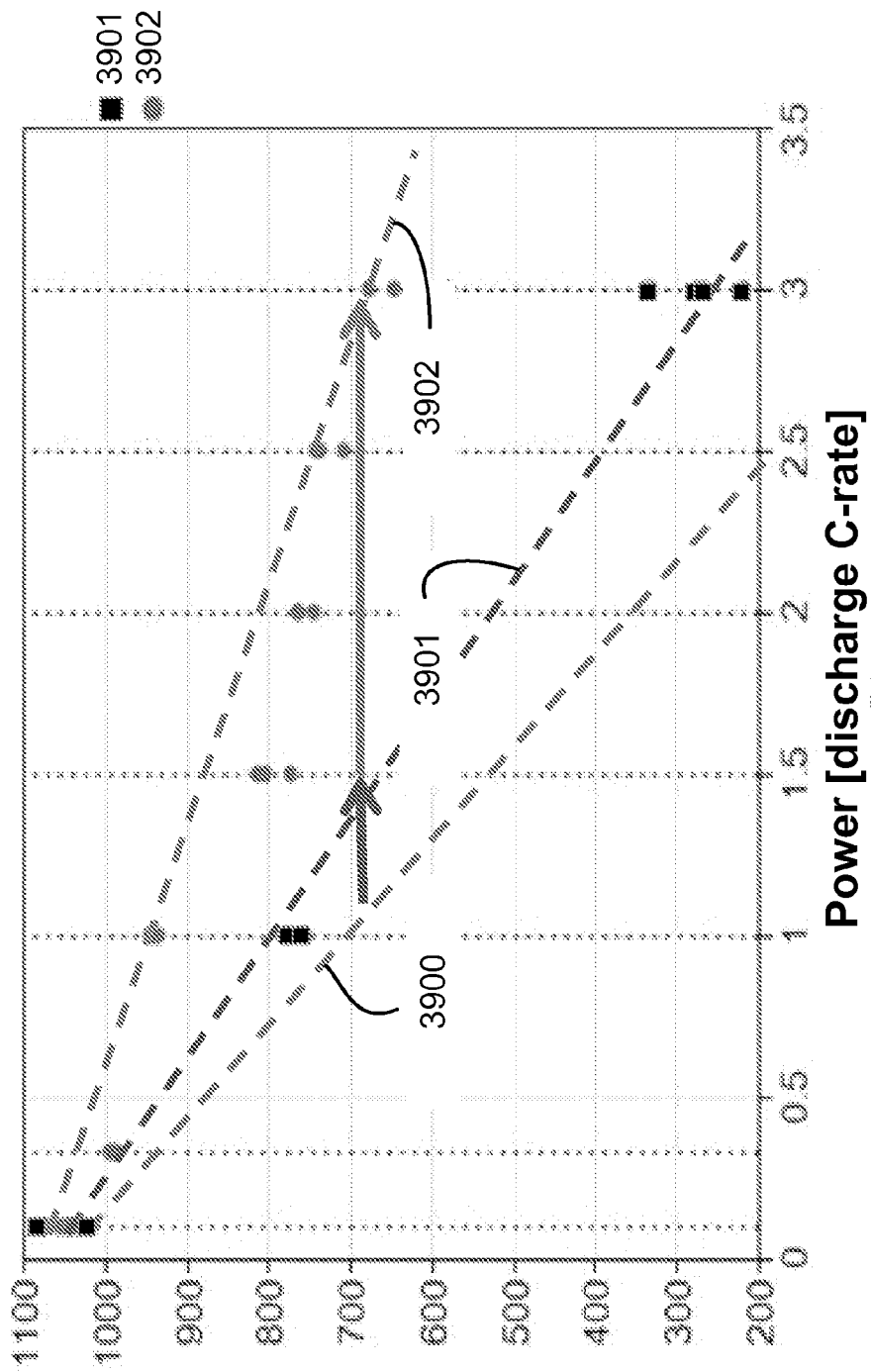
FIG. 39 shows Discharge Energy v. Power for undoped $FeF_3$ particles, $FeF_3$ particles doped with $CuF_x$, and $FeF_3$ particles doped with $MoO_x$ formed by single-evaporation.

An experiment was conducted comparing specific energy versus power of three conversion material cathodes: undoped conversion material (3900), $CuF_x$-doped material (3901), $MoO_x$-doped material (3902). Both doped materials were fabricated by single evaporation. The discharge energy was plotted against power as set by the C-rate for batteries containing these doped materials in FIG. 39. The specific energy of the batteries using undoped conversion material (3900) as shown in the figure quickly drops with increasing power in comparison to batteries with either the $CuF_x$-doped material (3901) or the $MoO_x$-doped material (3902). The less steep the curve, the greater the power at a specific discharge energy, and thus the higher the rate capability. The $MoO_x$-doped material (3902) sustained a high energy density even at powers in C-rate of up to 3 C over greater than 10 minutes. Undoped material (3900) was not cyclable at these power levels. These results suggest that $MoO_x$-doped,  and $CuF_x$-doped materials in accordance with disclosed embodiments are capable of achieving high power and high energy.

l. Example 12

Figure 40:
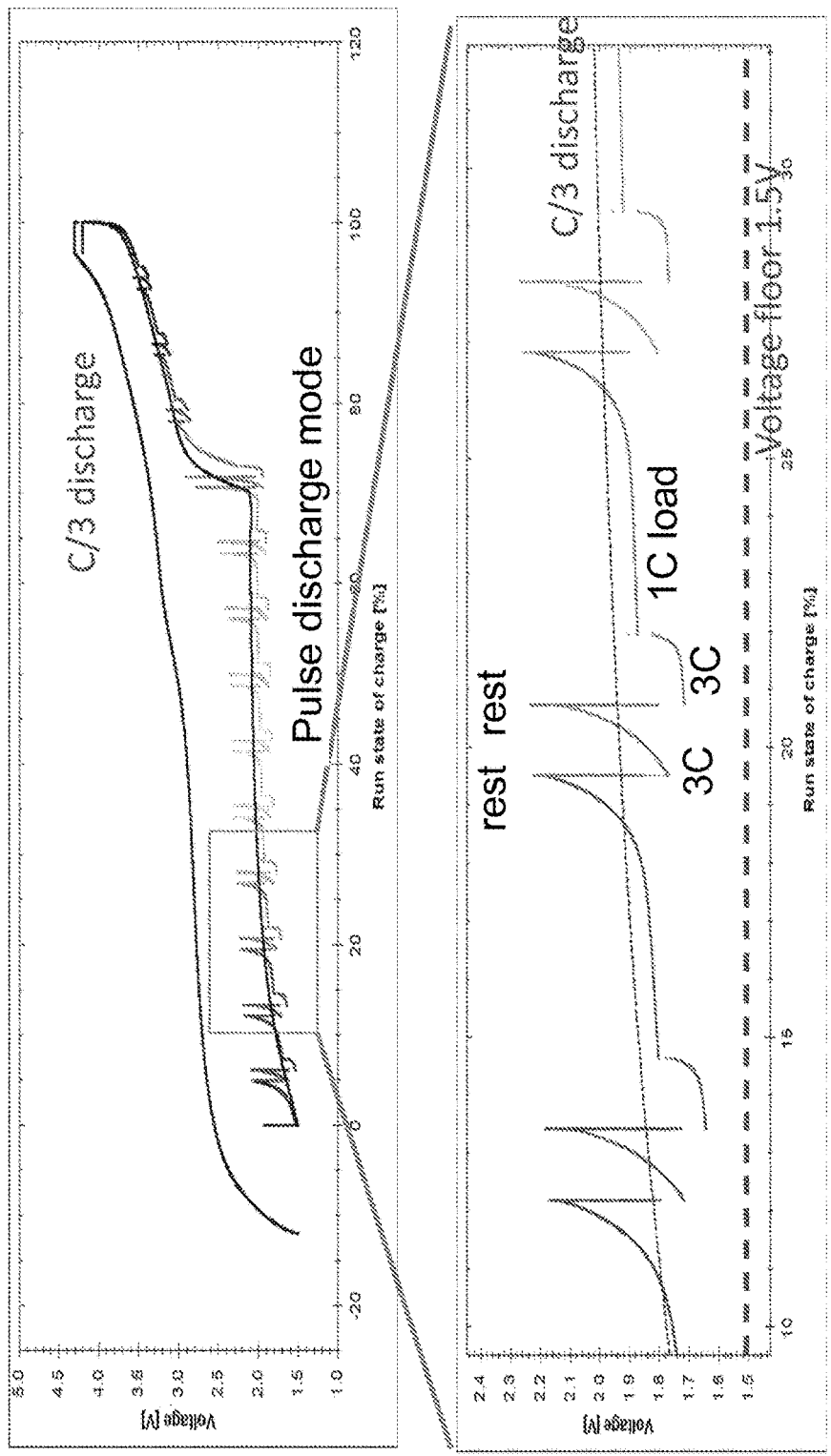
FIG. 40 shows Voltage v. State of charge for $FeF_3$ particles doped with $MoO_x$ formed by single-evaporation.

FIG. 40 shows overlaid plots of the voltage versus run state of charge for $MoO_x$-doped conversion material. In one plot, the material is discharged at C/3 without pulse conditions. In the overlaid plot, the material is discharged at C/3 with 3 C 10 second pulse discharges followed by a rest period. A section of the top plot is expanded in the bottom plot to show the pulsing scheme which shows the pulse protocol in detail and overlaid over the non-pulsed discharge.

XVI. CONCLUSION

Although the foregoing embodiments have been described in some detail for purposes of clarity of understanding, it will be apparent that certain changes and modifications may be practiced within the scope of the appended claims. It should be noted that there are many alternative ways of implementing the processes, systems and apparatus of the present embodiments. Accordingly, the present embodiments are to be considered as illustrative and not restrictive, and the embodiments are not to be limited to the details given herein.

What is claimed is:

1. A cathode for an energy storage device, the cathode comprising:
    a conversion chemistry material comprising a dopant,
        wherein the conversion chemistry material is selected from the group consisting of $FeF_2$, $FeF_3$, and $FeO_dF_{3-2d}$ wherein $0 \leq d \leq \frac{1}{2}$;
        wherein the dopant is present in the conversion chemistry material in an amount from about 0.01% to 25% (atomic %);
        wherein the dopant is a member or a combination thereof selected from the group consisting of $Li_2O$, $CuF_2$, and $MoO_x$, wherein x is 2 or 3; and
        wherein the conversion chemistry material comprising the dopant has at least one of a Li-ion conductivity greater than $1*10^{-7}$ S/cm or an electronic conductivity greater than $10^{-8}$ S/cm.

2. The cathode of claim 1, wherein the dopant comprises $Li_2O$ and is present in the conversion chemistry material in an amount from about 0.01% to 10% (atomic %).

3. The cathode of claim 1, wherein the dopant comprises molybdenum oxide and is present in the conversion chemistry material in an amount from about 0.01% to 10% (atomic %).

4. The cathode of claim 1, wherein the dopant comprises $CuF_2$ and is present in the conversion chemistry material in an amount from about 0.01% to 10% (atomic %).

5. The cathode of claim 1, wherein the conversion chemistry material is $FeF_3$, and wherein the dopant is $CuF_2$ and molybdenum oxide.

6. The cathode of claim 1, wherein the conversion chemistry material is $FeF_3$, and wherein the dopant is $CuF_2$ and $MoO_3$.

7. The cathode of claim 1, wherein the cathode further comprises an intercalation chemistry material selected from the group consisting of $LiMPO_4$, $Li_xTi_yO_2$, $LiMn_yO_4$, $LiMn_y.Ni_zO_4$, $LiCoO_2$, $Li(NiCoMn)O_2$, $Li(NiCoAl)O_2$, NMC and NCA;

wherein M is Fe, Ni, Co, or Mn;
wherein $0<x<5$;
wherein $0.1<y<7$; and
wherein $0<z<1$.

8. The cathode of claim 1, further comprising a solid state catholyte.

9. The cathode of claim 1, wherein the conversion chemistry material comprising the dopant has a $d_{50}$ particle size of 1 nm to 5 μm.

10. The cathode of claim 1, wherein the conversion chemistry material comprising the dopant is glassy or amorphous.

* * * * *